(12) United States Patent
Duan et al.

(10) Patent No.: US 12,534,526 B2
(45) Date of Patent: Jan. 27, 2026

(54) NKG2A ANTIBODY, PREPARATION METHOD THEREFOR AND APPLICATION THEREOF

(71) Applicant: SHANGHAI HYAMAB BIOTECH CO., LTD., Shanghai (CN)

(72) Inventors: Qing Duan, Shanghai (CN); Lile Liu, Shanghai (CN); Dazhi Yang, Shanghai (CN); Jing Gao, Shanghai (CN); Lili Hu, Shanghai (CN); Ruirui Sui, Shanghai (CN); Dongxu Wang, Shanghai (CN); Ye Han, Shanghai (CN); Rongrong Xie, Shanghai (CN); Yan Lu, Shanghai (CN); Xiaohui Shao, Shanghai (CN); Jie Zhang, Shanghai (CN); Wenming Zhou, Shanghai (CN); Cuicui Guo, Shanghai (CN); Guozhen Tong, Shanghai (CN); Lina Wang, Shanghai (CN); Chaohui Dai, Shanghai (CN); Mengying Wang, Shanghai (CN)

(73) Assignee: SHANGHAI HYAMAB BIOTECH CO., LTD., Shanghai (CN)

( * ) Notice: Subject to any disclaimer, the term of this patent is extended or adjusted under 35 U.S.C. 154(b) by 997 days.

(21) Appl. No.: 17/292,379

(22) PCT Filed: Nov. 6, 2019

(86) PCT No.: PCT/CN2019/116060
§ 371 (c)(1),
(2) Date: May 3, 2022

(87) PCT Pub. No.: WO2020/094071
PCT Pub. Date: May 14, 2020

(65) Prior Publication Data
US 2022/0259306 A1 Aug. 18, 2022

(30) Foreign Application Priority Data
Nov. 7, 2018 (CN) .......................... 201811320004.2

(51) Int. Cl.
*C07K 16/28* (2006.01)
*A61K 40/15* (2025.01)
*A61K 40/42* (2025.01)
*A61K 47/68* (2017.01)
*C12N 5/0783* (2010.01)

(52) U.S. Cl.
CPC .......... *C07K 16/2803* (2013.01); *A61K 40/15* (2025.01); *A61K 40/4224* (2025.01); *A61K 47/6849* (2017.08); *C12N 5/0636* (2013.01); *A61K 2239/48* (2023.05); *C07K 2317/24* (2013.01); *C07K 2317/565* (2013.01); *C07K 2317/73* (2013.01); *C07K 2317/76* (2013.01); *C07K 2317/92* (2013.01)

(58) Field of Classification Search
None
See application file for complete search history.

(56) References Cited

U.S. PATENT DOCUMENTS

2008/0118516 A1   5/2008   Freishtat

FOREIGN PATENT DOCUMENTS

| CN | 101484471 A | 7/2009 | |
|---|---|---|---|
| CN | 101952317 A | 1/2011 | |
| CN | 102977213 A | 3/2013 | |
| CN | 107074950 A | 8/2017 | |
| JP | 2008058208 A | * 3/2008 | |
| JP | 2009541449 A | 11/2009 | |
| JP | 2011510047 A | 3/2011 | |
| WO | 2005105849 A1 | 11/2005 | |
| WO | 2008009545 A1 | 1/2008 | |
| WO | 2009092805 A1 | 7/2009 | |
| WO | 2016041947 A1 | 3/2016 | |
| WO | WO-2019136419 A2 | * 7/2019 | ....... C07K 14/70578 |

OTHER PUBLICATIONS

Herold. Determinants of the assembly and function of antibody variable domains. Nature Scientific Reports, 7:12276, Sep. 25, 2017. (Year: 2017).*
Sela-Culang et al. The structural basis of antibody-antigen recognition. Fron. Immuno., vol. 4, Article 302, Oct. 2013. (Year: 2013).*
Koenig. Mutational landscape of antibody variable domains reveals a switch modulating the interdomain conformational dynamics and antigen binding. PNAS, E486-E4995, Jan. 5, 2017. (Year: 2017).*
Carrillo, Jorge et al.; "Anti-peripherin B Lymphocytes are positively selected during diabetogenesis"; Molecular Immunology; vol. 45; Apr. 23, 2008; pp. 3152-3162.
Dondelinger, Mathieu et al.; "Understanding the Significance and Implications of Antibody Numbering and Antigen-Binding Surface/Residue Definition"; frontiers in Immunology; vol. 9, Article 2278Oct. 16, 2018; pp. 1-15.
Rudikoff, Stuart et al.; "Single amino acid substitution altering antigen-binding specificity"; Proc. Natl. Acad. Sci. USA, Immunology; vol. 79; Mar. 1982; pp. 1979-1983.
Winkler, Karsten et al.; "Changing the Antigen Binding Specificity by Single Point Mutations of an Anti-p24 (HIV-1) Antibody"; The American Association of Immunologists; Apr. 23, 2010; pp. 4505-4514.

* cited by examiner

*Primary Examiner* — Julie Wu
*Assistant Examiner* — Amy M. Chattin
(74) *Attorney, Agent, or Firm* — NKL Law; Bin Lu; Allen Xue

(57) ABSTRACT

Provided are an antibody targeting NKG2A, a preparation method therefor and use thereof. Specifically, provided is a new mouse or humanized monoclonal antibody targeting NKG2A, and a method for preparing the monoclonal antibody. The monoclonal antibody can bind to an NKG2A antigen with high specificity, and has high affinity and significant activities such as anti-tumor activity.

11 Claims, 18 Drawing Sheets
Specification includes a Sequence Listing.

SEQUENCE LISTING

<160> NUMBER OF SEQ ID NOS: 124

<210> SEQ ID NO 1
<211> LENGTH: 121
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: M15-5 VH

<400> SEQUENCE: 1

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Gln Asn Thr
            20                  25                  30

Tyr Ile His Trp Val Lys Gln Ala Pro Gly Gln Gly Leu Glu Trp Ile
        35                  40                  45

Gly Lys Ile Asp Pro Ala Asn Ala Asp Thr Lys Tyr Ala Pro Thr Phe
    50                  55                  60

Gln Gly Arg Ala Thr Ile Thr Ala Asp Thr Ser Thr Asn Thr Ala Tyr
65                  70                  75                  80

Leu Glu Leu Ser Ser Leu Arg Ser Glu Asp Thr Ala Val Tyr Tyr Cys
                85                  90                  95

Ala Arg Tyr Arg Asp Tyr Leu Phe Tyr Tyr Ala Leu Gly Tyr Trp Gly
            100                 105                 110

Gln Gly Thr Thr Val Thr Val Ser Ser
        115                 120

<210> SEQ ID NO 2
<211> LENGTH: 5
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: M15-5 VH-CDR1

<400> SEQUENCE: 2

Asn Thr Tyr Ile His
1               5

<210> SEQ ID NO 3
<211> LENGTH: 16
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: M15-5 VH-CDR2

<400> SEQUENCE: 3

Ile Asp Pro Ala Asn Ala Asp Thr Lys Tyr Ala Pro Thr Phe Gln Gly
1               5                   10                  15

<210> SEQ ID NO 4
<211> LENGTH: 12
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: M15-5 VH-CDR3

<400> SEQUENCE: 4

Tyr Arg Asp Tyr Leu Phe Tyr Tyr Ala Leu Gly Tyr
1               5                   10

<210> SEQ ID NO 5
<211> LENGTH: 112
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: M15-5 VL

<400> SEQUENCE: 5

Asp Ile Val Met Thr Gln Ser Pro Leu Ser Leu Pro Val Thr Pro Gly
1               5                   10                  15

Glu Pro Ala Ser Ile Ser Cys Arg Ser Ser Lys Ser Leu Leu His Ser
            20                  25                  30

Asn Ala Asn Thr Tyr Leu Tyr Trp Tyr Leu Gln Lys Pro Gly Gln Ser
        35                  40                  45

Pro Gln Leu Leu Ile Tyr Arg Met Ser Asn Leu Ala Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Met Gln His
            85                  90                  95

Leu Glu Tyr Pro Tyr Thr Phe Gly Gln Gly Thr Lys Leu Glu Ile Lys
        100                 105                 110

<210> SEQ ID NO 6
<211> LENGTH: 16
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: M15-5 VL-CDR1

<400> SEQUENCE: 6

Arg Ser Ser Lys Ser Leu Leu His Ser Asn Ala Asn Thr Tyr Leu Tyr
1               5                   10                  15

<210> SEQ ID NO 7
<211> LENGTH: 7
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: M15-5 VL-CDR2

<400> SEQUENCE: 7

Arg Met Ser Asn Leu Ala Ser
1               5

<210> SEQ ID NO 8
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: M15-5 VL-CDR3

<400> SEQUENCE: 8

Met Gln His Leu Glu Tyr Pro Tyr Thr
1               5

<210> SEQ ID NO 9
<211> LENGTH: 121
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mpb416 VH

<400> SEQUENCE: 9

Gln Val Gln Leu Gln Gln Ser Val Ala Glu Leu Val Arg Pro Gly Ala
1               5                   10                  15

Ser Val Lys Leu Ser Cys Thr Ala Ser Gly Phe Asn Ile Gln Asn Thr
            20                  25                  30

Tyr Ile His Trp Val Lys Gln Arg Pro Glu Gln Gly Leu Glu Trp Ile
        35                  40                  45

```
Gly Lys Ile Asp Pro Ala Asn Gly Asp Thr Lys Tyr Ala Pro Thr Phe
    50                  55                  60

Gln Gly Lys Ala Thr Ile Thr Ala Asp Thr Ser Ser Asn Thr Ala Tyr
65                  70                  75                  80

Leu Gln Leu Ser Ser Leu Thr Pro Glu Asp Thr Ala Ile Tyr Tyr Cys
                85                  90                  95

Ala Arg Tyr Arg Asp Tyr Leu Phe Tyr Tyr Ala Leu Gly Tyr Trp Gly
            100                 105                 110

Gln Gly Thr Ser Val Thr Val Ser Ser
            115                 120

<210> SEQ ID NO 10
<211> LENGTH: 5
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mpb416 VH-CDR1

<400> SEQUENCE: 10

Asn Thr Tyr Ile His
1               5

<210> SEQ ID NO 11
<211> LENGTH: 16
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mpb416 VH-CDR2

<400> SEQUENCE: 11

Ile Asp Pro Ala Asn Gly Asp Thr Lys Tyr Ala Pro Thr Phe Gln Gly
1               5                   10                  15

<210> SEQ ID NO 12
<211> LENGTH: 12
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mpb416 VH-CDR3

<400> SEQUENCE: 12

Tyr Arg Asp Tyr Leu Phe Tyr Tyr Ala Leu Gly Tyr
1               5                   10

<210> SEQ ID NO 13
<211> LENGTH: 112
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mpb416 VL

<400> SEQUENCE: 13

Asp Ile Val Met Thr Gln Ser Ala Pro Ser Val Pro Val Thr Pro Gly
1               5                   10                  15
```

Glu Ser Val Ser Ile Ser Cys Arg Ser Ser Lys Ser Leu Leu His Ser
               20                  25                  30

Asn Gly Asn Thr Tyr Leu Tyr Trp Phe Leu Gln Arg Pro Gly Gln Ser
           35                  40                  45

Pro Gln Leu Leu Ile Tyr Arg Met Ser Asn Leu Ala Ser Gly Val Pro
       50                  55                  60

Asp Arg Phe Ser Gly Ser Gly Ser Gly Thr Ala Phe Thr Leu Arg Ile
65                  70                  75                  80

Ser Arg Val Glu Ala Glu Asp Val Gly Val Tyr Tyr Cys Met Gln His
               85                  90                  95

Leu Glu Tyr Pro Tyr Thr Phe Gly Gly Gly Thr Lys Leu Glu Ile Lys
           100                 105                 110

<210> SEQ ID NO 14
<211> LENGTH: 16
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mpb416 VL-CDR1

<400> SEQUENCE: 14

Arg Ser Ser Lys Ser Leu Leu His Ser Asn Gly Asn Thr Tyr Leu Tyr
1               5                   10                  15

<210> SEQ ID NO 15
<211> LENGTH: 7
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mpb416 VL-CDR2

<400> SEQUENCE: 15

Arg Met Ser Asn Leu Ala Ser
1               5

<210> SEQ ID NO 16
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mpb416 VL-CDR3

<400> SEQUENCE: 16

Met Gln His Leu Glu Tyr Pro Tyr Thr
1               5

<210> SEQ ID NO 17
<211> LENGTH: 121
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab031 VH

<400> SEQUENCE: 17

Glu Val Gln Leu Gln Gln Ser Val Ala Glu Leu Val Arg Pro Gly Ala
1               5                   10                  15

Ser Val Arg Leu Ser Cys Thr Gly Ser Gly Phe Asn Ile Gln Asn Thr
            20                  25                  30

Tyr Ile His Trp Val Lys Gln Arg Pro Glu Gln Gly Leu Glu Trp Ile
        35                  40                  45

Gly Arg Ile Asp Pro Ala Asn Gly Asp Thr Lys Tyr Ala Pro Lys Phe
    50                  55                  60

Gln Gly Lys Ala Thr Ile Thr Ala Asp Thr Ser Asn Thr Ala Tyr
65                  70                  75                  80

Leu Gln Leu Ser Ser Leu Thr Ser Glu Asp Thr Ala Ile Tyr Tyr Cys
                85                  90                  95

Thr Arg Tyr Gly Asn Tyr Leu Tyr Tyr Tyr Ser Leu Asp Tyr Trp Gly
            100                 105                 110

Gln Gly Thr Ser Val Thr Val Ser Ser
            115                 120

<210> SEQ ID NO 18
<211> LENGTH: 5
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab031 VH-CDR1

<400> SEQUENCE: 18

Asn Thr Tyr Ile His
1               5

<210> SEQ ID NO 19
<211> LENGTH: 16
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab031 VH-CDR2

<400> SEQUENCE: 19

Ile Asp Pro Ala Asn Gly Asp Thr Lys Tyr Ala Pro Lys Phe Gln Gly
1               5                   10                  15

<210> SEQ ID NO 20
<211> LENGTH: 12
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab031 VH-CDR3

<400> SEQUENCE: 20

Tyr Gly Asn Tyr Leu Tyr Tyr Tyr Ser Leu Asp Tyr
1               5                   10

<210> SEQ ID NO 21
<211> LENGTH: 112
<212> TYPE: PRT
<213> ORGANISM: Artificial sequence
<220> FEATURE:
<223> OTHER INFORMATION: synthesized

```
<220> FEATURE:
<221> NAME/KEY: misc_feature
<223> OTHER INFORMATION: Mab031 VL

<400> SEQUENCE: 21

Asp Ile Val Met Thr Gln Ala Ala Pro Ser Val Pro Val Thr Pro Gly
1               5                   10                  15

Glu Ser Val Ser Ile Ser Cys Arg Ser Ser Lys Ser Leu Leu His Ser
            20                  25                  30

Asn Gly Asn Thr Tyr Leu Tyr Trp Phe Leu Gln Arg Pro Gly Gln Ser
        35                  40                  45

Pro Gln Leu Leu Ile Tyr Arg Met Ser Asn Leu Ala Ser Gly Val Pro
    50                  55                  60

Asp Arg Phe Ser Gly Ser Gly Ser Gly Thr Ala Phe Thr Leu Arg Ile
65                  70                  75                  80

Ser Arg Val Glu Ala Glu Asp Met Gly Val Tyr Tyr Cys Met Gln His
                85                  90                  95

Leu Glu Tyr Pro Tyr Thr Phe Gly Gly Gly Thr Lys Leu Glu Ile Lys
            100                 105                 110

<210> SEQ ID NO 22
<211> LENGTH: 16
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab031 VL-CDR1

<400> SEQUENCE: 22

Arg Ser Ser Lys Ser Leu Leu His Ser Asn Gly Asn Thr Tyr Leu Tyr
1               5                   10                  15

<210> SEQ ID NO 23
<211> LENGTH: 7
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab031 VL-CDR2

<400> SEQUENCE: 23

Arg Met Ser Asn Leu Ala Ser
1               5

<210> SEQ ID NO 24
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab031 VL-CDR3

<400> SEQUENCE: 24

Met Gln His Leu Glu Tyr Pro Tyr Thr
1               5

<210> SEQ ID NO 25
<211> LENGTH: 121
<212> TYPE: PRT
```

```
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab032 VH

<400> SEQUENCE: 25

Glu Val Gln Leu Gln Gln Ser Val Ala Glu Leu Val Arg Pro Gly Ala
1               5                   10                  15

Ser Val Arg Leu Ser Cys Thr Gly Ser Gly Phe Asn Ile Glu Asn Thr
            20                  25                  30

Tyr Met His Trp Leu Lys Gln Arg Pro Glu Gln Gly Leu Glu Trp Ile
        35                  40                  45

Gly Arg Ile Asp Pro Ala Asp Gly Asp Thr Gln Tyr Ala Pro Lys Phe
    50                  55                  60

Gln Gly Lys Ala Thr Ile Thr Thr Asp Thr Ser Asn Thr Ala Tyr
65                  70                  75                  80

Leu Gln Leu Ser Ser Leu Thr Ser Glu Asp Thr Ala Ile Tyr Tyr Cys
                85                  90                  95

Ala Arg Tyr Gly Asn Tyr Leu Phe Tyr Tyr Ser Met Asp Tyr Trp Gly
            100                 105                 110

Gln Gly Thr Ser Val Thr Val Ser Ser
        115                 120

<210> SEQ ID NO 26
<211> LENGTH: 5
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab032 VH-CDR1

<400> SEQUENCE: 26

Asn Thr Tyr Met His
1               5

<210> SEQ ID NO 27
<211> LENGTH: 16
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab032 VH-CDR2

<400> SEQUENCE: 27

Ile Asp Pro Ala Asp Gly Asp Thr Gln Tyr Ala Pro Lys Phe Gln Gly
1               5                   10                  15

<210> SEQ ID NO 28
<211> LENGTH: 12
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab032 VH-CDR3

<400> SEQUENCE: 28

Tyr Gly Asn Tyr Leu Phe Tyr Tyr Ser Met Asp Tyr
```

<210> SEQ ID NO 29
<211> LENGTH: 112
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab032 VL

<400> SEQUENCE: 29

```
Asp Ile Val Met Thr Gln Ala Ala Pro Ser Val Pro Val Thr Pro Gly
1               5                   10                  15
Glu Ser Val Ser Ile Ser Cys Arg Ser Ser Lys Ser Leu Leu His Ser
            20                  25                  30
Asn Gly Asn Thr Tyr Leu Tyr Trp Phe Leu Gln Arg Pro Gly Gln Ser
        35                  40                  45
Pro Gln Leu Leu Ile Tyr Arg Met Ser Asn Leu Ala Ser Gly Val Pro
    50                  55                  60
Asp Arg Phe Ser Gly Ser Gly Ser Ala Thr Ala Phe Thr Leu Arg Ile
65                  70                  75                  80
Ser Arg Val Glu Ala Glu Asp Val Gly Ile Tyr Tyr Cys Met Gln His
                85                  90                  95
Leu Glu Tyr Pro Tyr Thr Phe Gly Gly Gly Thr Lys Leu Glu Ile Lys
            100                 105                 110
```

<210> SEQ ID NO 30
<211> LENGTH: 16
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab032 VL-CDR1

<400> SEQUENCE: 30

```
Arg Ser Ser Lys Ser Leu Leu His Ser Asn Gly Asn Thr Tyr Leu Tyr
1               5                   10                  15
```

<210> SEQ ID NO 31
<211> LENGTH: 7
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab032 VL-CDR2

<400> SEQUENCE: 31

```
Arg Met Ser Asn Leu Ala Ser
1               5
```

<210> SEQ ID NO 32
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab032 VL-CDR3

<400> SEQUENCE: 32

Met Gln His Leu Glu Tyr Pro Tyr Thr
1               5

<210> SEQ ID NO 33
<211> LENGTH: 121
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab033 VH

<400> SEQUENCE: 33

Glu Val Gln Leu Gln Gln Ser Val Ala Glu Phe Val Arg Pro Gly Ala
1               5                   10                  15

Ser Val Arg Leu Ser Cys Thr Ala Ser Gly Phe Asn Ile Glu Asn Thr
            20                  25                  30

Tyr Ile His Trp Leu Lys Gln Arg Pro Glu Gln Gly Leu Glu Trp Ile
        35                  40                  45

Gly Arg Ile Asp Pro Ala Asn Gly Asp Thr Gln Tyr Asp Pro Lys Phe
    50                  55                  60

Gln Gly Lys Ala Thr Leu Thr Ala Ala Thr Ser Ser Asn Thr Ala Tyr
65                  70                  75                  80

Leu Gln Leu Ser Gly Leu Thr Ser Glu Asp Thr Ala Ile Tyr Tyr Cys
                85                  90                  95

Thr Arg Tyr Gly Asp Tyr Leu Phe Tyr Tyr Ser Leu Lys Tyr Trp Gly
            100                 105                 110

Gln Gly Thr Ser Val Thr Val Ser Ser
        115                 120

<210> SEQ ID NO 34
<211> LENGTH: 5
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab033 VH-CDR1

<400> SEQUENCE: 34

Asn Thr Tyr Ile His
1               5

<210> SEQ ID NO 35
<211> LENGTH: 16
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab033 VH-CDR2

<400> SEQUENCE: 35

Ile Asp Pro Ala Asn Gly Asp Thr Gln Tyr Asp Pro Lys Phe Gln Gly
1               5                   10                  15

<210> SEQ ID NO 36
<211> LENGTH: 12
<212> TYPE: PRT
<213> ORGANISM: Artificial sequence

```
<220> FEATURE:
<223> OTHER INFORMATION: synthesized
<220> FEATURE:
<221> NAME/KEY: misc_feature
<223> OTHER INFORMATION: Mab033 VH-CDR3

<400> SEQUENCE: 36

Tyr Gly Asp Tyr Leu Phe Tyr Tyr Ser Leu Lys Tyr
1               5                   10

<210> SEQ ID NO 37
<211> LENGTH: 112
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab033 VL

<400> SEQUENCE: 37

Asp Ile Val Met Thr Gln Ala Ala Pro Ser Val Ser Val Thr Pro Gly
1               5                   10                  15

Glu Ser Val Ser Ile Ser Cys Arg Ser Ser Lys Ser Leu Leu His Ser
            20                  25                  30

Asn Gly Asn Thr Tyr Leu Tyr Trp Phe Leu Gln Arg Pro Gly Gln Ser
        35                  40                  45

Pro Gln Leu Leu Ile Tyr Arg Met Ser Asn Leu Ala Ser Gly Val Pro
    50                  55                  60

Asp Arg Phe Ser Gly Ser Gly Ser Gly Thr Ala Phe Thr Leu Arg Ile
65                  70                  75                  80

Ser Arg Val Glu Ala Glu Asp Val Gly Val Tyr Tyr Cys Met Gln His
                85                  90                  95

Leu Glu Ser Pro Tyr Thr Phe Gly Gly Gly Thr Lys Leu Glu Ile Lys
            100                 105                 110

<210> SEQ ID NO 38
<211> LENGTH: 16
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab033 VL-CDR1

<400> SEQUENCE: 38

Arg Ser Ser Lys Ser Leu Leu His Ser Asn Gly Asn Thr Tyr Leu Tyr
1               5                   10                  15

<210> SEQ ID NO 39
<211> LENGTH: 7
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab033 VL-CDR2

<400> SEQUENCE: 39

Arg Met Ser Asn Leu Ala Ser
1               5

<210> SEQ ID NO 40
```

```
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab033 VL-CDR3

<400> SEQUENCE: 40

Met Gln His Leu Glu Ser Pro Tyr Thr
1               5

<210> SEQ ID NO 41
<211> LENGTH: 121
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab036 VH

<400> SEQUENCE: 41

Glu Val Gln Leu Gln Gln Ser Val Ala Glu Leu Val Arg Pro Gly Ala
1               5                   10                  15

Ser Val Lys Leu Ser Cys Thr Ala Ser Gly Phe Asn Ile Glu Asn Thr
            20                  25                  30

Phe Met His Trp Leu Lys Gln Arg Pro Glu Gln Gly Leu Glu Trp Ile
        35                  40                  45

Gly Arg Ile Asp Pro Ala Asn Gly Asn Thr Gln Tyr Ala Pro Lys Phe
    50                  55                  60

Gln Gly Lys Ala Thr Ile Thr Ala Asp Thr Ser Ser Asn Thr Ala Tyr
65                  70                  75                  80

Leu Gln Leu Ser Arg Leu Thr Ser Glu Asp Thr Ala Ile Tyr Tyr Cys
                85                  90                  95

Ala Arg Tyr Gly Asn Tyr Leu Phe Tyr Tyr Ser Met Asp Tyr Trp Gly
            100                 105                 110

Gln Gly Thr Ser Val Thr Val Ser Ser
        115                 120

<210> SEQ ID NO 42
<211> LENGTH: 5
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab036 VH-CDR1

<400> SEQUENCE: 42

Asn Thr Phe Met His
1               5

<210> SEQ ID NO 43
<211> LENGTH: 16
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab036 VH-CDR2

<400> SEQUENCE: 43
```

Ile Asp Pro Ala Asn Gly Asn Thr Gln Tyr Ala Pro Lys Phe Gln Gly
1               5                   10                  15

<210> SEQ ID NO 44
<211> LENGTH: 12
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab036 VH-CDR3

<400> SEQUENCE: 44

Tyr Gly Asn Tyr Leu Phe Tyr Tyr Ser Met Asp Tyr
1               5                   10

<210> SEQ ID NO 45
<211> LENGTH: 112
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab036 VL

<400> SEQUENCE: 45

Asp Ile Val Met Thr Gln Ala Ala Pro Ser Leu Pro Val Thr Pro Gly
1               5                   10                  15

Glu Ser Val Ser Ile Ser Cys Arg Ser Ser Gln Ser Leu Leu His Ser
            20                  25                  30

Asn Gly Asn Thr Tyr Leu Tyr Trp Phe Leu Gln Arg Pro Gly Gln Ser
        35                  40                  45

Pro Gln Leu Leu Ile Tyr Arg Met Ser Asn Leu Ala Ser Gly Val Pro
    50                  55                  60

Asp Arg Phe Ser Gly Ser Gly Ser Gly Thr Ala Phe Thr Leu Arg Ile
65                  70                  75                  80

Ser Arg Val Glu Ala Glu Asp Val Gly Val Tyr Tyr Cys Met Gln His
                85                  90                  95

Leu Glu Tyr Pro Tyr Thr Phe Gly Gly Gly Thr Lys Leu Glu Ile Lys
            100                 105                 110

<210> SEQ ID NO 46
<211> LENGTH: 16
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab036 VL-CDR1

<400> SEQUENCE: 46

Arg Ser Ser Gln Ser Leu Leu His Ser Asn Gly Asn Thr Tyr Leu Tyr
1               5                   10                  15

<210> SEQ ID NO 47
<211> LENGTH: 7
<212> TYPE: PRT
<213> ORGANISM: Artificial sequence
<220> FEATURE:
<223> OTHER INFORMATION: synthesized
<220> FEATURE:
<221> NAME/KEY: misc_feature

```
<223> OTHER INFORMATION: Mab036 VL-CDR2

<400> SEQUENCE: 47

Arg Met Ser Asn Leu Ala Ser
1               5

<210> SEQ ID NO 48
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab036 VL-CDR3

<400> SEQUENCE: 48

Met Gln His Leu Glu Tyr Pro Tyr Thr
1               5

<210> SEQ ID NO 49
<211> LENGTH: 120
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 2F10 VH

<400> SEQUENCE: 49

Gln Val Gln Leu Gln Gln Ser Val Ala Glu Leu Val Arg Pro Gly Ala
1               5                   10                  15

Ser Val Lys Leu Ser Cys Thr Ala Ser Gly Phe Asn Ile Lys Asn Ala
            20                  25                  30

Tyr Val His Trp Val Lys Gln Arg Pro Glu Gln Gly Leu Glu Trp Ile
        35                  40                  45

Gly Gln Ile Asp Pro Ala Asn Gly Asn Thr Lys Tyr Ala Pro Lys Phe
    50                  55                  60

Gln Ala Lys Ala Thr Ile Thr Ala Asp Thr Ser Ser Asn Thr Val Tyr
65                  70                  75                  80

Leu Gln Leu Ser Ser Leu Thr Ser Glu Asp Thr Ala Val Tyr Tyr Cys
                85                  90                  95

Ala Arg Ser Tyr Leu Gly Gly Gln Tyr Tyr Phe Asp Tyr Ser Gly Gln
            100                 105                 110

Gly Thr Thr Leu Thr Val Ser Ser
        115                 120

<210> SEQ ID NO 50
<211> LENGTH: 5
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 2F10 VH-CDR1

<400> SEQUENCE: 50

Asn Ala Tyr Val His
1               5

<210> SEQ ID NO 51
<211> LENGTH: 16
```

```
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 2F10 VH-CDR2

<400> SEQUENCE: 51

Ile Asp Pro Ala Asn Gly Asn Thr Lys Tyr Ala Pro Lys Phe Gln Ala
1               5                   10                  15

<210> SEQ ID NO 52
<211> LENGTH: 11
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 2F10 VH-CDR3

<400> SEQUENCE: 52

Ser Tyr Leu Gly Gly Gln Tyr Tyr Phe Asp Tyr
1               5                   10

<210> SEQ ID NO 53
<211> LENGTH: 107
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 2F10 VL

<400> SEQUENCE: 53

Asp Ile Leu Met Thr Gln Ser Pro Ser Ser Met Tyr Ala Ser Leu Gly
1               5                   10                  15

Glu Arg Val Thr Ile Thr Cys Lys Ala Ser Gln Asp Ile Asn Ser Tyr
            20                  25                  30

Leu Ser Trp Phe Gln Gln Lys Pro Gly Lys Ser Pro Lys Thr Leu Ile
        35                  40                  45

Tyr Arg Ala Asn Arg Leu Val Asp Gly Val Pro Ser Arg Phe Ser Gly
    50                  55                  60

Ser Gly Ser Gly Gln Asp Tyr Ser Leu Thr Ile Ser Ser Leu Glu Tyr
65                  70                  75                  80

Glu Asp Met Gly Ile Tyr Tyr Cys Leu Gln Tyr Asp Glu Phe Pro Leu
                85                  90                  95

Thr Phe Gly Ala Gly Thr Lys Leu Glu Ile Lys
            100                 105

<210> SEQ ID NO 54
<211> LENGTH: 11
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 2F10 VL-CDR1

<400> SEQUENCE: 54

Lys Ala Ser Gln Asp Ile Asn Ser Tyr Leu Ser
1               5                   10
```

<210> SEQ ID NO 55
<211> LENGTH: 7
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 2F10 VL-CDR2

<400> SEQUENCE: 55

Arg Ala Asn Arg Leu Val Asp
1               5

<210> SEQ ID NO 56
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 2F10 VL-CDR3

<400> SEQUENCE: 56

Leu Gln Tyr Asp Glu Phe Pro Leu Thr
1               5

<210> SEQ ID NO 57
<211> LENGTH: 119
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 9B10 VH

<400> SEQUENCE: 57

Gln Val Gln Leu Gln Gln Ser Val Ala Glu Leu Val Arg Pro Gly Ala
1               5                   10                  15

Ser Val Lys Leu Ser Cys Thr Ala Ser Gly Phe Asn Ile Gln Asn Thr
            20                  25                  30

Tyr Met His Trp Val Lys Gln Arg Pro Glu Gln Gly Leu Glu Trp Ile
        35                  40                  45

Gly Arg Ile Asp Pro Ala Asn Gly Asn Ile Lys Tyr Ala Pro Lys Phe
    50                  55                  60

Gln Gly Lys Ala Thr Ile Thr Ala Asp Thr Ser Ser Asn Thr Ala Tyr
65                  70                  75                  80

Leu Gln Leu Ser Ser Leu Thr Ser Glu Asp Thr Ala Ile Tyr Tyr Cys
                85                  90                  95

Ala Ile Tyr Tyr Asp Phe Gly Arg Ala Phe Ala Tyr Trp Gly Gln Gly
            100                 105                 110

Thr Leu Val Thr Val Ser Ala
        115

<210> SEQ ID NO 58
<211> LENGTH: 5
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 9B10 VH-CDR1

<400> SEQUENCE: 58

Asn Thr Tyr Met His
1               5

<210> SEQ ID NO 59
<211> LENGTH: 16
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 9B10 VH-CDR2

<400> SEQUENCE: 59

Ile Asp Pro Ala Asn Gly Asn Ile Lys Tyr Ala Pro Lys Phe Gln Gly
1               5                   10                  15

<210> SEQ ID NO 60
<211> LENGTH: 10
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 9B10 VH-CDR3

<400> SEQUENCE: 60

Tyr Tyr Asp Phe Gly Arg Ala Phe Ala Tyr
1               5                   10

<210> SEQ ID NO 61
<211> LENGTH: 107
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 9B10 VL

<400> SEQUENCE: 61

Asp Ile Val Met Thr Gln Ser Pro Ser Ser Met Tyr Ala Ser Leu Gly
1               5                   10                  15

Glu Arg Val Thr Ile Thr Cys Lys Ala Ser Gln Asp Ile Asn Ser Tyr
                20                  25                  30

Leu Ser Trp Phe Gln Gln Lys Pro Gly Lys Ser Pro Lys Thr Leu Ile
            35                  40                  45

Tyr Arg Ala Asn Arg Leu Val Asp Gly Val Pro Ser Arg Phe Ser Gly
    50                  55                  60

Ser Gly Ser Gly Gln Asp Tyr Ser Leu Thr Ile Ser Ser Leu Glu Tyr
65                  70                  75                  80

Glu Asp Met Gly Ile Tyr Tyr Cys Leu Gln Tyr Asp Glu Phe Pro Phe
                85                  90                  95

Thr Phe Gly Ser Gly Thr Lys Leu Glu Ile Lys
            100                 105

<210> SEQ ID NO 62
<211> LENGTH: 11
<212> TYPE: PRT
<213> ORGANISM: Artificial sequence
<220> FEATURE:
<223> OTHER INFORMATION: synthesized

```
<220> FEATURE:
<221> NAME/KEY: misc_feature
<223> OTHER INFORMATION: 9B10 VL-CDR1

<400> SEQUENCE: 62

Lys Ala Ser Gln Asp Ile Asn Ser Tyr Leu Ser
1               5                   10

<210> SEQ ID NO 63
<211> LENGTH: 7
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 9B10 VL-CDR2

<400> SEQUENCE: 63

Arg Ala Asn Arg Leu Val Asp
1               5

<210> SEQ ID NO 64
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 9B10 VL-CDR3

<400> SEQUENCE: 64

Leu Gln Tyr Asp Glu Phe Pro Phe Thr
1               5

<210> SEQ ID NO 65
<211> LENGTH: 120
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 14G3 VH

<400> SEQUENCE: 65

Glu Val Gln Leu Gln Gln Ser Val Ala Glu Leu Val Arg Pro Gly Ala
1               5                   10                  15

Ser Val Lys Leu Ser Cys Thr Ala Ser Gly Phe Asn Ile Lys Asn Ala
                20                  25                  30

Tyr Val His Trp Val Lys Gln Arg Pro Glu Gln Gly Leu Glu Trp Ile
            35                  40                  45

Gly Gln Ile Asp Pro Ala Asn Gly Asn Thr Lys Tyr Ala Pro Lys Phe
        50                  55                  60

Gln Ala Lys Ala Thr Ile Thr Ala Asp Thr Ser Ser Asn Thr Val Tyr
65                  70                  75                  80

Leu Gln Leu Ser Ser Leu Thr Ser Glu Asp Thr Ala Val Tyr Tyr Cys
                85                  90                  95

Ala Arg Ser Tyr Leu Gly Gly Gln Tyr Tyr Phe Asp Tyr Ser Gly Gln
            100                 105                 110

Gly Thr Thr Leu Thr Val Ser Ser
        115                 120
```

-continued

```
<210> SEQ ID NO 66
<211> LENGTH: 5
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 14G3 VH-CDR1

<400> SEQUENCE: 66

Asn Ala Tyr Val His
1               5

<210> SEQ ID NO 67
<211> LENGTH: 16
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 14G3 VH-CDR2

<400> SEQUENCE: 67

Ile Asp Pro Ala Asn Gly Asn Thr Lys Tyr Ala Pro Lys Phe Gln Ala
1               5                   10                  15

<210> SEQ ID NO 68
<211> LENGTH: 11
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 14G3 VH-CDR3

<400> SEQUENCE: 68

Ser Tyr Leu Gly Gly Gln Tyr Tyr Phe Asp Tyr
1               5                   10

<210> SEQ ID NO 69
<211> LENGTH: 112
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 14G3 VL

<400> SEQUENCE: 69

Asp Ile Val Met Thr Gln Ser Ala Phe Ser Asn Pro Val Thr Leu Gly
1               5                   10                  15

Thr Ser Ala Ser Ile Ser Cys Arg Ser Lys Ser Leu Leu His Ser
            20                  25                  30

Asn Gly Ile Thr Tyr Leu Tyr Trp Tyr Leu Gln Lys Pro Gly Gln Ser
        35                  40                  45

Pro Gln Leu Leu Ile Tyr Gln Met Ser Asn Leu Ala Ser Gly Val Pro
    50                  55                  60

Asp Arg Phe Ser Ser Ser Gly Ser Gly Thr Asp Phe Thr Leu Arg Ile
65                  70                  75                  80

Ser Arg Val Glu Ala Glu Asp Val Gly Val Tyr Tyr Cys Met Gln His
                85                  90                  95

Leu Glu Tyr Pro Phe Thr Phe Gly Ala Gly Thr Lys Leu Glu Ile Lys
```

<210> SEQ ID NO 70
<211> LENGTH: 16
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 14G3 VL-CDR1

<400> SEQUENCE: 70

Arg Ser Ser Lys Ser Leu Leu His Ser Asn Gly Ile Thr Tyr Leu Tyr
1               5                   10                  15

<210> SEQ ID NO 71
<211> LENGTH: 7
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 14G3 VL-CDR2

<400> SEQUENCE: 71

Gln Met Ser Asn Leu Ala Ser
1               5

<210> SEQ ID NO 72
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 14G3 VL-CDR3

<400> SEQUENCE: 72

Met Gln His Leu Glu Tyr Pro Phe Thr
1               5

<210> SEQ ID NO 73
<211> LENGTH: 364
<212> TYPE: DNA
<213> ORGANISM: Artificial sequence
<220> FEATURE:
<223> OTHER INFORMATION: synthesized
<220> FEATURE:
<221> NAME/KEY: misc_feature
<223> OTHER INFORMATION: M15-5 VH

<400> SEQUENCE: 73
caggtgcagc tggtgcagag cggcgccgaa gtgaagaaac ccggcgccag cgtgaaggtg      60
agctgcaagg ccagcggctt caatatccag aacacctaca tccactgggt gaagcaagcc     120
cctggccagg gcctggagtg gatcggcaag atcgaccccg ccaacgccga caccaagtac     180
gcccccacct tccagggcag agccaccatc accgccgaca ccagcaccaa caccgcctac     240
ctggagctga gcagcctgag gagcgaggac accgccgtgt actactgcgc caggtacagg     300
gactacctgt tctactatgc cctgggctac tggggccagg gcacaaccgt gaccgtgagc     360
agcc                                                                 364

<210> SEQ ID NO 74

```
<211> LENGTH: 337
<212> TYPE: DNA
<213> ORGANISM: Artificial sequence
<220> FEATURE:
<223> OTHER INFORMATION: synthesized
<220> FEATURE:
<221> NAME/KEY: misc_feature
<223> OTHER INFORMATION: M15-5 VL

<400> SEQUENCE: 74
gacatcgtga tgacccagag ccctctgagc ctgcctgtga cccctggaga gcctgccagc      60
atcagctgca ggagcagcaa aagcctgctg cacagcaacg ccaacaccta cctgtactgg     120
tacctgcaga agcccggaca gagcccccag ctgctgatct acaggatgag caacctggcc     180
agcggcgtgc ctgataggtt tagcggcagc ggcagcggaa ccgacttcac cctgaagatc     240
agcagagtgg aggccgagga cgtgggcgtg tactactgca tgcagcacct ggagtacccc     300
tacaccttcg gccagggaac caagctggag atcaagg                              337

<210> SEQ ID NO 75
<211> LENGTH: 363
<212> TYPE: DNA
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mpb416 VH

<400> SEQUENCE: 75
caggttcagc ttcagcagtc tgtggcagag cttgtgaggc caggggcctc agtcaaattg      60
tcctgcacag cttctggctt caacattcaa aacacctata tacactgggt gaagcagagg     120
cctgaacagg gcctggaatg gattggaaag attgatcctg cgaatggtga tactaaatat     180
gccccgacgt tccagggcaa ggccactata actgcagaca catcctccaa cacagcctac     240
ctgcagctca gcagcctaac acctgaggac actgccatct attactgtgc tagataccgt     300
gactacctat tttactatgc tttgggctac tggggtcaag gaacctcagt caccgtctcc     360
tcg                                                                   363

<210> SEQ ID NO 76
<211> LENGTH: 336
<212> TYPE: DNA
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mpb416 VL

<400> SEQUENCE: 76
gacattgtga tgacgcagtc tgcaccctct gtacctgtca ctcctggaga gtcagtatcc      60
atctcctgca ggtctagtaa gagtctcctg catagtaatg caacacttaa cttgtattgg     120
ttcctgcaga ggccaggcca gtctcctcag ctcctgatat atcggatgtc aaccttgcc      180 tcaggagtcc cagacaggtt cagtggcagt gggtcaggaa ctgctttcac actgagaatc     240
agtagagtgg aggctgagga tgtgggtgtt tattactgta tgcaacatct agaatatccg     300
tacacgttcg gaggggggac caagctggaa atcaaa                               336

<210> SEQ ID NO 77
<211> LENGTH: 363
<212> TYPE: DNA
```

<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab031 VH

<400> SEQUENCE: 77

```
gaggttcagc tgcagcagtc tgtggcagag cttgtgaggc caggggcctc agtcaggttg      60
tcctgcacag gttctggctt caacattcaa aacacatata ttcactgggt gaaacagagg     120
cctgaacagg gcctggagtg gattggaagg attgatcctg cgaatggtga tactaaatat     180
gccccgaagt tccagggcaa ggccactata actgcagaca catcctccaa cacagcctac     240
ctgcagctca gcagcctgac atctgaggac actgccatct attactgtac tagatatggt     300
aactacttat attactatag tttggactac tggggtcaag gaacctcagt caccgtctcc     360
tca                                                                    363
```

<210> SEQ ID NO 78
<211> LENGTH: 336
<212> TYPE: DNA
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab031 VL

<400> SEQUENCE: 78

```
gatattgtga tgactcaggc tgcaccctct gtacctgtca ctcctggaga gtctgtatcc      60
atctcctgca ggtctagtaa gagtctcctg catagtaatg caacactta  cttgtattgg     120
ttcctgcaga ggccaggcca gtctcctcag ctcctgatat atcggatgtc caaccttgcc     180
tcaggagtcc cagacaggtt cagtggcagt gggtcaggaa ctgctttcac actgagaatc     240
agtagagtgg aggctgagga tatgggtgtt tattactgta tgcaacatct agaatatccg     300
tacacgttcg gagggggac caagctggaa ataaag                                336
```

<210> SEQ ID NO 79
<211> LENGTH: 363
<212> TYPE: DNA
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab032 VH

<400> SEQUENCE: 79

```
gaggttcagc tgcagcagtc tgtggcagag cttgtgaggc caggggcctc agtcaggttg      60
tcctgcacag gttctggctt caacattgaa aacacctata tgcactggct gaaacagagg     120
cctgaacagg gcctggagtg gattggaagg attgatcctg cggatggtga tactcaatat     180
gccccgaagt tccagggcaa ggccactata actacagaca catcctccaa cacagcctac     240
ctgcagctca gcagcctgac atctgaggac actgccattt attactgtgc tagatatggt     300
aactacttat tttactattc tatggactac tggggtcaag gaacctcagt caccgtctcc     360
tca                                                                    363
```

<210> SEQ ID NO 80
<211> LENGTH: 336
<212> TYPE: DNA

```
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab032 VL

<400> SEQUENCE: 80
gatattgtga tgactcaggc tgcaccctct gtacctgtca ctcctggaga gtcagtatcc    60
atctcctgca ggtctagtaa gagtctcctg catagtaatg caacactta cttgtattgg   120 ttcctgcaga ggccaggcca gtctcctcag ctcctgatat atcggatgtc caaccttgcc   180
tcaggagtcc cagacaggtt cagtggcagt gggtcagcaa ctgctttcac actgagaatc   240
agtagagtgg aggctgagga tgtgggtatt tattactgta tgcaacatct agaatatccg   300
tacacgttcg gaggggggac caagctggaa ataaaa                             336

<210> SEQ ID NO 81
<211> LENGTH: 363
<212> TYPE: DNA
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab033 VH

<400> SEQUENCE: 81
gaggttcagc tgcagcagtc tgtggcagaa tttgtgaggc caggggcctc agtcaggttg    60
tcctgcacag cttctggctt caacattgaa aacaccttata cactggct gaaacagagg    120 cctgaacagg gcctggagtg gattggaagg attgatccag cgaatggtga tactcaatat   180
gacccgaagt tccagggcaa ggccactttg actgcagcca catcctccaa cacagcctac   240
ctgcagctca gcggcctgac atctgaagac acagccatct attattgtac tagatatggt   300
gactatttat tttactattc tctgaagtac tggggtcaag gaacctcagt caccgtctcc   360
tca                                                                 363

<210> SEQ ID NO 82
<211> LENGTH: 336
<212> TYPE: DNA
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab033 VL

<400> SEQUENCE: 82
gatattgtga tgactcaggc tgcaccctct gtatctgtca ctcctggaga gtcagtatcc    60
atctcctgca ggtctagtaa gagtctcctg catagtaatg caacactta cttgtattgg   120 ttcctgcaga ggccaggcca gtctcctcag ctcctgatat atcggatgtc caaccttgcc   180
tcaggagtcc cagacaggtt cagtggcagt gggtcaggaa ctgctttcac actgagaatc   240
agtcgagtgg aggctgagga tgtgggtgtt tattactgta tgcaacatct agagtctccg   300
tacacgttcg gaggggggac caagctggaa ataaaa                             336

<210> SEQ ID NO 83
<211> LENGTH: 363
<212> TYPE: DNA
<213> ORGANISM: Artificial sequence
<220> FEATURE:
```

<223> OTHER INFORMATION: synthesized
<220> FEATURE:
<221> NAME/KEY: misc_feature
<223> OTHER INFORMATION: Mab036 VH

<400> SEQUENCE: 83

```
gaggttcagc tgcagcagtc tgtggcagag cttgtgaggc caggggcctc agtcaagttg      60
tcctgcacag cttctggctt caacattgaa aacacctttta tgcactggct gaagcagagg     120
cctgaacagg gcctggagtg gattggaagg attgatcctg cgaatggtaa tactcaatat     180
gccccgaagt tccagggcaa ggccactata actgcagaca catcctccaa cacagcctac     240
ctgcagctca gcagactgac atctgaggac actgccatct attactgtgc tagatatggt     300
aactacttat tttactattc tatggactac tggggtcaag gaacctcagt caccgtctcc     360
tca                                                                    363
```

<210> SEQ ID NO 84
<211> LENGTH: 336
<212> TYPE: DNA
<213> ORGANISM: Artificial sequence
<220> FEATURE:
<223> OTHER INFORMATION: synthesized
<220> FEATURE:
<221> NAME/KEY: misc_feature
<223> OTHER INFORMATION: Mab036 VL

<400> SEQUENCE: 84

```
gatattgtga tgactcaggc tgcaccctct ttacctgtca ctcctggaga gtcagtatcc      60
atctcctgca ggtctagtca gagtctcctg catagtaatg caacactta cttgtattgg      120 ttcctgcaga ggccaggcca gtctcctcag ctcctgatat atcggatgtc caaccttgcc     180
tcaggagtcc cagacaggtt cagtggcagt gggtcaggaa ctgctttcac actgagaatc     240
agtagagtgg aggctgagga tgtgggtgtt tattactgta tgcaacatct agaatatccg     300
tacacgttcg gaggggggac caagctggaa ataaaa                               336
```

<210> SEQ ID NO 85
<211> LENGTH: 360
<212> TYPE: DNA
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 2F10 VH

<400> SEQUENCE: 85

```
caggtccagc tgcagcagtc tgtggcagag cttgtgaggc caggggcctc agtcaagttg      60
tcctgcacag cttctggctt caacattaaa aacgcctatg tccactgggt gaagcagagg     120
cctgaacagg gcctggagtg gattggacag attgatcctg cgaatggtaa tactaaatat     180
gccccgaagt tccaggccaa ggccactata actgcagaca catcctccaa cacagtctac     240
ctgcaactca gcagcctgac atctgaggac actgccgtct attactgtgc tagatcctat     300
cttggtggcc agtactactt tgactactcg ggccaaggca ccactctcac agtctcctcg     360
```

<210> SEQ ID NO 86
<211> LENGTH: 321
<212> TYPE: DNA
<213> ORGANISM: Artificial sequence
<220> FEATURE:
<223> OTHER INFORMATION: synthesized
<220> FEATURE:

```
<221> NAME/KEY: misc_feature
<223> OTHER INFORMATION: 2F10 VL

<400> SEQUENCE: 86
gacattctga tgacccagtc tccatcttcc atgtatgcat ctctaggaga gagagtcact      60
atcacttgca aggcgagtca ggacattaat agctatttaa gctggttcca gcagaaacca     120
gggaaatctc ctaagaccct gatctatcgt gcaaacagat tggtagatgg ggtcccatca     180
aggttcagtg gcagtggatc tgggcaagat tattctctca ccatcagcag cctggaatat     240
gaagatatgg gaatttatta ttgtctacag tatgatgagt tcccgctcac gttcggtgct     300
gggaccaagc tggaaataaa a                                               321

<210> SEQ ID NO 87
<211> LENGTH: 357
<212> TYPE: DNA
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 9B10 VH

<400> SEQUENCE: 87
caggttcagc tgcagcagtc tgtggcagag cttgtgaggc caggggcctc agtcaagttg      60
tcctgcacag cttctggctt caacattaa  aacacctata tgcactgggt gaagcagagg     120
cctgaacagg gcctggagtg gattggaagg attgatcctg cgaatggtaa tattaaatat     180
gccccgaagt tccagggcaa ggccactata actgcagaca catcctccaa tacagcctac     240
ctgcagctca gcagcctgac atctgaagac actgccatct attactgtgc tatctactat     300
gatttcggca gggcctttgc ttactggggc caagggactc tggtcactgt ctctgcg       357

<210> SEQ ID NO 88
<211> LENGTH: 321
<212> TYPE: DNA
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 9B10 VL

<400> SEQUENCE: 88
gatattgtga tgacccagtc tccatcttcc atgtatgcat ctctaggaga gagagtcact      60
atcacttgca aggcgagtca ggacattaat agctatttaa gctggttcca gcagaaacca     120
gggaaatctc ctaagaccct gatctatcgt gcaaacagat tggtagatgg ggtcccatca     180
aggttcagtg gcagtggatc tgggcaagat tattctctca ccatcagcag cctggagtat     240
gaagatatgg gaatttatta ttgtctacag tatgatgagt ttccattcac gttcggctcg     300
gggacaaagt tggaaataaa a                                               321

<210> SEQ ID NO 89
<211> LENGTH: 360
<212> TYPE: DNA
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 14G3 VH

<400> SEQUENCE: 89
```

-continued

```
gaggtccagc tgcagcagtc tgtggcagag cttgtgaggc caggggcctc agtcaagttg      60
tcctgcacag cctctggctt caacattaaa aacgcctatg tccactgggt gaagcagagg     120
cctgaacagg gcctggagtg gattggacag attgatcctg cgaatggtaa tactaaatat     180
gccccgaagt tccaggccaa ggccactata actgcagaca catcctccaa cacagtctac     240
ctgcaactca gcagcctgac atctgaggac actgccgtct attactgtgc taggtcctat     300
cttggtggcc agtactactt tgactactcg ggccaaggca ccactctcac agtctcctcg     360
```

<210> SEQ ID NO 90
<211> LENGTH: 336
<212> TYPE: DNA
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 14G3 VL

<400> SEQUENCE: 90

```
gatattgtga tgactcagtc tgcattctcc aatccagtca ctcttggaac atcagcttcc      60
atctcctgca ggtctagtaa gagtctccta catagtaatg gcatcactta tttgtattgg     120
tatctgcaga agccaggcca gtctcctcag ctcctgattt atcagatgtc caaccttgcc     180
tcaggagtcc cagacaggtt cagtagcagt gggtcaggaa ctgatttcac actgagaatc     240
agcagagtgg aggctgagga tgtgggtgtt tattactgta tgcaacatct agaatatcct     300
ttcacgttcg gtgctgggac caagctggaa ataaaa                                336
```

<210> SEQ ID NO 91
<211> LENGTH: 140
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: NKG2A ECD

<400> SEQUENCE: 91

```
Pro Ser Thr Leu Ile Gln Arg His Asn Asn Ser Ser Leu Asn Thr Arg
1               5                   10                  15

Thr Gln Lys Ala Arg His Cys Gly His Cys Pro Glu Glu Trp Ile Thr
            20                  25                  30

Tyr Ser Asn Ser Cys Tyr Tyr Ile Gly Lys Glu Arg Arg Thr Trp Glu
        35                  40                  45

Glu Ser Leu Leu Ala Cys Thr Ser Lys Asn Ser Ser Leu Leu Ser Ile
    50                  55                  60

Asp Asn Glu Glu Glu Met Lys Phe Leu Ser Ile Ile Ser Pro Ser Ser
65                  70                  75                  80

Trp Ile Gly Val Phe Arg Asn Ser Ser His His Pro Trp Val Thr Met
                85                  90                  95

Asn Gly Leu Ala Phe Lys His Glu Ile Lys Asp Ser Asp Asn Ala Glu
            100                 105                 110

Leu Asn Cys Ala Val Leu Gln Val Asn Arg Leu Lys Ser Ala Gln Cys
        115                 120                 125

Gly Ser Ser Ile Ile Tyr His Cys Lys His Lys Leu
    130                 135                 140
```

```
<210> SEQ ID NO 92
<211> LENGTH: 148
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: CD94 ECD

<400> SEQUENCE: 92

Lys Asn Ser Phe Thr Lys Leu Ser Ile Glu Pro Ala Phe Thr Pro Gly
1               5                   10                  15

Pro Asn Ile Glu Leu Gln Lys Asp Ser Asp Cys Cys Ser Cys Gln Glu
            20                  25                  30

Lys Trp Val Gly Tyr Arg Cys Asn Cys Tyr Phe Ile Ser Ser Glu Gln
        35                  40                  45

Lys Thr Trp Asn Glu Ser Arg His Leu Cys Ala Ser Gln Lys Ser Ser
    50                  55                  60

Leu Leu Gln Leu Gln Asn Thr Asp Glu Leu Asp Phe Met Ser Ser Ser
65                  70                  75                  80

Gln Gln Phe Tyr Trp Ile Gly Leu Ser Tyr Ser Glu Glu His Thr Ala
                85                  90                  95

Trp Leu Trp Glu Asn Gly Ser Ala Leu Ser Gln Tyr Leu Phe Pro Ser
            100                 105                 110

Phe Glu Thr Phe Asn Thr Lys Asn Cys Ile Ala Tyr Asn Pro Asn Gly
        115                 120                 125

Asn Ala Leu Asp Glu Ser Cys Glu Asp Lys Asn Arg Tyr Ile Cys Lys
    130                 135                 140

Gln Gln Leu Ile
145

<210> SEQ ID NO 93
<211> LENGTH: 702
<212> TYPE: DNA
<213> ORGANISM: Artificial sequence
<220> FEATURE:
<223> OTHER INFORMATION: synthesized
<220> FEATURE:
<221> NAME/KEY: misc_feature
<223> OTHER INFORMATION: NKG2A full length nucleic acid

<400> SEQUENCE: 93
atggataacc aaggagtaat ctactcagac ctgaatctgc ccccaaaccc aaagaggcag      60
caacgaaaac ctaaaggcaa taaaagctcc attttagcaa ctgaacagga ataacctat     120 gcggaattaa accttcaaaa agcttctcag gatttcaag ggaatgacaa aacctatcac     180
tgcaaagatt taccatcagc tccagagaag ctcattgttg ggatcctggg aattatctgt     240
cttatcttaa tggcctctgt ggtaacgata gttgttattc cctctacatt aatacagagg     300
cacaacaatt cttccctgaa tacaagaact cagaaagcac gtcattgtgg ccattgtcct     360
gaggagtgga ttacatattc aacagttgt tactacattg gtaaggaaag aagaacttgg     420
gaagagagtt tgctggcctg tacttcgaag aactccagtc tgctttctat agataatgaa     480
gaagaaatga aatttctgtc catcatttca ccatcctcat ggattggtgt gtttcgtaac     540
agcagtcatc atccatgggt gacaatgaat ggtttggctt tcaaacatga gataaaagac     600
tcagataatg ctgaacttaa ctgtgcagtg ctacaagtaa atcgacttaa atcagcccag     660
tgtggatctt caataatata tcattgtaag cataagcttt ag                         702
```

<210> SEQ ID NO 94
<211> LENGTH: 447
<212> TYPE: DNA
<213> ORGANISM: Artificial sequence
<220> FEATURE:
<223> OTHER INFORMATION: synthesized
<220> FEATURE:
<221> NAME/KEY: misc_feature
<223> OTHER INFORMATION: CD94 full length nucleic acid

<400> SEQUENCE: 94

```
atggcagctt ttactaaact gagtattgag ccagcattta ctccaggacc caacatagaa      60
ctccagaaag actctgactg ctgttcttgc caagaaaaat gggttgggta ccggtgcaac     120
tgttacttca tttccagtga acagaaaact tggaacgaaa gtcggcatct ctgtgcttct     180
cagaaatcca gcctgcttca gcttcaaaac acagatgaac tggattttat gagctccagt     240
caacaatttt actggattgg actctcttac agtgaggagc acaccgcctg ttgtgggag     300
aatggctctg cactctccca gtatctattt ccatcatttg aaactttta tacaaagaac     360
tgcatagcgt ataatccaaa tggaaatgct ttagatgaat cctgtgaaga taaaaatcgt     420
tatatctgta agcaacagct catttaa                                          447
```

<210> SEQ ID NO 95
<211> LENGTH: 233
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: cyno NKG2A full length amino acid sequence

<400> SEQUENCE: 95

```
Met Asp Asn Gln Gly Val Ile Tyr Ser Asp Leu Asn Leu Pro Pro Asn
 1               5                  10                  15

Gln Lys Arg Gln Gln Lys Pro Lys Gly Asn Ser Arg Ser Thr Leu
            20                  25                  30

Val Ile Glu Gln Glu Ile Thr Tyr Ala Glu Leu Asn Leu Gln Lys Thr
        35                  40                  45

Ser Gln Asp Phe Gln Gly Asn Asp Lys Thr Asn His Cys Lys Asp Leu
    50                  55                  60

Pro Ser Ala Pro Glu Lys Leu Ile Ala Gly Ile Leu Gly Ile Ile Cys
65                  70                  75                  80

Leu Val Leu Met Ala Ser Val Val Thr Ile Val Val Ile Pro Ser Thr
                85                  90                  95

Leu Thr Gln Lys His Asn Asn Ser Ser Leu Asn Thr Arg Thr Gln Lys
            100                 105                 110

Ala Arg His Cys Gly His Cys Pro Lys Glu Trp Ile Thr Tyr Ser Asn
        115                 120                 125

Ser Cys Tyr Tyr Ile Gly Lys Glu Lys Arg Thr Trp Ala Glu Ser Leu
    130                 135                 140

Leu Ala Cys Thr Ser Lys Asn Ser Ser Leu Leu Ser Ile Asp Asn Glu
145                 150                 155                 160

Glu Glu Met Lys Phe Leu Thr Ala Ile Leu Ser Ser Trp Ile Asp
                165                 170                 175

Val Phe Arg Asp Ser Ser His His Pro Trp Val Thr Ile Asn Gly Leu
            180                 185                 190

Thr Phe Lys His Glu Ile Lys Asp Ser Asp Asn Ala Glu His Asn Cys
```

```
                195                 200                 205
Ala Met Leu His Ala Arg Gly Leu Lys Ser Asp Glu Cys Gly Ser Ser
    210                 215                 220

Lys Ile Tyr His Cys Lys His Lys Leu
225                 230
```

<210> SEQ ID NO 96
<211> LENGTH: 179
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: cyno CD94 full length amino acid sequence

<400> SEQUENCE: 96

```
Met Ala Val Phe Lys Thr Thr Leu Trp Arg Leu Ile Ser Gly Thr Leu
1               5                   10                  15

Gly Ile Ile Cys Leu Ser Leu Met Ala Thr Leu Gly Ile Leu Leu Lys
            20                  25                  30

Asn Ser Phe Thr Lys Leu Ser Val Glu Pro Ala Tyr Thr Pro Gly Pro
        35                  40                  45

Asn Ile Glu Leu Gln Lys Asp Ser Asp Cys Cys Ser Cys His Glu Lys
    50                  55                  60

Trp Val Gly Tyr Arg Cys Asn Cys Tyr Phe Ile Ser Ser Glu Glu Lys
65                  70                  75                  80

Thr Trp Asn Glu Ser Arg His Phe Cys Ala Ser Gln Lys Ser Ser Leu
                85                  90                  95

Leu Gln Leu Gln Asn Arg Asp Glu Leu Asp Phe Met Ser Ser Ser Gln
            100                 105                 110

His Phe Tyr Trp Ile Gly Leu Ser Tyr Ser Glu Glu His Thr Ala Trp
        115                 120                 125

Leu Trp Glu Asn Gly Ser Ala Leu Ser Gln Tyr Leu Phe Pro Ser Phe
    130                 135                 140

Glu Thr Phe Lys Pro Lys Asn Cys Ile Ala Tyr Asn Ser Lys Gly Asn
145                 150                 155                 160

Ala Leu Asp Glu Ser Cys Glu Thr Lys Asn Arg Tyr Ile Cys Lys Gln
                165                 170                 175

Gln Leu Ile
```

<210> SEQ ID NO 97
<211> LENGTH: 18
<212> TYPE: DNA
<213> ORGANISM: Artificial sequence
<220> FEATURE:
<223> OTHER INFORMATION: synthesized
<220> FEATURE:
<221> NAME/KEY: misc_feature
<223> OTHER INFORMATION: pTT-EF1a-F

<400> SEQUENCE: 97 gcccttttg agtttgga                                                18

<210> SEQ ID NO 98
<211> LENGTH: 18
<212> TYPE: DNA
<213> ORGANISM: Artificial sequence
<220> FEATURE:
<223> OTHER INFORMATION: synthesized
<220> FEATURE:

```
<221> NAME/KEY: misc_feature
<223> OTHER INFORMATION: pSV40

<400> SEQUENCE: 98
cactgcattc tagttgtg                                                  18

<210> SEQ ID NO 99
<211> LENGTH: 121
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: M15 VH

<400> SEQUENCE: 99
```

Gln Val Gln Leu Gln Gln Ser Val Ala Glu Leu Val Arg Pro Gly Ala
1               5                   10                  15

Ser Val Lys Leu Ser Cys Thr Ala Ser Gly Phe Asn Ile Gln Asn Thr
            20                  25                  30

Tyr Ile His Trp Val Lys Gln Arg Pro Glu Gln Gly Leu Glu Trp Ile
        35                  40                  45

Gly Lys Ile Asp Pro Ala Asn Ala Asp Thr Lys Tyr Ala Pro Thr Phe
    50                  55                  60

Gln Gly Lys Ala Thr Ile Thr Ala Asp Thr Ser Ser Asn Thr Ala Tyr
65                  70                  75                  80

Leu Gln Leu Ser Ser Leu Thr Pro Glu Asp Thr Ala Ile Tyr Tyr Cys
                85                  90                  95

Ala Arg Tyr Arg Asp Tyr Leu Phe Tyr Tyr Ala Leu Gly Tyr Trp Gly
            100                 105                 110

Gln Gly Thr Ser Val Thr Val Ser Ser
        115                 120

```
<210> SEQ ID NO 100
<211> LENGTH: 112
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: M15 VL

<400> SEQUENCE: 100
```

Asp Ile Val Met Thr Gln Ser Ala Pro Ser Val Pro Val Thr Pro Gly
1               5                   10                  15

Glu Ser Val Ser Ile Ser Cys Arg Ser Ser Lys Ser Leu Leu His Ser
            20                  25                  30

Asn Ala Asn Thr Tyr Leu Tyr Trp Phe Leu Gln Arg Pro Gly Gln Ser
        35                  40                  45

Pro Gln Leu Leu Ile Tyr Arg Met Ser Asn Leu Ala Ser Gly Val Pro
    50                  55                  60

Asp Arg Phe Ser Gly Ser Gly Ser Gly Thr Ala Phe Thr Leu Arg Ile
65                  70                  75                  80

Ser Arg Val Glu Ala Glu Asp Val Gly Val Tyr Tyr Cys Met Gln His
                85                  90                  95

Leu Glu Tyr Pro Tyr Thr Phe Gly Gly Gly Thr Lys Leu Glu Ile Lys
            100                 105                 110

```
<210> SEQ ID NO 101
<211> LENGTH: 11
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 2C9 CDRH3

<400> SEQUENCE: 101

Ser Phe Asp Tyr Pro His Tyr Gly Met Asp Phe
1               5                   10

<210> SEQ ID NO 102
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 2C9 CDRL3

<400> SEQUENCE: 102

Gln Gln Tyr Ser Ile Tyr Pro Trp Thr
1               5

<210> SEQ ID NO 103
<211> LENGTH: 11
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 2F7 CDRH3

<400> SEQUENCE: 103

Ser Phe Asp Tyr Pro Tyr Tyr Gly Met Asp Tyr
1               5                   10

<210> SEQ ID NO 104
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 2F7 CDRL3

<400> SEQUENCE: 104

Leu Gln Phe Asp Glu Phe Pro Tyr Thr
1               5

<210> SEQ ID NO 105
<211> LENGTH: 11
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 2F10-2 CDRH3

<400> SEQUENCE: 105

Ser Tyr Leu Gly Gly Gln Tyr Tyr Phe Asp Tyr
1               5                   10
```

```
<210> SEQ ID NO 106
<211> LENGTH: 14
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 3G5 CDRH3

<400> SEQUENCE: 106

Asn Gly Gly Phe Thr Tyr Gly Ser Arg Gly Trp Phe Gly Tyr
1               5                   10

<210> SEQ ID NO 107
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 3G5 CDRL3

<400> SEQUENCE: 107

Gln Gln Tyr Ser Ser Tyr Pro Leu Thr
1               5

<210> SEQ ID NO 108
<211> LENGTH: 13
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 10C9 CDRH3

<400> SEQUENCE: 108

Ala Leu Asn Tyr Phe Gly Ser Ser Tyr Gly Phe Ser Tyr
1               5                   10

<210> SEQ ID NO 109
<211> LENGTH: 12
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 10F9 CDRH3

<400> SEQUENCE: 109

Leu Gly Asp Trp Glu Trp Leu Gly Val Leu Ala Tyr
1               5                   10

<210> SEQ ID NO 110
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 10F9 CDRL3

<400> SEQUENCE: 110

Gln Gln Ser Asn Lys Asp Pro Trp Thr
1               5
```

```
<210> SEQ ID NO 111
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 10G6 CDRL3

<400> SEQUENCE: 111

Ser Gln Ser Thr His Val Pro Arg Thr
1               5

<210> SEQ ID NO 112
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 11A8 CDRL3

<400> SEQUENCE: 112

Gln Gln Tyr Asn Ser Tyr Pro Leu Thr
1               5

<210> SEQ ID NO 113
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 11E6 CDRH3

<400> SEQUENCE: 113

Asn Tyr Glu Arg Arg Ala Met Asp Tyr
1               5

<210> SEQ ID NO 114
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 11G5 CDRL3

<400> SEQUENCE: 114

Ala Gln Asn Leu Glu Leu Pro Leu Thr
1               5

<210> SEQ ID NO 115
<211> LENGTH: 11
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 11G9 CDRH3

<400> SEQUENCE: 115

Ser Phe Asp Tyr Pro His Tyr Gly Met Asp Tyr
```

```
1               5                   10
```

<210> SEQ ID NO 116
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 11G9 CDRL3

<400> SEQUENCE: 116

```
Gln Gln Tyr Ser Ser Tyr Pro Tyr Thr
1               5
```

<210> SEQ ID NO 117
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 12B2 CDRL3

<400> SEQUENCE: 117

```
Gln Gln Tyr Ser Ser Tyr Pro Trp Thr
1               5
```

<210> SEQ ID NO 118
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 12F2 CDRL3

<400> SEQUENCE: 118

```
His Gln Tyr Leu Ile Tyr Pro Tyr Thr
1               5
```

<210> SEQ ID NO 119
<211> LENGTH: 14
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 13H8 CDRH3

<400> SEQUENCE: 119

```
Thr Tyr Gly Asp Tyr Gly Arg Asp Tyr Tyr Ala Met Asp Tyr
1               5                   10
```

<210> SEQ ID NO 120
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 13H8 CDRL3

<400> SEQUENCE: 120

```
Phe Gln Gly Ser His Val Pro Pro Thr
1               5

<210> SEQ ID NO 121
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 15C2 CDRL3

<400> SEQUENCE: 121

Leu Gln Tyr Asp Glu Phe Pro Tyr Thr
1               5

<210> SEQ ID NO 122
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 9B10 CDRL3

<400> SEQUENCE: 122

Ala Gln Asn Leu Glu Leu Pro Trp Thr
1               5

<210> SEQ ID NO 123
<211> LENGTH: 12
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 9F8 CDRH3

<400> SEQUENCE: 123

Tyr Arg Asp Phe Leu Tyr Tyr Tyr Ala Leu Gly Tyr
1               5                   10

<210> SEQ ID NO 124
<211> LENGTH: 9
<212> TYPE: PRT
<213> ORGANISM: Artificial sequence
<220> FEATURE:
<223> OTHER INFORMATION: synthesized
<220> FEATURE:
<221> NAME/KEY: misc_feature
<223> OTHER INFORMATION: 9F8 CDRL3

<400> SEQUENCE: 124

Ser Gln Gly Thr His Val Pro Leu Thr
1               5
```

NKG2A ANTIBODY, PREPARATION METHOD THEREFOR AND APPLICATION THEREOF

Incorporation of sequence listing

This application contains a sequence listing submitted in Computer Readable Form (CRF). The CRF file contains the sequence listing entitled "6-PBA4085421-SequenceListing.txt", which was created on Apr. 29, 2022, and is 63,430 bytes in size. The information in the sequence listing is incorporated herein by reference in its entirety.

TECHNICAL FIELD

The present invention belongs to the field of antibodies, and specifically relates to a NKG2A antibody and a preparation method and application thereof.

BACKGROUND

Maintaining effective immune surveillance without causing an autoimmune response requires the accuracy of effector T cell responses. Autoimmune diseases occur when the immune system initiates an immune response against self-antigens. Although the mechanism involved in initiating and maintaining an autoimmune response is unclear, it may involve the appearance of antigens in the secondary lymphoid organs that were previously neglected in terms of immunity.

Natural killer (NK) cells are a subpopulation that includes lymphocytes involved in non-traditional immunity. NK cells provide an effective immune monitoring mechanism, thereby eliminating unwanted cells such as tumor cells or virus-infected cells. NK cell activity is regulated by a complex mechanism including two activation and inhibition signals.

It has been confirmed that a variety of different NK-specific receptors play an important role in the recognition and killing of HLA class I defective target cells mediated by NK cells. These receptors (called NKp30, NKp46, and NKp44) are members of the Ig superfamily. Their cross-linking (induced by specific mAbs) leads to strong NK cell activation, leading to increased intracellular Ca++ levels, triggering cytotoxicity and lymphokine release. Importantly, the monoclonal antibody-mediated activation of NKp30, NKp46, and/or NKp44 leads to the activation of NK cell toxicity for multiple target cells. These findings provide evidence for a central role of these receptors in natural cytotoxicity.

CD94-NKG2A, another important inhibitory receptor on NK cells, interacts with the atypical MHC class I molecule HLA-E. Some of these receptors have the ability to modulate the threshold of T cell antigen receptor-dependent T cell activation. In the rare case of inhibitory receptor deficiency, these activated isoforms may expand the function of T cell effectors and contribute to autoimmune pathology. The amino acid sequence of NKG2A changes in mammals (including primates). For example, human NKG2A protein has less than 90% homology with macaques.

Efforts on therapies for modulating NKG2A (mainly to prevent inflammation) have focused on research on atypical MHC I molecules, HLA-E for human receptors, and Qa-Ib for mouse receptors. For cell surface expression, these MHC molecules are preferably combined with peptides derived from signal peptides of other MHC class I molecules. The expression of other MHC class I molecules can regulate the expression of HLA-E, thus allowing NK cells to monitor the status of the MHC class I-dependent antigen presentation pathway in potential target cells. The level of HLA-E on the cell surface is critical for NK cell toxicity against tumors and virus-infected cells. Therapies for regulating the expression or function of HLA-E usually focus on using HLA-I or HSP60 peptides to induce a protective state for preventing inflammation, so that NK cells are not activated.

Although relevant research has been carried out on antibodies targeting NKG2A, there is still a need to obtain specific antibodies with stronger activity and higher affinity.

SUMMARY OF THE INVENTION

The present invention discloses a NKG2A antibody and a preparation method and application thereof. The NKG2A antibody includes one or more of the heavy chain variable region heavy chain CDR1 (VH-CDR1), the heavy chain CDR2 (VH-CDR2) and the heavy chain CDR3 (VH-CDR3) of the NKG2A antibody, and one or more of the light chain variable region light chain CDR1 (VL-CDR1), light chain CDR2 (VL-CDR2) and light chain CDR3 (VL-CDR3) of the NKG2A antibody.

In a first aspect of the present invention, it provides a heavy chain variable region of an antibody having a complementarity determining region CDR selected from the group consisting of:
  a VH-CDR1 as shown in SEQ ID NO. 8n+2,
  a VH-CDR2 as shown in SEQ ID NO. 8n+3, and
  a VH-CDR3 as shown in SEQ ID NO. 8n+4;
  wherein, each n is independently 0, 1, 2, 3, 4, 5, 6, 7 or 8;
  wherein any one of the above amino acid sequences further includes a derivative sequence that is optionally added, deleted, modified, and/or substituted for at least one amino acid and can retain the binding affinity of NKG2A.

In another preferred embodiment, the heavy chain variable region has an amino acid sequence as shown in SEQ ID NO. 8n+1, wherein n is 0, 1, 2, 3, 4, 5, 6, 7, or 8.

In another preferred embodiment, the heavy chain variable region has an amino acid sequence as shown in SEQ ID NO.1.

In another preferred embodiment, the heavy chain variable region has an amino acid sequence as shown in SEQ ID NO.9.

In another preferred embodiment, the heavy chain variable region has an amino acid sequence as shown in SEQ ID NO.17.

In another preferred embodiment, the heavy chain variable region has an amino acid sequence as shown in SEQ ID NO.25.

In a second aspect of the present invention, it provides a heavy chain of an antibody having the heavy chain variable region according to the first aspect of the present invention.

In another preferred embodiment, the heavy chain further comprises a heavy chain constant region.

In another preferred embodiment, the heavy chain constant region is of human or murine origin.

In a third aspect of the present invention, it provides a light chain variable region of an antibody having a complementarity determining region CDR selected from the group consisting of:
  a VL-CDR1 as shown in SEQ ID NO. 8n+6,
  a VL-CDR2 as shown in SEQ ID NO. 8n+7, and
  a VL-CDR3 as shown in SEQ ID NO. 8n+8;
  wherein, each n is independently 0, 1, 2, 3, 4, 5, 6, 7 or 8;

wherein any one of the above amino acid sequences further includes a derivative sequence that is optionally added, deleted, modified, and/or substituted for at least one amino acid and can retain the binding affinity of NKG2A.

In another preferred embodiment, the light chain variable region has the amino acid sequence as shown in SEQ ID NO. 8n+5, wherein n is 0, 1, 2, 3, 4, 5, 6, 7, or 8.

In another preferred embodiment, the light chain variable region has the amino acid sequence as shown in SEQ ID NO.5.

In another preferred embodiment, the light chain variable region has the amino acid sequence as shown in SEQ ID NO.13.

In another preferred embodiment, the light chain variable region has the amino acid sequence as shown in SEQ ID NO.21.

In another preferred embodiment, the light chain variable region has the amino acid sequence as shown in SEQ ID NO.29.

In a fourth aspect of the present invention, it provides a light chain of an antibody having the light chain variable region according to the third aspect of the present invention.

In another preferred embodiment, the light chain further comprises a light chain constant region.

In another preferred embodiment, the light chain constant region is of human or murine origin.

In a fifth aspect of the present invention, it provides an antibody having:

(1) a heavy chain variable region according to the first aspect of the present invention; and/or (2) a light chain variable region according to the third aspect of the present invention;

or the antibody has the heavy chain according to the second aspect of the present invention; and/or the light chain according to the fourth aspect of the present invention, wherein any one of the above amino acid sequences further includes a derivative sequence that is optionally added, deleted, modified, and/or substituted for at least one amino acid and can retain the binding affinity of NKG2A.

In another preferred embodiment, the amino acid sequence of any of the above-mentioned CDRs contains a derivative CDR sequence of 1, 2, or 3 amino acids that has been added, deleted, modified, and/or substituted, and so that the derivative antibody composed of VH and VL containing the derivative CDR sequence can retain the affinity for binding to NKG2A.

In another preferred embodiment, the ratio (F1/F0) of the affinity F1 of the derivatized antibody binding to NKG2A and the affinity F0 of the corresponding non-derivatized antibody binding to NKG2A is 0.5-2, preferably 0.7-1.5, and more preferably 0.8-1.2.

In another preferred embodiment, the number of added, deleted, modified and/or substituted amino acids is 1-5 (such as 1-3, preferably 1-2, more preferably 1).

In another preferred embodiment, the derivative sequence that has been added, deleted, modified and/or substituted for at least one amino acid and can retain NKG2A binding affinity is an amino acid sequence with homology or sequence identity of at least 96%.

In another preferred embodiment, the antibody further comprises a heavy chain constant region and/or light chain constant region.

In another preferred embodiment, the heavy chain constant region is of human origin, and/or the light chain constant region is of human origin.

In another preferred embodiment, the heavy chain variable region of the antibody further comprises a human framework region, and/or the light chain variable region of the antibody further comprises a human framework region.

In another preferred embodiment, the heavy chain variable region of the antibody further comprises a murine framework region, and/or the light chain variable region of the antibody further comprises a murine framework region.

In another preferred embodiment, the antibody is selected from the group consisting of an animal-derived antibody, a chimeric antibody, a humanized antibody, a fully human antibody, and a combination thereof.

In another preferred embodiment, the ratio (Z1/Z0) of the immunogenicity Z1 of the chimeric antibody in humans and the immunogenicity Z0 of non-chimeric antibody (such as murine antibodies) in humans is 0-0.5, preferably 0-0.2, more preferably 0-0.05 (e.g., 0.001-0.05).

In another preferred embodiment, the antibody is a partially or fully humanized, or fully human monoclonal antibody.

In another preferred embodiment, the antibody is a double-chain antibody or a single-chain antibody.

In another preferred embodiment, the antibody is a full-length protein of an antibody, or an antigen binding fragment.

In another preferred embodiment, the antibody is a bispecific antibody or a multispecific antibody.

In another preferred embodiment, the antibody is in the form of a drug conjugate.

In another preferred embodiment, the antibody has one or more characteristics selected from the group consisting of:

(a) inhibiting the migration or metastasis of tumor cells;
(b) inhibiting tumor growth.

In another preferred embodiment, the antibody has a heavy chain variable region according to the first aspect of the present invention and a light chain variable region according to the third aspect of the present invention;

wherein the heavy chain variable region and the light chain variable region comprise a CDR selected from the group consisting of:

| VH-CDR1 Sequence Number | VH-CDR2 Sequence Number | VH-CDR3 Sequence Number | VL-CDR1 Sequence Number | VL-CDR2 Sequence Number | VL-CDR3 Sequence Number |
|---|---|---|---|---|---|
| 2 | 3 | 4 | 6 | 7 | 8 |
| 10 | 11 | 12 | 14 | 15 | 16 |
| 18 | 19 | 20 | 22 | 23 | 24 |
| 26 | 27 | 28 | 30 | 31 | 32 | wherein any one of the above amino acid sequences further includes a derivative sequence that is optionally added, deleted, modified, and/or substituted for at least one amino acid and can retain the binding affinity of NKG2A.

In another preferred embodiment, the antibody has a heavy chain variable region according to the first aspect of the present invention and a light chain variable region according to the third aspect of the present invention;

wherein the heavy chain variable region includes the following three complementarity determining region CDRs:

a VH-CDR1 as shown in SEQ ID NO. 2,
a VH-CDR2 as shown in SEQ ID NO. 3, and
a VH-CDR3 as shown in SEQ ID NO. 4;

the light chain variable region includes the following three complementarity determining region CDRs:

a VL-CDR1 as shown in SEQ ID NO. 6,
a VL-CDR2 as shown in SEQ ID NO. 7, and
a VL-CDR3 as shown in SEQ ID NO. 8;

or the heavy chain variable region includes the following three complementarity determining region CDRs:
a VH-CDR1 as shown in SEQ ID NO. 10,
a VH-CDR2 as shown in SEQ ID NO. 11, and
a VH-CDR3 as shown in SEQ ID NO. 12;
the light chain variable region includes the following three complementarity determining region CDRs:
a VL-CDR1 as shown in SEQ ID NO. 14,
a VL-CDR2 as shown in SEQ ID NO. 15, and
a VL-CDR3 as shown in SEQ ID NO. 16;
or
the heavy chain variable region includes the following three complementarity determining region CDRs:
a VH-CDR1 as shown in SEQ ID NO. 18,
a VH-CDR2 as shown in SEQ ID NO. 19, and
a VH-CDR3 as shown in SEQ ID NO. 20;
the light chain variable region includes the following three complementarity determining region CDRs:
a VL-CDR1 as shown in SEQ ID NO. 22,
a VL-CDR2 as shown in SEQ ID NO. 23, and
a VL-CDR3 as shown in SEQ ID NO. 24;
or
the heavy chain variable region includes the following three complementarity determining region CDRs:
a VH-CDR1 as shown in SEQ ID NO. 26,
a VH-CDR2 as shown in SEQ ID NO. 27, and
a VH-CDR3 as shown in SEQ ID NO. 28;
the light chain variable region includes the following three complementarity determining region CDRs:
a VL-CDR1 as shown in SEQ ID NO. 30,
a VL-CDR2 as shown in SEQ ID NO. 31, and
a VL-CDR3 as shown in SEQ ID NO. 32.

In another preferred embodiment, the heavy chain variable region of the antibody contains the amino acid sequence as shown in SEQ ID NO. 1, 9, 17, 25, 33, 41, 49, 57 or 65; and/or the light chain variable region of the antibody contains the amino acid sequence as shown in SEQ ID NO. 5, 13, 21, 29, 37, 45, 53, 61 or 69.

In another preferred embodiment, the heavy chain variable region of the antibody contains the amino acid sequence as shown in SEQ ID NO. 1; and the light chain variable region of the antibody contains the amino acid sequence as shown in SEQ ID NO. 5.

In another preferred embodiment, the heavy chain variable region of the antibody contains the amino acid sequence as shown in SEQ ID NO. 9; and the light chain variable region of the antibody contains the amino acid sequence as shown in SEQ ID NO. 13.

In another preferred embodiment, the heavy chain variable region of the antibody contains the amino acid sequence as shown in SEQ ID NO. 17; and the light chain variable region of the antibody contains the amino acid sequence as shown in SEQ ID NO. 21.

In another preferred example, the heavy chain variable region of the antibody contains the amino acid sequence as shown in SEQ ID NO. 25; and the light chain variable region of the antibody contains the amino acid sequence as shown in SEQ ID NO. 29.

In another preferred embodiment, the antibody is selected from the group consisting of:

| Antibody number | Clone | VH sequence Number | VL Sequence Number |
|---|---|---|---|
| 1 | M15-5 | 1 | 5 |
| 2 | Mpb416 | 9 | 13 |

-continued

| Antibody number | Clone | VH sequence Number | VL Sequence Number |
|---|---|---|---|
| 3 | Mab031 | 17 | 21 |
| 4 | Mab032 | 25 | 29 |
| 5 | Mab033 | 33 | 37 |
| 6 | Mab036 | 41 | 45 |
| 7 | 2F10 | 49 | 53 |
| 8 | 9B10 | 57 | 61 |
| 9 | 14G3 | 65 | 69 |

In another preferred embodiment, the amino acid sequence of the variable region of the heavy chain has at least 80%, 85%, 90%, 91%, 92%, 93%, 94%, 95%, 96%, 97%, 98% or 99% sequence homology or sequence identity with the amino acid sequence as shown in SEQ ID NO. 1, 9, 17, 25, 33, 41, 49, 57 or 65 in the sequence listing.

In another preferred embodiment, the amino acid sequence of the light chain variable region has at least 80%, 85%, 90%, 91%, 92%, 93%, 94%, 95%, 96%, 97%, 98% or 99% sequence homology or sequence identity with the amino acid sequence as shown in SEQ ID NO. 5, 13, 21, 29, 37, 45, 53, 61 or 69 in the sequence listing.

In a sixth aspect of the present invention, it provides a recombinant protein comprising:
(i) the heavy chain variable region according to the first aspect of the present invention, the heavy chain according to the second aspect of the present invention, the light chain variable region according to the third aspect of the present invention, the light chain according to the fourth aspect of the present invention, or the antibody according to the fifth aspect of the present invention; and
(ii) an optional tag sequence to assist in expression and/or purification.

In another preferred embodiment, the tag sequence comprises 6His tag.

In another preferred embodiment, the recombinant protein (or polypeptide) comprises a fusion protein.

In another preferred embodiment, the recombinant protein is a monomer, dimer, or multimer.

In another preferred embodiment, the recombinant protein comprises:
(i) an antibody selected from the group consisting of,

| Antibody number | Clone | VH Sequence Number | VL Sequence Number |
|---|---|---|---|
| 1 | M15-5 | 1 | 5 |
| 2 | Mpb416 | 9 | 13 |
| 3 | Mab031 | 17 | 21 |
| 4 | Mab032 | 25 | 29 |
| 5 | Mab033 | 33 | 37 |
| 6 | Mab036 | 41 | 45 |
| 7 | 2F10 | 49 | 53 |
| 8 | 9B10 | 57 | 61 |
| 9 | 14G3 | 65 | 69 | and
(ii) an optional tag sequence to assist in expression and/or purification.

In a seventh aspect of the present invention, it provides a polynucleotide encoding a polypeptide selected from the group consisting of:
(1) the heavy chain variable region according to the first aspect of the present invention, the heavy chain according to the second aspect of the present invention, the light chain variable region according to the third aspect of the present invention, the light chain according to the fourth aspect of the present invention, or the antibody according to the fifth aspect of the present invention; and (2) the recombinant protein according to the sixth aspect of the present invention.

In another preferred embodiment, the polynucleotide encoding the variable region of the heavy chain is shown in SEQ ID NO. 73, 75, 77, 79, 81, 83, 85, 87 or 89; and/or, the polynucleotide encoding the variable region of the light chain is shown in SEQ ID NO. 74, 76, 78, 80, 82, 84, 86, 88 or 90.

In another preferred embodiment, the polynucleotide encoding the heavy chain variable region sequence and the polynucleotide encoding the light chain variable region sequence are selected from the group consisting of:

| Clone | Sequence numbering of polynucleotide encoding VH | Sequence numbering of polynucleotide encoding VL |
|---|---|---|
| M15-5 | 73 | 74 |
| Mpb416 | 75 | 76 |
| Mab031 | 77 | 78 |
| Mab032 | 79 | 80 |
| Mab033 | 81 | 82 |
| Mab036 | 83 | 84 |
| 2F10 | 85 | 86 |
| 9B10 | 87 | 88 |
| 14G3 | 89 | 90. |

In an eighth aspect of the present invention, it provides a vector comprising the polynucleotide according to the seventh aspects of the present invention.

In another preferred embodiment, the vector includes: a bacterial plasmid, a bacteriophage, a yeast plasmid, a plant cell virus, a mammalian cell virus such as an adenovirus, an retrovirus, or other vectors.

In a ninth aspect of the present invention, it provides a genetically engineered host cell comprising the vector according to the eighth aspect of the present invention or the genome integrated with the polynucleotide according to the seventh aspect of the present invention.

In a tenth aspect of the present invention, it provides an antibody conjugate comprising:

(a) an antibody moiety, which is selected from the group consisting of the heavy chain variable region according to the first aspect of the present invention, the heavy chain according to the second aspect of the present invention, the light chain variable region according to the third aspect of the present invention, the light chain according to the fourth aspect of the present invention, or the antibody according to the fifth aspect of the present invention, and a combination thereof; and (b) a coupling moiety coupled to the antibody moiety, and the coupling moiety is selected from the group consisting of a detectable marker, a drug, a toxin, a cytokine, a radionuclide, an enzyme, and a combination thereof.

In another preferred embodiment, the antibody portion is coupled to the coupling moiety by a chemical bond or a linker.

In an eleventh aspect of the present invention, it provides an immune cell that expresses or is exposed outside the cell membrane with the antibody according to the fifth aspect of the present invention.

In another preferred embodiment, the immune cell comprises a NK cell, a T cell.

In another preferred embodiment, the immune cell is derived from human or non-human mammals (such as mice).

In a twelfth aspect of the present invention, it provides a pharmaceutical composition comprising:

(i) an active ingredient, the active ingredient is selected from the group consisting of: the heavy chain variable region according to the first aspect of the present invention, the heavy chain according to the second aspect of the present invention, the light chain variable region according to the third aspect of the present invention, the light chain according to the fourth aspect of the present invention, or the antibody according to the fifth aspect of the present invention, the recombinant protein according to the sixth aspect of the present invention, the antibody conjugate according to the tenth aspect of the present invention, the immune cell according to the eleventh aspect of the present invention, and a combination thereof; and (ii) a pharmaceutically acceptable carrier.

In another preferred embodiment, the pharmaceutical composition is a liquid formulation.

In another preferred embodiment, the pharmaceutical composition is an injection.

In another preferred embodiment, the pharmaceutical composition comprises 0.01-99.99% of the antibody according to the fifth aspect of the present invention, the recombinant protein according to the sixth aspect of the present invention, the antibody conjugate according to the tenth aspect of the present invention, the immune cell according to the eleventh aspect of the present invention, and a combination thereof, and 0.01-99.99% of the pharmaceutical carrier, and the percentage is the mass percentage of the pharmaceutical composition.

In a thirteenth aspect of the present invention, it provides a use of an active ingredient selected from the group consisting of the heavy chain variable region according to the first aspect of the present invention, and the heavy chain according to the second aspect of the present invention, the light chain variable region according to the third aspect of the present invention, the light chain according to the fourth aspect of the present invention, or the antibody according to the fifth aspect of the present invention, the recombinant protein according to the sixth aspect of the present invention, the antibody conjugate according to the tenth aspect of the present invention, the immune cell according to the eleventh aspect of the present invention, and a combination thereof, wherein the active ingredient is used for (a) preparing a diagnostic reagent or kit; and/or (b) preparing a drug for preventing and/or treating diseases related to abnormal expression or function of NKG2A.

In another preferred embodiment, the diagnostic reagent is a detective slip or a detection plate.

In another preferred embodiment, the diseases related to the abnormal expression or function of NKG2A are selected from the group consisting of: cancer, autoimmune diseases, inflammatory diseases.

In another preferred embodiment, the diagnostic reagent or kit is used for:

(1) detecting the NKG2A protein in a sample; and/or (2) detecting endogenous NKG2A protein in a tumor cell; and/or (3) detecting a tumor cell expressing NKG2A protein;

the drug is used to prevent and/or treat diseases related to abnormal expression or function of NKG2A, and the diseases related to abnormal expression or function of NKG2A are selected from the group consisting of: cancer, autoimmune diseases, inflammatory diseases.

In another preferred embodiment, the cancer is selected from the group consisting of: lymphocytic leukemia, ovarian cancer, non-small cell lung cancer, head and neck cancer.

In another preferred embodiment, the cancer is a cancer overexpressing HLA-E.

In another preferred embodiment, the cancer is a cancer overexpressing HLA-E, and the cancer is selected from the group consisting of lymphocytic leukemia, ovarian cancer, non-small cell lung cancer, and head and neck cancer.

In another preferred embodiment, the antibody is in the form of a drug conjugate (ADC).

In another preferred embodiment, the diagnostic reagent or kit is used for diagnosing NKG2A related diseases.

In another preferred embodiment, the diagnostic reagent or kit is used for detecting NKG2A protein in a sample.

In a fourteenth aspect of the present invention, it provides a method for detecting (including diagnostic or non-diagnostic) NKG2A protein in a sample in vitro, comprising the steps:

(1) in vitro, contacting the sample with the antibody according to the fifth aspect of the present invention;

(2) detecting the formation of an antigen-antibody complex, wherein the formation of a complex indicates the presence of NKG2A protein in the sample.

In a fifteenth aspect of the present invention, it provides a composition for detecting NKG2A protein in a sample in vitro, which comprises the antibody according to the fifth aspect of the present invention, the recombinant protein according to the sixth aspect of the present invention, the antibody conjugate according to the tenth aspect of the present invention, the immune cell according to the eleventh aspect of the present invention, and a combination thereof as an active ingredient.

In a sixteenth aspect of the present invention, it provides a detection plate comprising a substrate (support plate) and a test strip, and the test strip contains the antibody according to the fifth aspect of the present invention, the recombinant protein according to the sixth aspect of the present invention, and the antibody conjugate according to the tenth aspect of the present invention, the immune cell according to the eleventh aspect of the present invention, and a combination thereof.

In a seventeenth aspect of the present invention, it provides a kit comprising:

(1) a first container containing the antibody of the present invention; and/or (2) a second container containing a secondary antibody against the antibody of the present invention;

or, the kit contains the detection plate according to the sixteenth aspect of the present invention.

In an eighteenth aspect of the present invention, it provides a method for preparing a recombinant polypeptide comprising:

(a) culturing the host cell according to the ninth aspect of the present invention under conditions suitable for expression;

(b) isolating the recombinant polypeptide from the culture, the recombinant polypeptide being an antibody according to the fifth aspect of the present invention or a recombinant protein according to the sixth aspect of the present invention.

In a nineteenth aspect of the present invention, it provides a pharmaceutical combination comprising:

(I) a first active ingredient comprising the antibody 1 according to the fifth aspect of the present invention, or the recombinant protein according to the sixth aspect of the present invention, or the antibody conjugate according to the tenth aspect of the present invention, or the immune cell according to the eleventh aspect of the present invention, or the pharmaceutical composition according to the twelfth aspect of the present invention, and a combination thereof;

(ii) a second active ingredient comprising a second antibody, or a chemotherapeutic agent.

In another preferred embodiment, the second antibody is selected from the group consisting of: CTLA4 antibody, PD-1 antibody.

In another preferred embodiment, the second antibody is PD-1 antibody.

In another preferred embodiment, the chemotherapeutic agent is selected from the group consisting of docetaxel, carboplatin, and a combination thereof.

In a twentieth aspect of the present invention, it provides a use of the combination of the antibody of the fifth aspect of the present invention, or the recombinant protein according to the sixth aspect of the present invention, or the antibody conjugate according to the tenth aspect of the present invention, or the immune cell according to the eleventh aspect of the present invention, and/or the pharmaceutical composition according to the twelfth aspect of the present invention and a second antibody or a chemotherapeutic agent in the preparation of a medicament for treating diseases related to abnormal NKG2A expression or function.

In another preferred embodiment, the second antibody is selected from the group consisting of: a CTLA4 antibody, a PD-1 antibody.

In another preferred embodiment, the second antibody is a PD-1 antibody.

In a twenty-first aspect of the present invention, it provides a method for treating diseases related to abnormal expression or function of NKG2A, administering to a subject in need an effective amount of the antibody according to the fifth aspect of the present invention, or the recombinant protein according to the sixth aspect of the present invention, or the antibody conjugate according to the tenth aspect of the present invention, or the immune cell according to the eleventh aspect of the present invention, or the pharmaceutical composition according to the twelfth aspect of the present invention, and a combination thereof.

In another preferred embodiment, the diseases related to the abnormal expression or function of NKG2A are cancer, autoimmune diseases, and inflammatory diseases.

In another preferred embodiment, the cancer is selected from the group consisting of lymphocytic leukemia, ovarian cancer, non-small cell lung cancer, head and neck cancer.

In another preferred embodiment, the cancer is a cancer overexpressing HLA-E.

In another preferred embodiment, the cancer is a cancer overexpressing HLA-E, and the cancer is selected from the group consisting of lymphocytic leukemia, ovarian cancer, non-small cell lung cancer, and head and neck cancer.

In another preferred embodiment, the method further comprises before, during, and/or after the administration of the first active ingredient, a safe and effective amount of the second antibody is administered to the subject.

In another preferred embodiment, the second antibody is selected from the group consisting of: a PD-1 antibody, a CTLA4 antibody.

In another preferred embodiment, the second antibody is a PD-1 antibody.

It should be understood that, within the scope of the present invention, the technical features specifically described above and below (such as the Examples) can be combined with each other, thereby constituting a new or preferred technical solution which needs not be described one by one.

DETAILED DESCRIPTION

Figure 1:
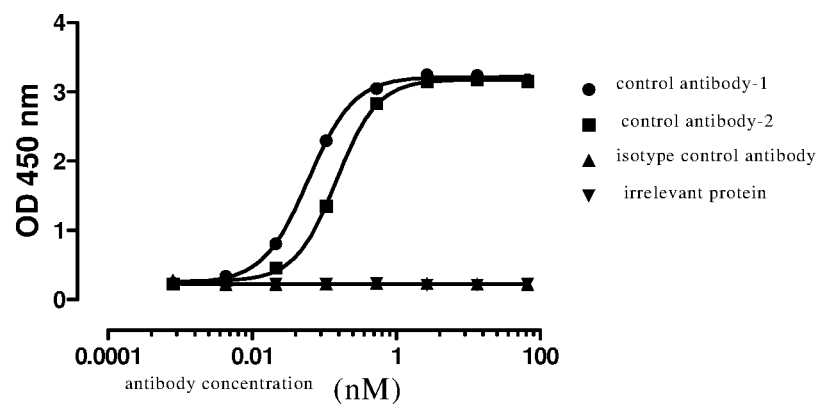
FIG. 1 shows the binding activity of the control antibody to the NKG2A/CD94 protein.

Through extensive and in-depth research, the present inventors have unexpectedly obtained a set of human-mouse chimeric and humanized NKG2A antibodies (such as M15-5, Mpb416) with new amino acid sequences through phage display technology and hybridoma technology, respectively. The NKG2A antibody of the present invention can bind to human NKG2A and has a high affinity (KD of $1.04 \times 10^{-11}$) (the antibody obtained by the present invention has 18 times higher affinity than the positive reference antibody); and the NKG2A antibody can bind to the extracellular region of the NKG2A protein receptor, and can effectively block the NKG2A protein at the cellular level, and prevent the binding of the NKG2A protein to the ligand HLA-E; the NKG2A antibody can significantly increase the killing effect of NK92 or human NK cells on target cells; based on the experimental detection of primary NK cell activity, its biological activity is significantly better than that of the reference antibody. In addition, the NKG2A antibody of the present invention has high specificity and lacks cross-reactivity with human NKG2C and NKG2E protein antigens of the same family. The NKG2A antibody of the present invention can be used in tumor immunotherapy that blocks the negative regulation of NKG2A/HLA-E-mediated signal pathways, activates the body's natural immune response to tumors, alone or in combination with anti-PD-1 and other monoclonal antibodies or other anti-tumor drug. The antibody of the present invention can be used in the preparation of drugs for treating tumors, autoimmune diseases and the like. The present invention has been completed on this basis.

Terms

NKG2A

Natural killer cells (NK) are a very important type of lymphocytes in the body, which play an important role in both innate immunity and acquired immunity. There are two types of surface receptors on the surface of NK cells. According to their functions, they can be divided into inhibitory and activated receptors. They mediate different recognition modes of NK cells and transmit different activation and inhibition signals, respectively. The CD94/NKG2 family is a type of receptor family that has been studied more. It mainly includes members such as NKG2A, NKG2B, NKG2C, NKG2D, NKG2E, NKG2F, and NKG2H. Among them, NKG2A is an inhibitory receptor, and its ligand is a non-classical major histocompatibility complex class I molecule—HLA-E. After the HLA-E molecule expressed on the target cell binds to NKG2A, it has an inhibitory effect on the killing function of NK cells. Therefore, antibodies that inhibit CD94/NKG2A may increase the killing activity of tumor-specific lymphocytes on tumor cells. In addition, certain lymphomas, such as NK-lymphoma, are characterized by CD94/NKG2A expression. In such patients, therapeutic antibodies that target and kill CD94/NKG2A-expressing cells may be able to eradicate tumor cells.

Antibody

As used herein, the term "antibody" or "immunoglobulin" is a heterotetrameric glycoprotein of about 150,000 daltons with the same structural characteristics, which is composed of two identical light chains (L) and two identical heavy chains (H). Each light chain is connected to the heavy chain by a covalent disulfide bond, and the number of disulfide bonds between the heavy chains of different immunoglobulin isotypes is different. Each heavy and light chain also has regularly spaced intrachain disulfide bonds. Each heavy chain has a variable region (VH) at one end, followed by multiple constant regions. Each light chain has a variable region (VL) at one end and a constant region at the other end; the constant region of the light chain pairs with the first constant region of the heavy chain, and the variable region of the light chain pairs with the variable region of the heavy chain. Special amino acid residues form an interface between the variable regions of the light and heavy chains.

As used herein, the term "variable" means that certain parts of the variable region of the antibody are different in sequence, which forms the binding and specificity of various specific antibodies to their specific antigens. However, the variability is not evenly distributed throughout the variable regions of antibodies. It is concentrated in three fragments called complementarity determining regions (CDR) or hypervariable regions in the variable regions of the light and heavy chains. The more conserved part of the variable region is called the framework region (FR). The variable regions of the natural heavy chain and light chain each contain four FR regions, which are roughly in a β-folded configuration, connected by three CDRs forming a connecting loop, and in some cases can form a partial β-folded structure. The CDRs in each chain are closely joined together by the FR region and form the antigen binding site of the antibody together with the CDRs of the other chain (see Kabat et al., NIH Publ. No. 91-3242, Volume I, pages 647-669 (1991)). Constant regions do not directly participate in the binding of antibodies to antigens, but they exhibit different effector functions, such as participating in antibody-dependent cytotoxicity of antibodies.

The "light chains" of vertebrate antibodies (immunoglobulins) can be classified into one of two distinct categories (called κ and λ) based on the amino acid sequence of their constant regions. According to the amino acid sequence of the constant region of their heavy chains, immunoglobulins can be divided into different types. There are mainly five classes of immunoglobulins: IgA, IgD, IgE, IgG and IgM, some of which can be further divided into subclasses (isotypes), such as IgG1, IgG2, IgG3, IgG4, IgA and IgA2. The heavy chain constant regions corresponding to different classes of immunoglobulins are called α, δ, ε, γ, and μ, respectively. The subunit structures and three-dimensional configurations of different classes of immunoglobulins are well known to those skilled in the art.

Generally, the antigen-binding properties of antibodies can be described by 3 specific regions located in the variable regions of the heavy and light chains, called variable regions (CDR), which are divided into 4 framework regions (FR), the amino acid sequences of the 4 FRs are relatively conservative and do not directly participate in the binding reaction. These CDRs form a ring structure, and approach to each other in the steric structure by virtue of the β-sheets formed by the FRs between them, and the CDRs on the heavy chain and the corresponding CDRs on the light chain constitute the antigen binding site of the antibody. The amino acid sequences of antibodies of the same type can be compared to determine which amino acids constitute the FR or CDR regions.

The present invention includes not only complete antibodies, but also fragments of antibodies with immunological activity or fusion proteins formed by antibodies and other sequences. Therefore, the present invention also includes fragments, derivatives and analogues of the antibodies.

In the present invention, antibodies include murine, chimeric, humanized or fully human antibodies prepared by techniques well known to those skilled in the art. Recombinant antibodies, such as chimeric and humanized monoclonal antibodies, including human and non-human parts, can be obtained by standard DNA recombination techniques, and they are all useful antibodies. A chimeric antibody is a molecule in which different parts are derived from different animal species, for example, a chimeric antibody having a variable region from a mouse monoclonal antibody and a constant region from a human immunoglobulin (see, for example, U.S. Pat. Nos. 4,816,567 and 4,816,397, which is hereby incorporated by reference in its entirety). Humanized antibodies refer to antibody molecules derived from non-human species, with one or more complementarity determining regions (CDRs) derived from non-human species and framework regions derived from human immunoglobulin molecules (see U.S. Pat. No. 5,585,089, which is hereby incorporated by reference in its entirety). These chimeric and humanized monoclonal antibodies can be prepared using DNA recombination techniques well known in the art.

In the present invention, antibodies can be monospecific, bispecific, trispecific, or more multispecific.

In the present invention, the antibody of the present invention also includes a conservative variant thereof, which means that compared with the amino acid sequence of the antibody of the present invention, there are at most 10, preferably at most 8, more preferably at most 5, and most preferably at most 3 amino acids are replaced by amino acids with similar or similar properties to form a polypeptide. These conservative variant polypeptides are best produced according to Table 1 through amino acid substitutions.

TABLE 1

| Initial residue | Representative substitution | Preferred substitution |
|---|---|---|
| Ala (A) | Val; Leu; Ile | Val |
| Arg (R) | Lys; Gln; Asn | Lys |
| Asn (N) | Gln; His; Lys; Arg | Gln |
| Asp (D) | Glu | Glu |
| Cys (C) | Ser | Ser |
| Gln (Q) | Asn | Asn |
| Glu (E) | Asp | Asp |
| Gly (G) | Pro; Ala | Ala |
| His (H) | Asn; Gln; Lys; Arg | Arg |
| Ile (I) | Leu; Val; Met; Ala; Phe | Leu |
| Leu (L) | Ile; Val; Met; Ala; Phe | Ile |
| Lys (K) | Arg; Gln; Asn | Arg |
| Met (M) | Leu; Phe; Ile | Leu |
| Phe (F) | Leu; Val; Ile; Ala; Tyr | Leu |
| Pro (P) | Ala | Ala |
| Ser (S) | Thr | Thr |
| Thr (T) | Ser | Ser |
| Trp (W) | Tyr; Phe | Tyr |
| Tyr (Y) | Trp; Phe; Thr; Ser | Phe |
| Val (V) | Ile; Leu; Met; Phe; Ala | Leu |

Anti-NKG2A Antibody

In the present invention, the antibody is an anti-NKG2A antibody. The present invention provides a high-specificity and high-affinity antibody against NKG2A, which comprises a heavy chain and a light chain, the heavy chain contains a heavy chain variable region (VH) amino acid sequence, and the light chain contains a light chain variable region (VL) amino acid sequence.

Preferably,

The variable region of the heavy chain (VH) has a complementarity determining region CDR selected from the group consisting of:

a VH-CDR1 as shown in SEQ ID NO. 8n+2,
a VH-CDR2 as shown in SEQ ID NO. 8n+3, and
a VH-CDR3 as shown in SEQ ID NO. 8n+4;
wherein, each n is independently 0, 1, 2, 3, 4, 5, 6, 7 or 8;

The variable region of light chain (VL) has a complementarity determining region CDR selected from the group consisting of:

a VL-CDR1 as shown in SEQ ID NO. 8n+6,
a VL-CDR2 as shown in SEQ ID NO. 8n+7, and
a VL-CDR3 as shown in SEQ ID NO. 8n+8;
wherein, each n is independently 0, 1, 2, 3, 4, 5, 6, 7 or 8;

wherein any one of the above amino acid sequences further includes a derivative sequence that is optionally added, deleted, modified, and/or substituted for at least one amino acid and can retain the binding affinity of NKG2A.

Preferably, the heavy chain variable region (VH) includes the following three complementarity determining region CDRs:

a VH-CDR1 as shown in SEQ ID NO. 8n+2,
a VH-CDR2 as shown in SEQ ID NO. 8n+3, and
a VH-CDR3 as shown in SEQ ID NO. 8n+4;

The light chain variable region (VL) includes the following three complementarity determining region CDRs:

a VL-CDR1 as shown in SEQ ID NO. 8n+6,
a VL-CDR2 as shown in SEQ ID NO. 8n+7, and
a VL-CDR3 as shown in SEQ ID NO. 8n+8;
each n is independently 0, 1, 2, 3, 4, 5, 6, 7 or 8; preferably n is 0 or 1;

wherein any one of the above amino acid sequences further includes a derivative sequence that is optionally added, deleted, modified, and/or substituted for at least one amino acid and can retain the binding affinity of NKG2A.

In another preferred embodiment, the sequence formed by added, deleted, modified and/or substituted for at least one amino acid sequence is preferably an amino acid sequence with homology or sequence identity of at least 80%, preferably at least 85%, more preferably, at least 90%, and most preferably at least 95%.

Methods of determining sequence homology or identity well-known to those of ordinary skilled in the art include, but are not limited to: Computational Molecular Biology, edited by Lesk, A. M., Oxford University Press, New York, 1988; Biocomputing:

Information Biocomputing: Informatics and Genome Projects, edited by Smith, D. W., Academic Press, New York, 1993; Computer Analysis of Sequence Data, Part 1, edited by Griffin, A. M. and Griffin, H. G., Humana Press, New Jersey, 1994; Sequence Analysis in Molecular Biology, von Heinje, G., Academic Press, 1987 and Sequence Analysis Primer, Gribskov, M. and Devereux, J. Ed. M Stockton Press, New York, 1991 and Carillo, H. and Lipman, D., SIAM J. Applied Math., 48:1073 (1988). The preferred method for determining identity is to obtain the largest match between the tested sequences. The method for determining identity is compiled in a publicly available computer program. Preferred computer program methods for determining the identity between two sequences include but are not limited to: GCG package (Devereux, J. et al., 1984), BLASTP, BLASTN and FASTA (Altschul, S, F. et al., 1990). The public can obtain the BLASTX program from NCBI and other sources (BLAST Handbook, Altschul, S. et al., NCBI NLM NIH Bethesda, Md. 20894; Altschul, S. et al., 1990). The well-known Smith Waterman algorithm can also be used to determine identity.

Preferably, the antibody as described herein is one or more of an antibody full-length protein, an antigen-antibody binding domain protein fragment, a bispecific antibody, a multispecific antibody, a single chain antibody (Single chain antibody fragment, ScFv), single domain antibody (SdAb) and Signle-domain antibody, and monoclonal or polyclonal antibodies prepared from the above antibodies. The monoclonal antibody can be developed by a variety of approaches and technologies, including hybridoma technology, phage display technology, single lymphocyte gene cloning technology, etc. The mainstream is to prepare monoclonal antibodies from wild-type or transgenic mice through hybridoma technology.

The antibody full-length protein is a conventional antibody full-length protein in the art, which comprises a heavy chain variable region, a light chain variable region, a heavy chain constant region and a light chain constant region. The heavy chain variable region and light chain variable region of the protein constitute a fully human antibody full-length protein with the human heavy chain constant region and the human light chain constant region. Preferably, the antibody full-length protein is IgG1, IgG2, IgG3 or IgG4.

The antibody of the present invention may be a double-chain or single-chain antibody, and may be selected from the group consisting of animal-derived antibodies, chimeric antibodies, humanized antibodies, more preferably humanized antibodies, human-animal chimeric antibodies, more preferably a fully humanized antibody.

The antibody derivatives of the present invention may be single-chain antibodies, and/or antibody fragments, such as: Fab, Fab', (Fab')2 or other known antibody derivatives in the art and the like, and any one or more of IgA, IgD, IgE, IgG and IgM antibodies or antibodies of other subtypes.

The single chain antibody is a conventional single chain antibody in the art, which comprises a heavy chain variable region, a light chain variable region and a short peptide of 15-20 amino acids.

Wherein the animal is preferably a mammal, such as a mouse.

The antibody of the present invention may be a chimeric antibody, a humanized antibody, a CDR grafted and/or modified antibody targeting NKG2A (such as human NKG2A)

In the above content of the present invention, the number of added, deleted, modified and/or substituted amino acids is preferably no more than 40% of the total number of amino acids in the initial amino acid sequence, more preferably no more than 35%, more preferably 1-33%, more preferably 5-30%, more preferably 10-25%, more preferably 15-20%.

In the above content of the present invention, more preferably, the number of added, deleted, modified and/or substituted amino acids can be 1-7, more preferably 1-5, more preferably 1-3, more preferably 1-2.

In another preferred embodiment, the heavy chain variable region of the antibody comprises the amino acid sequence as shown in SEQ ID NO.1, 9, 17, 25, 33, 41, 49, 57 or 65.

In another preferred embodiment, the light chain variable region of the antibody contains the amino acid sequence as shown in SEQ ID NO. 5, 13, 21, 29, 37, 45, 53, 61 or 69.

In another preferred embodiment, the amino acid sequence of the variable region of the heavy chain (VH) of the antibody targeting NKG2A, and/or the amino acid sequence of the variable region of the light chain are shown in Table 2-1 below:

TABLE 2-1

| Antibody number | VH sequence Number | VL sequence Number |
|---|---|---|
| 1 | 1 | 5 |
| 2 | 9 | 13 |
| 3 | 17 | 21 |
| 4 | 25 | 29 |
| 5 | 33 | 37 |
| 6 | 41 | 45 |
| 7 | 49 | 53 |
| 8 | 57 | 61 |
| 9 | 65 | 69 |

In another preferred embodiment, the antibodies targeting NKG2A are M15-5, Mpb416, Mab031, Mab032, Mab033, Mab036, 2F10, 9B10, 14G3.

In another preferred embodiment, the antibody targeting NKG2A is M15-5.

In another preferred embodiment, the antibody targeting NKG2A is Mpb416.

added, deleted, modified, and/or substituted for at least one amino acid and can retain the binding affinity of NKG2A.

In another preferred embodiment, the sequence formed by added, deleted, modified and/or substituted for at least one amino acid sequence is preferably an amino acid sequence with homology or sequence identity of at least 80%, preferably at least 85%, more preferably, at least 90%, and most preferably at least 95%.

In another preferred embodiment, the recombinant protein of the present invention includes the heavy chain variable region of the NKG2A antibody and/or the light chain variable region of the NKG2A antibody. The heavy chain variable region of the antibody contains the amino acid sequence as shown in SEQ ID NO. 1, 9, 17, 25, 33, 41, 49, 57 or 65; the light chain variable region of the antibody contains the amino acid sequence as shown in SEQ ID NO. 5, 13, 21, 29, 37, 45, 53, 61 or 69.

In another preferred embodiment, the recombinant protein of the present invention includes the heavy chain variable region of the NKG2A antibody and/or the light chain variable region of the NKG2A antibody. The heavy chain variable region of the antibody contains the amino acid sequence as shown in SEQ ID NO. 1, 9, 17, 25, 33, 41, 49, 57 or 65; and the light chain variable region of the antibody contains the amino acid sequence as shown in SEQ ID NO. 5, 13, 21, 29, 37, 45, 53, 61 or 69.

In another preferred embodiment, the sequence numbers of the recombinant protein and the amino acid sequences of the heavy chain CDR1-3 and the light chain CDR1-3 included in the recombinant protein are shown in Table 2-2:

TABLE 2-2

| Sequence numbers of amino acid sequences of heavy chain CDR1-3 and light chain CDR1-3 | | | | | | | | |
|---|---|---|---|---|---|---|---|---|
| Recombinant | Heavy chain protein | | | | Light chain protein | | | |
| protein number | Variable region | VH-CDR1 | VH-CDR2 | VH-CDR3 | Variable region | VL-CDR1 | VL-CDR2 | VL-CDR3 |
| 1 | 1 | 2 | 3 | 4 | 5 | 6 | 7 | 8 |
| 2 | 9 | 10 | 11 | 12 | 13 | 14 | 15 | 16 |
| 3 | 17 | 18 | 19 | 20 | 21 | 22 | 23 | 24 |
| 4 | 25 | 26 | 27 | 28 | 29 | 30 | 31 | 32 |
| 5 | 33 | 34 | 35 | 36 | 37 | 38 | 39 | 40 |
| 6 | 41 | 42 | 43 | 44 | 45 | 46 | 47 | 48 |
| 7 | 49 | 50 | 51 | 52 | 53 | 54 | 55 | 56 |
| 8 | 57 | 58 | 59 | 60 | 61 | 62 | 63 | 64 |
| 9 | 65 | 66 | 67 | 68 | 69 | 70 | 71 | 72 |

Recombinant Protein

The present invention also provides a recombinant protein comprising one or more of the heavy chain CDR1 (VH-CDR1), the heavy chain CDR2 (VH-CDR2) and the heavy chain CDR3 (VH-CDR3) of the NKG2A antibody, and/or one or more of the light chain CDR1 (VL-CDR1), light chain CDR2 (VL-CDR2) and light chain CDR3 (VL-CDR3) of the NKG2A antibody, the sequence of the heavy chain CDR1-3 is as follows:
VH-CDR1 as shown in SEQ ID NO.8n+2,
VH-CDR2 as shown in SEQ ID NO. 8n+3, and
VH-CDR3 as shown in SEQ ID NO. 8n+4;
the sequence of the light chain CDR1-3 is as follows:
VL-CDR1 as shown in SEQ ID NO. 8n+6,
VL-CDR2 as shown in SEQ ID NO. 8n+7, and
VL-CDR3 as shown in SEQ ID NO. 8n+8;
each n is independently 0, 1, 2, 3, 4, 5, 6, 7 or 8; preferably n is 0;
wherein any one of the above amino acid sequences further includes a derivative sequence that is optionally Wherein, any one of the above amino acid sequences further includes a derivative sequence that is optionally added, deleted, modified and/or substituted for at least one amino acid and can retain the binding affinity of NKG2A.

Preferably, the recombinant protein further comprises an antibody heavy chain constant region and/or an antibody light chain constant region. The antibody heavy chain constant region is conventional in the art, preferably a rat-derived antibody heavy chain constant region or a human-derived antibody heavy chain constant region, more preferably a human-derived antibody heavy chain constant region. The antibody light chain constant region is conventional in the art, preferably a rat-derived light chain antibody constant region or a human-derived antibody light chain constant region, and more preferably a human-derived antibody light chain constant region.

The recombinant protein is a conventional protein in the art, preferably one or more of an antibody full-length protein, an antigen-antibody binding domain protein fragment, a bispecific antibody, a multispecific antibody, a single chain antibody (single chain antibody fragment, scFv), a single domain antibody (SdAb) and a Signle-domain antibody, and monoclonal or polyclonal antibodies prepared from the above antibodies. The monoclonal antibody can be developed by a variety of approaches and technologies, including hybridoma technology, phage display technology, single lymphocyte gene cloning technology, etc. The mainstream is to prepare monoclonal antibodies from wild-type or transgenic mice through hybridoma technology.

The antibody full-length protein is a conventional antibody full-length protein in the art, which comprises a heavy chain variable region, a light chain variable region, a heavy chain constant region and a light chain constant region. The heavy chain variable region and light chain variable region of the protein constitute the full-length protein of the fully human antibody with the human heavy chain constant region and the human light chain constant region. Preferably, the antibody full-length protein is IgG1, IgG2, IgG3 or IgG4.

The single chain antibody is a conventional single chain antibody in the art, which comprises a heavy chain variable region, a light chain variable region and a short peptide of 15-20 amino acids.

The antigen-antibody binding domain protein fragment is a conventional antigen-antibody binding domain protein fragment in the art, which includes a light chain variable region, a light chain constant region and a Fd segment of heavy chain constant region. Preferably, the antigen-antibody binding domain protein fragment is Fab and F(ab').

The single domain antibody is a conventional single domain antibody in the art, which includes a heavy chain variable region and a heavy chain constant region.

The single-region antibody is a conventional single-region antibody in the art, which only includes the heavy chain variable region.

The preparation method of the recombinant protein is the conventional preparation method in the field. The preparation method is preferably: isolating and obtaining from the expression transformant that recombinantly expresses the protein or obtaining by artificially synthesizing the protein sequence. The method of isolating and obtaining from the expression transformant that recombinantly express the protein is preferably as follows: cloning the nucleic acid molecule encoding the protein and carrying the point mutation into a recombinant vector, and transforming the obtained recombinant vector into the transformant to obtain the recombinant expression transformant and the recombinant protein can be obtained by separation and purification by culturing the obtained recombinant expression transformant.

Nucleic Acid

The present invention also provides a nucleic acid encoding the above-mentioned antibody (e.g., anti-NKG2A antibody) or recombinant protein or the variable region of the heavy chain or the variable region of the light chain of an anti-NKG2A antibody.

Preferably, the nucleotide sequence of the nucleic acid encoding the heavy chain variable region is as shown in the sequence listing of SEQ ID NO. 73, 75, 77, 79, 81, 83, 85, 87 or 89; and/or, the nucleotide sequence of the nucleic acid encoding the light chain variable region is as shown in the sequence listing of SEQ ID NO. 74, 76, 78, 80, 82, 84, 86, 88, or 90.

More preferably, the nucleotide sequence of the nucleic acid encoding the heavy chain variable region is as shown in the sequence listing of SEQ ID NO. 73, 75, 77, 79, 81, 83, 85, 87 or 89; and the nucleotide sequence of the nucleic acid encoding the light chain variable region is as shown in the sequence listing of SEQ ID NO. 74, 76, 78, 80, 82, 84, 86, 88, or 90.

The preparation method of the nucleic acid is a conventional preparation method in the field, and preferably comprises the following steps: obtaining a nucleic acid molecule encoding the above protein by a gene cloning technology, or obtaining a nucleic acid molecule encoding the above protein by an artificial full sequence synthesis method.

Those skilled in the art know that the base sequence encoding the amino acid sequence of the above-mentioned protein can be replaced, deleted, changed, inserted or added as appropriate to provide a polynucleotide homolog. The polynucleotide homologs of the present invention can be prepared by replacing, deleting or adding one or more bases of the gene encoding the protein sequence within the scope of maintaining antibody activity.

Vector

The present invention also provides a recombinant expression vector comprising the nucleic acid.

Wherein the recombinant expression vector can be obtained by conventional methods in the art, that is, the nucleic acid molecule of the present invention is connected to various expression vectors to be constructed. The expression vector is a variety of vectors conventional in the art, as long as it can accommodate the aforementioned nucleic acid molecules. The vectors preferably include various plasmids, cosmids, bacteriophages or viral vectors and the like.

The present invention also provides a recombinant expression transformant comprising the above-mentioned recombinant expression vector.

Wherein the preparation method of the recombinant expression transformant is the conventional preparation method in the art, preferably: being prepared by transforming the above-mentioned recombinant expression vector into a host cell. The host cell is a variety of conventional host cells in the art, as long as the recombinant expression vector can replicate itself stably and the nucleic acid carried can be effectively expressed. Preferably, the host cell is *E.coli* TG1 or *E.coli* BL21 cell (expressing single-chain antibody or Fab antibody), or HEK293 or CHO cell (expressing full-length IgG antibody). The aforementioned recombinant expression plasmid is transformed into a host cell to obtain the preferred recombinant expression transformant of the present invention. Wherein, the transformation method is a conventional transformation method in the art, preferably a chemical transformation method, a heat shock method or an electrotransformation method.

Antibody Preparation

The sequence of the DNA molecule of the antibody or its fragment of the present invention can be obtained by conventional techniques, such as PCR amplification or genomic library screening. In addition, the coding sequences of the light chain and the heavy chain can also be fused together to form a single chain antibody.

Once the relevant sequences are obtained, the relevant sequences can be obtained in large quantities by recombination method. It is usually cloned into a vector, then transferred into a cell, and then the relevant sequence is isolated from the host cell after proliferation by conventional methods.

In addition, the relevant sequences can also be synthesized by artificial synthesis, especially when the fragment length is short. Usually, several small fragments are synthesized first, and then are linked together to obtain a fragment with a long sequence.

At present, the DNA sequence encoding the antibody (or fragments or derivatives thereof) of the present invention can be obtained completely through chemical synthesis. The DNA sequence can then be introduced into various existing DNA molecules (or such as vectors) and cells known in the art. In addition, mutations can also be introduced into the protein sequence of the present invention through chemical synthesis.

The present invention further relates to a vector containing the above-mentioned appropriate DNA sequence and an appropriate promoter or control sequence. These vectors can be used to transform appropriate host cells so that they can express proteins.

The host cell may be a prokaryotic cell, such as a bacterial cell; or a lower eukaryotic cell, such as a yeast cell; or a higher eukaryotic cell, such as a mammalian cell. Preferred animal cells include (but are not limited to): CHO-S, HEK-293 cells.

Generally, the transformed host cell is cultured under conditions suitable for expression of the antibody of the present invention. Then the antibody of the present invention is purified by conventional immunoglobulin purification steps, such as protein A-Sepharose, hydroxyapatite chromatography, gel electrophoresis, dialysis, ion exchange chromatography, hydrophobic chromatography, molecular sieve chromatography or affinity chromatography and other conventional separation and purification methods well known to those skilled in the art.

The obtained monoclonal antibody can be identified by conventional means. For example, the binding specificity of monoclonal antibodies can be determined by immunoprecipitation or in vitro binding assays (such as radioimmunoassay (RIA) or enzyme-linked immunosorbent assay (ELISA)). The binding affinity of the monoclonal antibody can be determined, for example, by the Scatchard analysis of Munson et al., Anal. Biochem., 107:220 (1980).

The antibody of the present invention can be expressed in the cell, on the cell membrane, or secreted out of the cell. If necessary, the physical, chemical, and other characteristics can be used to separate and purify the recombinant protein through various separation methods. These methods are well known to those skilled in the art. Examples of these methods include, but are not limited to: conventional renaturation treatment, treatment with protein precipitation agent (salting out method), centrifugation, bacteria broken through osmosis, ultrasonic treatment, ultracentrifugation, molecular sieve chromatography (gel filtration), adsorption chromatography, ion exchange chromatography, high performance liquid chromatography (HPLC) and any other liquid chromatography, and combination thereof.

Antibody-Drug Conjugate (ADC)

The present invention also provides antibody-drug conjugate (ADC) based on the antibody of the present invention.

Typically, the antibody-drug conjugate comprises the antibody and an effector molecule, the antibody being coupled to the effector molecule, and preferably chemically coupled. Wherein the effector molecule is preferably a drug having therapeutic activity. In addition, the effector molecule may be one or more of toxic proteins, chemotherapeutic drugs, small molecule drugs or radionuclides.

The antibody of the present invention can be coupled with the effector molecule by a coupling agent. Examples of the coupling agent may be any one or more of a non-selective coupling agent, a coupling agent using a carboxyl group, a peptide chain, and a coupling agent using a disulfide bond. The non-selective coupling agent refers to a compound that makes the effector molecule and the antibody form a covalent bond, such as glutaraldehyde. The coupling agent using carboxyl groups can be any one or more of cis-aconitic acid anhydride coupling agents (such as cis-aconitic acid anhydride) and acyl hydrazone coupling agents (coupling sites are acyl hydrazones).

Certain residues on the antibody (such as Cys or Lys, etc.) are used to connect to a variety of functional groups, including imaging reagents (such as chromophores and fluorescent groups), diagnostic reagents (such as MRI contrast agents and radioisotopes), stabilizers (such as glycol polymers) and therapeutic agents. The antibody can be conjugated to the functional agent to form an antibody-functional agent conjugate. Functional agents (e.g., drugs, detection reagents, stabilizers) are coupled (covalently linked) to the antibody. The functional agent may be directly or indirectly linked to the antibody through a linker.

Antibodies can be conjugated with drugs to form antibody-drug conjugates (ADCs). Typically, the ADC contains a linker between the drug and the antibody. The linker can be a degradable or a non-degradable linker. Degradable linkers are typically easily degraded in the intracellular environment, for example, the linker is degraded at the target site, so that the drug is released from the antibody. Suitable degradable linkers include, for example, enzymatically degraded linkers, including peptidyl-containing linkers that can be degraded by intracellular proteases (such as lysosomal proteases or endosomal proteases), or sugar linkers, for example, a glucuronide-containing linker that can be degraded by glucuronidase. The peptidyl linker may include, for example, dipeptides such as valine-citrulline, phenylalanine-lysine or valine-alanine. Other suitable degradable linkers include, for example, pH-sensitive linkers (for example, linkers that are hydrolyzed at a pH of less than 5.5, such as hydrazone linkers) and linkers that degrade under reducing conditions (for example, disulfide bond linkers). Non-degradable linkers typically release the drug under conditions where the antibody is hydrolyzed by a protease.

Before being connected to the antibody, the linker has a reactive group capable of reacting with certain amino acid residues, and the connection is achieved through the reactive group. Sulfhydryl-specific reactive groups are preferred and include, for example, maleimide compounds, halogenated amides (such as iodine, bromine, or chloro); halogenated esters (such as iodine, bromine, or chloro); halogenated methyl ketones (such as iodine, bromine or chloro), benzyl halides (such as iodine, bromine or chloro); vinyl sulfone, pyridyl disulfide; mercury derivatives such as 3,6-Di-(mercury methyl) dioxane, and the counter ion is acetate, chloride or nitrate; and polymethylene dimethyl sulfide thiosulfonate. The linker may include, for example, maleimide linked to the antibody via thiosuccinimide.

The drug can be any cytotoxic, inhibiting cell growth or immunosuppressive drug. In embodiments, the linker connects the antibody and the drug, and the drug has a functional group that can be bonded to the linker. For example, the drug may have an amino group, a carboxyl group, a sulfhydryl group, a hydroxyl group, or a ketone group that can form a bond with the linker. In the case where the drug is directly connected to the linker, the drug has a reactive active group before being connected to the antibody.

Useful drug categories include, for example, anti-tubulin drugs, DNA minor groove binding reagents, DNA replication inhibitors, alkylating reagents, antibiotics, folate antagonists, antimetabolites, chemotherapy sensitizers, topoisomerase inhibitors, vinca alkaloids, etc. Examples of particularly useful cytotoxic drugs include, for example, DNA minor groove binding reagents, DNA alkylating reagents, and tubulin inhibitors. Typical cytotoxic drugs include, for example, auristatins, camptothecins, duocarmycins, etoposides, maytansines and maytansinoids (e.g., DM1 and DM4), taxanes, benzodiazepines or benzodiazepine containing drugs (e.g., pyrrolo[1,4] benzodiazepines (PBDs), indolinobenzodiazepines and oxazolidinobenzodiazepines and vinca alkaloids.

In the present invention, the drug-linker can be used to form ADC in one simple step. In other embodiments, bifunctional linker compounds can be used to form ADCs in a two-step or multi-step process. For example, the cysteine residue reacts with the reactive part of the linker in the first step, and in the subsequent step, the functional group on the linker reacts with the drug to form ADC.

Generally, the functional group on the linker is selected to facilitate the specific reaction with the appropriate reactive group on the drug moiety. As a non-limiting example, the azide-based moiety can be used to specifically react with the reactive alkynyl group on the drug moiety. The drug is covalently bound to the linker through the 1,3-dipolar cycloaddition between the azide and alkynyl groups. Other useful functional groups include, for example, ketones and aldehydes (suitable for reacting with hydrazides and alkoxyamines), phosphines (suitable for reacting with azides); isocyanates and isothiocyanates (suitable for reaction with amines and alcohols); and activated esters, such as N-hydroxysuccinimide ester (suitable for reaction with amines and alcohols). These and other ligation strategies, such as those described in "Bioconjugation Technology", Second Edition (Elsevier), are well known to those skilled in the art. Those skilled in the art can understand that for the selective reaction between the drug moiety and the linker, when a complementary pair of reactive functional groups is selected, each member of the complementary pair can be used for both linkers and drugs.

The present invention also provides a method for preparing ADC, which may further includes: combining an antibody with a drug-linker compound under conditions sufficient to form an antibody conjugate (ADC).

In certain embodiments, the method of the invention includes combining the antibody with a bifunctional linker compound under conditions sufficient to form an antibody-linker conjugate. In these embodiments, the method of the present invention further includes: binding the antibody linker conjugate to the drug moiety under conditions sufficient to covalently link the drug moiety to the antibody via a linker.

In some embodiment, the antibody-drug conjugate ADC is shown in the following molecular formula:

wherein
Ab is an antibody,
LU is a linker;
D is a drug;
and the subscript p is a value selected from 1 to 8.

Application

The present invention also provides the use of the antibody, antibody conjugate ADC, recombinant protein, and/or immune cell of the present invention, for example, for preparing diagnostic preparations or preparing medicines.

Preferably, the drug is a drug for preventing and/or treating diseases related to abnormal expression or function of NKG2A.

In the present invention, the diseases related to abnormal expression or function of NKG2A are diseases related to abnormal expression or function of NKG2A conventionally in the art. Preferably, the disease related to the abnormal expression or function of NKG2A is cancer, autoimmune disease, inflammatory disease.

In the present invention, the cancer is a conventional cancer in the art, preferably a HLA-E overexpressing cancer, such as a HLA-E overexpressing lymphocytic leukemia, ovarian cancer, non-small cell lung cancer, head and neck cancer, etc.

In the present invention, the autoimmune disease is a conventional autoimmune disease in the art, preferably hemolytic anemia, pernicious anemia, polyarteritis nodosa, systemic lupus erythematosus, Alzheimer's disease, diabetes, etc.

The uses of the antibodies, ADCs, recombinant proteins, and/or immune cells of the present invention include (but are not limited to):

(i) diagnosis, prevention and/or treatment of tumor occurrence, growth and/or metastasis, especially tumors with high NKG2A expression. The tumors include (but are not limited to): preferably, HLA-E overexpressing cancers, such as HLA-E overexpressing lymphocytic leukemia, ovarian cancer, non-small cell lung cancer, head and neck cancer, etc.

(ii) diagnosis, prevention and/or treatment of autoimmune diseases, including (but not limited to): preferably hemolytic anemia, pernicious anemia, polyarteritis nodosa, systemic lupus erythematosus, Alzheimer's disease, diabetes, etc.

(iii) diagnosis, prevention and/or treatment of inflammatory diseases, including (but not limited to): rheumatoid arthritis, glomerulonephritis, myasthenia gravis, multiple sclerosis, alopecia areata, etc.

Detection Purposes and Kits

The antibody or ADC of the present invention can be used in detection applications, for example, to detect samples, so as to provide diagnostic information.

In the present invention, the samples (specimen) used include cells, tissue samples and biopsy specimens. The term "biopsy" used in the present invention shall include all kinds of biopsy known to those skilled in the art. Therefore, the biopsy used in the present invention may include, for example, excision samples of tumors, tissue samples prepared by endoscopic methods or organ puncture or needle biopsy.

The samples used in the present invention include fixed or preserved cell or tissue samples.

The present invention also provides a kit containing the antibody (or fragment thereof) of the present invention. In a preferred embodiment of the present invention, the kit further includes a container, instructions for use, buffers, and the like. In a preferred embodiment, the antibody of the present invention can be immobilized on a detection plate.

Pharmaceutical Composition

The invention also provides a composition. In a preferred example, the composition is a pharmaceutical composition, which contains the above-mentioned antibody or active fragment or fusion protein or ADC thereof or corresponding immune cell, and a pharmaceutically acceptable carrier. Generally, these substances can be formulated in a non-toxic, inert and pharmaceutically acceptable aqueous carrier medium, wherein the pH is usually about 5-8, preferably about 6-8, although the pH value can vary with the nature of the substance being formulated and the condition to be treated.

The formulated pharmaceutical composition can be administered by conventional routes, including (but are not limited to): intratumoral, intraperitoneal, intravenous, or topical administration. Typically, the route of administration of the pharmaceutical composition of the present invention is preferably injection or oral administration. The injection administration preferably includes intravenous injection, intramuscular injection, intraperitoneal injection, intradermal injection, or subcutaneous injection. The pharmaceutical composition is a variety of conventional dosage forms in the art, preferably in the form of solid, semi-solid or liquid, and can be an aqueous solution, non-aqueous solution or suspension, and more preferably a tablet, capsule, granule, injection or infusion, etc.

The antibody of the present invention can also be used for cell therapy by expressing the nucleotide sequence in a cell, for example, the antibody is used for chimeric antigen receptor T cell immunotherapy (CAR-T) and the like.

The pharmaceutical composition of the present invention is a pharmaceutical composition for preventing and/or treating diseases related to abnormal expression or function ofNKG2A.

The pharmaceutical composition of the present invention can be directly used to bind NKG2A protein molecules, and thus can be used to prevent and treat tumors and other diseases.

The pharmaceutical composition of the present invention contains a safe and effective amount (such as 0.001-99 wt %, preferably 0.01-90 wt %, more preferably 0.1-80 wt %) of the above-mentioned monoclonal antibody (or conjugate thereof) of the present invention and a pharmaceutical acceptable carrier or excipient. Such carriers include (but are not limited to): saline, buffer, glucose, water, glycerol, ethanol, and combinations thereof. The pharmaceutical preparation should match the mode of administration. The pharmaceutical composition of the present invention can be prepared in the form of injections, for example, it can be prepared by conventional methods with physiological saline or an aqueous solution containing glucose and other adjuvants. Pharmaceutical compositions such as injections and solutions should be manufactured under aseptic conditions. The dosage of the active ingredient is a therapeutically effective amount, for example, about 1 microgram/kg body weight to about 5 mg/kg body weight per day. In addition, the polypeptides of the present invention can also be used together with other therapeutic agents.

In the present invention, preferably, the pharmaceutical composition of the present invention further includes one or more pharmaceutical carriers. The pharmaceutical carrier is a conventional pharmaceutical carrier in the art, and the pharmaceutical carrier can be any suitable physiologically or pharmaceutically acceptable pharmaceutical excipient. The pharmaceutical excipients are conventional pharmaceutical excipients in the field, and preferably include pharmaceutically acceptable excipients, fillers or diluents. More preferably, the pharmaceutical composition includes 0.01-99.99% of the aforementioned protein and 0.01-99.99% of a pharmaceutical carrier, and the percentage is a mass percentage of the pharmaceutical composition.

In the present invention, preferably, the administration amount of the pharmaceutical composition is an effective amount, and the effective amount is an amount capable of alleviating or delaying the progression of the disease, degenerative or traumatic condition. The effective amount can be determined on an individual basis and will be partly based on consideration of the symptoms to be treated and the results sought. Those skilled in the art can determine the effective amount by using the aforementioned factors such as individual basis and using no more than conventional experiments.

When using the pharmaceutical composition, a safe and effective amount of the immunoconjugate is administered to the mammal, wherein the safe and effective amount is usually at least about 10 micrograms/kg body weight, and in most cases, it does not exceed about 50 mg/kg body weight, preferably the dosage is about 10 micrograms/kg body weight to about 20 mg/kg body weight. Of course, the specific dosage should also consider factors such as the route of administration, the patient's health status, etc., which are within the skill range of a skilled physician.

The present invention provides the application of the above-mentioned pharmaceutical composition in the preparation of drugs for preventing and/or treating diseases related to abnormal expression or function of NKG2A. Preferably, the disease related to the abnormal expression or function of NKG2A is cancer, autoimmune disease, inflammatory diseases.

Method and Composition for Detecting NKG2A Protein in Sample

The present invention also provides a method for detecting NKG2A protein in a sample (for example, detecting over-expressing NKG2A cells), which includes the following steps: the above-mentioned antibody is contacted with the sample to be tested in vitro, and it is sufficient to detect whether the above-mentioned antibody binds to the sample to be tested to form an antigen-antibody complex.

The meaning of overexpression is conventional in the art, and refers to the overexpression of NKG2A protein in RNA or protein in the sample to be tested (due to increased transcription, post-transcriptional processing, translation, post-translational processing and changes in protein degradation), as well as local overexpression and increased functional activity due to changes in protein transport mode (increased nuclear localization) (such as in the case of increased enzymatic hydrolysis of the substrate). In the present invention, the detection method of whether the above-mentioned binding to form an antigen-antibody complex is a conventional detection method in the art, preferably a flow cytometry (FACS) detection.

The present invention provides a composition for detecting NKG2A protein in a sample, which includes the above-mentioned antibody, recombinant protein, antibody conjugate, immune cell, or a combination thereof as an active ingredient. Preferably, it also includes a compound composed of the above-mentioned functional fragments of the antibody as an active ingredient.

On the basis of complying with common knowledge in the art, the above preferred conditions can be arbitrarily combined to obtain preferred examples of the present invention.

The Main Advantages of the Present Invention Are:
(1) The NKG2A antibody of the present invention has a high affinity with the NKG2A protein (the affinity constant KD reaches $1.04 \times 10^{-11}$);
(2) The NKG2A antibody of the present invention can bind to the extracellular region of the NKG2A protein receptor, and can effectively block the NKG2A protein at the cellular level, and prevent the binding of the NKG2A protein to the ligand HLA-E;
(3) The NKG2A antibody of the present invention has high specificity and lacks cross-reaction with human NKG2C and NKG2E protein antigens of the same family;

(4) The killing experiment mediated by primary isolated NK cells and NK92 cell lines has proved that the antibody of the present invention can significantly increase the lytic and killing activity of two cell-derived NK cells against tumor cells with high expression of HLA-E.

The present invention will be further elaborated below in conjunction with specific embodiments. It should be understood that these embodiments are only used to illustrate the present invention and not to limit the scope of the present invention. The following examples do not specify the detailed conditions of the experimental methods, usually according to the conventional conditions such as the conditions described in the "Molecular Cloning Laboratory Guide" (translated by Huang Peitang et al., Beijing: Science Press, 2002) by Sambrook. J et al., Or in accordance with the conditions recommended by the manufacturer (such as product specifications). Unless otherwise stated, percentages and parts are calculated by weight. The experimental materials and reagents used in the following examples can be obtained from commercial channels unless otherwise specified.

The room temperature described in the embodiment is a conventional room temperature in the art, and is generally 10-30° C.

EXAMPLE 1

Preparation of NKG2A Antibody (1) Preparation of Immunogen A

The nucleotide sequence encoding the amino acid sequence Pro94-Leu233 (as shown in SEQ ID NO.91 in the sequence listing) of the extracellular region of human-derived NKG2A protein was cloned into the pCpC vector (purchased from Invitrogen, V044-50) with human IgG Fc fragment (hFc) and prepared plasmids according to established standard molecular biology methods. At the same time, the nucleotide sequence encoding the amino acid sequence Lys32-Ile179 (as shown in SEQ ID NO.92 in the sequence listing) of the extracellular region of human-derived CD94 protein was cloned into the pCpC vector (purchased from Invitrogen, V044-50) with human IgG Fc fragment (hFc) and prepared plasmids according to established standard molecular biology methods. For specific methods, see Sambrook, J., Fritsch, E F, and Maniatis, T. (1989). Molecular Cloning: A Laboratory Manual, Second Edition (Plainview, N.Y.: Cold Spring Harbor Laboratory Press). HEK293 cells (purchased from Invitrogen) were transiently transfected (PEI, Polysciences) and the culture was expanded using FreeStyle™ 293 (Invitrogen) at 37° C. The cell culture medium was collected after 4 days. The cell components were removed by centrifugation to obtain the culture supernatant containing the heterodimer of the extracellular domain of NKG2A and CD94 protein. The culture supernatant was loaded onto a protein A affinity chromatography column (Mabselect Sure, purchased from GE Healthcare), at the same time, using an ultraviolet (UV) detector to monitor the change of the UV absorption value (A280 nm). After loading the sample, washing the protein A affinity chromatography column with PBS phosphate buffer (pH 7.2) until the UV absorption value returns to the baseline, and then eluted with 0.1M glycine hydrochloric acid (pH 2.5), collecting the hFc-tagged NKG2A/CD94 protein (NKG2A/CD94-hFc) eluted from the protein A affinity chromatography column, and using PBS phosphate buffer (pH 7.2) for the dialysis overnight in a refrigerator at 4° C. The dialyzed protein was sterile filtered by 0.22 micron and stored at −80° C. to obtain the purified immunogen A. Immunogen A undergoes a series of quality control tests before use, such as tests of protein concentration, purity, molecular weight, biological activity, etc.

The result is shown in FIG. 1. The binding of NKG2A/CD94 protein to the control antibody at the protein level varies with the concentration of the antibody. Wherein, the control protein is a non-NKG2A/CD94 fusion protein. The data in the table is the OD450 nm value.

(2) Preparation of Immunogen B

NKG2A full-length amino acid sequence cDNA (shown in SEQ ID NO.93 in the sequence listing) and CD94 full-length amino acid (shown in SEQ ID NO.94 in the sequence listing) were cloned from the DNA sequence into the Pcho1.0 vector (purchased from Invitrogen), and coated on 1.0 um gold colloidal bullets, immunized with Helios Gene Gun (Helios Gene Gun System, Bio-rad, catalogue number 165-2431). Among them, for the method of coating on the 1.0 μm gold colloidal bullet and immunization, please refer to the instruction manual of Helios gene gun. After immunization, immunogen B was obtained.

(3) Preparation of Immunogen C

After the prepared immunogen B was transfected into HEK293 cell line (both purchased from Invitrogen) with plasmids (PEI, purchased from Polysciences), selectively culture was performed in DMEM medium containing 10% (w/w) fetal bovine serum containing 0.5 μg/ml for 2 weeks. It was subcloned in 96-well culture plate by limiting dilution method, and incubated at 37° C., 5% (v/v) $CO_2$. After about 2 weeks, parts of the monoclonal wells were selected to be amplified into the 6-well plate. The amplified clones were screened by flow cytometry using the known NKG2A antibody (CP in house) and CD94 antibody (purchased from eBioscience). Selecting a cell line with better growth, higher fluorescence intensity, and monoclonal to continue expanding culture and cryopreserving in liquid nitrogen to obtain the immunogen C. The specific selection results are shown in Table 3. The positive cells (%) in Table 3 refer to the percentage of positive cells in the total number of cells. A series of HEK293 cell lines expressing both NKG2A and CD94 were obtained.

TABLE 3

FACS screening detection results of HEK293 cells transfected with NKG2A/CD94 protein

| 293F/ transfected cell clone number | NKG2A antibody | | CD94 antibody | |
| --- | --- | --- | --- | --- |
| | % Positive cells | Mean fluorescence intensity (MFI) | % Positive cells | Mean fluorescence intensity (MFI) |
| 1B4 | 98.01 | 195.87 | 89.32 | 48.73 |
| 1B5 | 98.24 | 144.92 | 93.48 | 59.8 |
| 1C4 | 87.74 | 79.92 | 65.51 | 23.99 |
| 1D2 | 96.23 | 60.44 | 68.25 | 16.74 |
| 1D4 | 95.75 | 104.78 | 83.34 | 28.34 |
| 1D5 | 97.2 | 136.4 | 84.76 | 33.34 |
| 1E2 | 95.8 | 75.97 | 79.5 | 24.85 |
| 1E3 | 96.74 | 242.58 | 89.01 | 54.72 |
| 1F3 | 99.15 | 123.17 | 95.43 | 45.24 |
| 1F4 | 95.78 | 78.4 | 80.41 | 24.13 |
| 1F5 | 92.81 | 149.56 | 80.62 | 45.84 |
| 1G3 | 98.89 | 292.64 | 93.98 | 82.28 |
| 3F9 | 96.57 | 149.29 | 89.4 | 47.49 |
| 293F | 12.1 | 3.49 | 1.45 | 2.8 |

(4) Preparation of Immunogen D

After the prepared immunogen B was transfected into CHOK1 cell line (both purchased from Invitrogen) with plasmids (PEI, purchased from Polysciences), selectively culture was performed in DMEM medium containing 10% (w/w) fetal bovine serum containing 0.5 µg/ml for 2 weeks. It was subcloned in 96-well culture plate by limiting dilution method, and incubated at 37° C., 5% (v/v) $CO_2$. After about 2 weeks, some monoclonal wells were selected and amplified into 6-well plates. The amplified clones were screened by flow cytometry using the known NKG2A antibody (CP in house) and CD94 antibody (purchased from eBioscience). Selecting a cell line with better growth, higher fluorescence intensity, and monoclonal to continue expanding culture and cryopreserving in liquid nitrogen to obtain immunogen C. The specific selection results are shown in Table 4. Positive cells (%) in Table 4 refer to the percentage of positive cells in the total number of cells.

TABLE 4

FACS screening detection results of CHOK1 cells transfected with NKG2A/CD94

| CHOK1/ transfected cell clone number | NKG2A antibody | | CD94 antibody | |
|---|---|---|---|---|
| | % Positive cells | Mean fluorescence intensity (MFI) | % Positive cells | Mean fluorescence intensity (MFI) |
| 7GD01 | 64.2141 | 13.2815 | 13.9151 | 5.93109 |
| 8ED02 | 99.8917 | 168.521 | 99.8053 | 106.986 |
| 11ED03 | 99.966 | 701.665 | 99.9491 | 441.08 |
| 8BD04 | 99.9328 | 408.744 | 99.6264 | 286.892 |
| 9DD05 | 99.6577 | 301.218 | 98.4058 | 115.382 |
| 11FD06 | 99.8979 | 299.309 | 99.7855 | 199.343 |
| 3FD07 | 96.0459 | 180.869 | 99.7692 | 163.513 |
| 4ED08 | 99.9431 | 161.471 | 100 | 438.975 |
| 6GD09 | 98.7203 | 188.558 | 98.9649 | 82.2244 |
| 4BD10 | 7.40788 | 4.95668 | 94.8532 | 35.3329 |
| 6ED11 | 99.3375 | 102.346 | 99.4366 | 153.888 |
| 7FD12 | 98.9132 | 52.074 | 57.5031 | 23.9373 |
| CHOK1 | 3.94 | 4.29 | 3.96 | 3.91 |

Table 4 indicates that a series of CHOK1 cell lines expressing both NKG2A and CD94 have been prepared.

(5) Preparation of Immunogen E

The full-length amino acid sequence of macaque NKG2A (shown in SEQ ID NO.95 in the sequence listing) and the full-length amino acid of CD94 (shown in SEQ ID NO.96 in the sequence listing) were cloned into the Pcho 1.0 vector (purchased from Invitrogen). After the prepared plasmid was transfected (PEI, purchased from Polysciences) to the 293 cell line (all purchased from Invitrogen), selectively culture was performed for 2 weeks in DMEM medium containing 10% (w/w) fetal bovine serum containing 0.5 µg/ml. It was subcloned in 96-well culture plate by limiting dilution method, and incubated at 37° C., 5% (v/v) $CO_2$. After about 2 weeks, parts of the monoclonal wells were selected to be amplified into the 6-well plate. The amplified clones were screened by flow cytometry using the known NKG2A antibody (CP in house) and CD94 antibody (purchased from eBioscience). Selecting a cell line with better growth, higher fluorescence intensity, and monoclonal, and continuing to expand the culture and freeze in liquid nitrogen, that is, immunogen E was obtained.

(4) Preparation of Hybridoma Cells and Antibody Screening

A. Immunogen A was used to immunize Balb/c mice aged 6-8 weeks and the mice were raised under SPF conditions. When the initial immunization, immunogen A protein was emulsified with Freund's complete adjuvant and injected intraperitoneally with 0.25 ml, that is, 50 micrograms of immunogen A protein was injected per mouse. When boosting immunization, immunogen A protein was emulsified with Freund's incomplete adjuvant and 0.25 ml was injected intraperitoneally, that is, 50 micrograms of immunogen A protein was injected per mouse. There was an interval of 2 weeks between the initial immunization and the first booster immunization, and an interval of 3 weeks between each subsequent booster immunization. Blood was collected one week after each booster immunization, and the antibody titer and specificity of immunogen A in the serum were detected by ELISA and FACS.

Figure 2A:
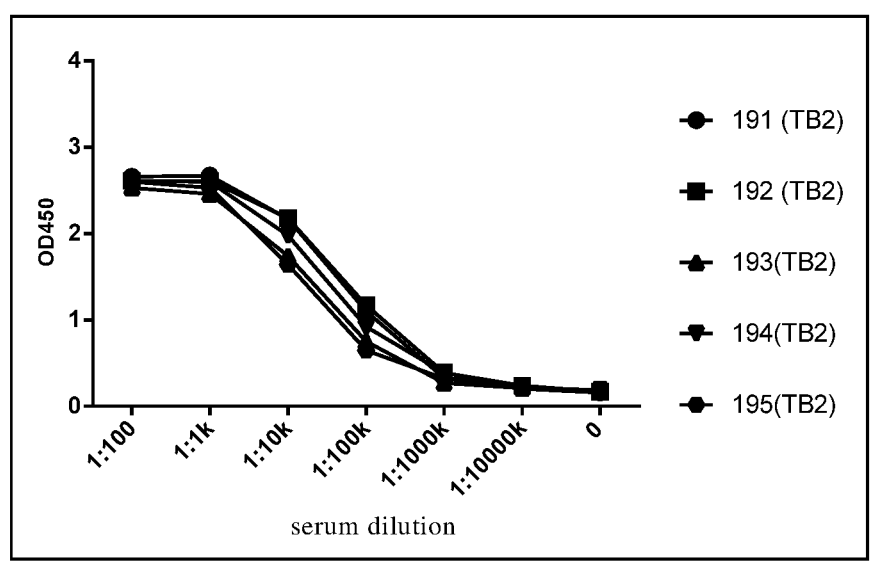
FIG. 2a shows ELISA detection of the antibody titer of Balb/c mice serum after immunization.
Figure 2B:
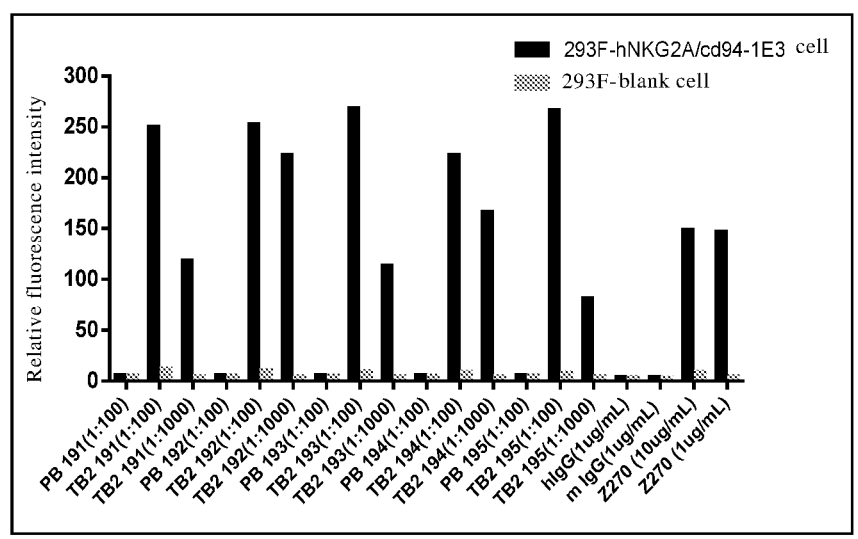
FIG. 2b shows the FACS detection of serum antibody titer in Balb/c mice after immunization.

The results are shown in FIG. 2a. The serum of mice immunized with human NKG2A/CD94 ECD-Fc has different degrees of binding to the immunogen, showing an antigen-antibody response, and the highest dilution is about 100,000. FIG. 2b shows that mouse serum can also specifically bind to human NKG2A on the cell surface, with the highest dilution being 1000 times.

B. Immunogen D was used to immunize 6-8 weeks old SJL mice, and the mice were raised under SPF conditions. Expanding immunogen D in a T-75 cell culture flask to 90% confluence, aspirating the medium, washed twice with F12K basal medium (purchased from Invitrogen), and then treated with enzyme-free cell dissociation solution (purchased from Invitrogen) at 37° C. until the cells can be detached from the wall of the petri dish, and collecting the cells. Washed twice with F12K basal medium, and after cell counting, the cells were diluted with phosphate buffer (pH 7.2) to $2 \times 10^7$ cells per ml. Each mouse was intraperitoneally injected with 0.5 ml of cell suspension during each immunization. There was an interval of 2 weeks between the first and second immunizations, and an interval of 3 weeks between each subsequent immunization. Except for the first immunization, blood was collected one week after each immunization, and the antibody titer and specificity in the serum were detected by ELISA and FACS.

Figure 3A:
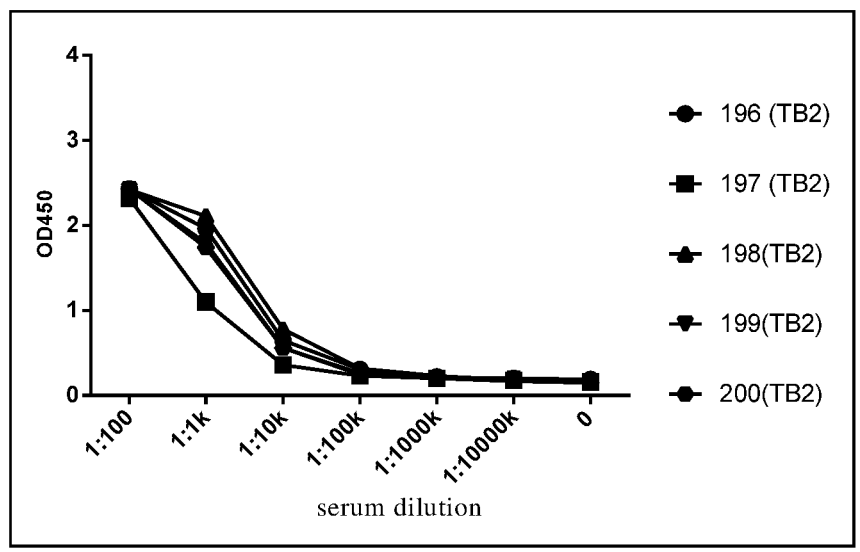
FIG. 3a shows ELISA detection of the serum antibody titer of SJL mice after immunization.
Figure 3B:
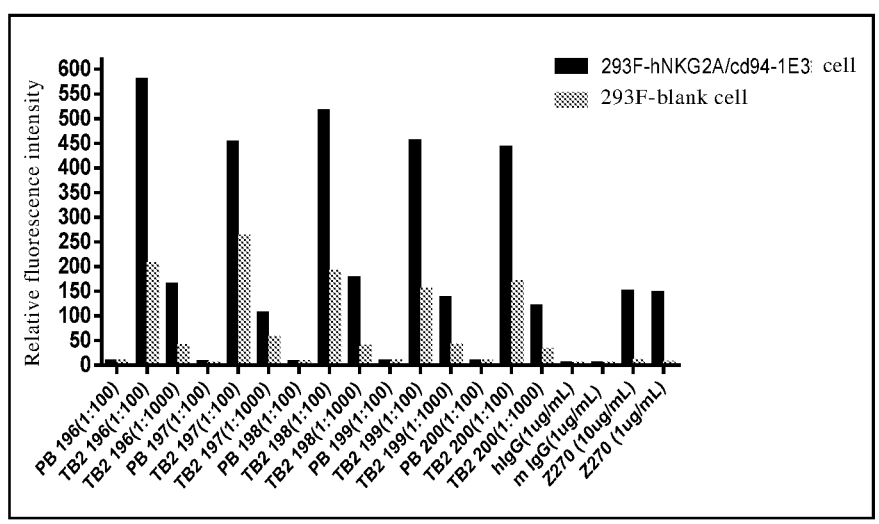
FIG. 3b shows FACS detection of the serum antibody titer in SJL mice after immunization.

The result is shown in FIG. 3a. The mouse serum has different degrees of binding to the immunogen, showing an antigen-antibody response, and the highest dilution is about 10,000. FIG. 3b shows that mouse serum can also specifically bind to human NKG2A on the cell surface, with the highest dilution being 1000 times.

Figure 4:
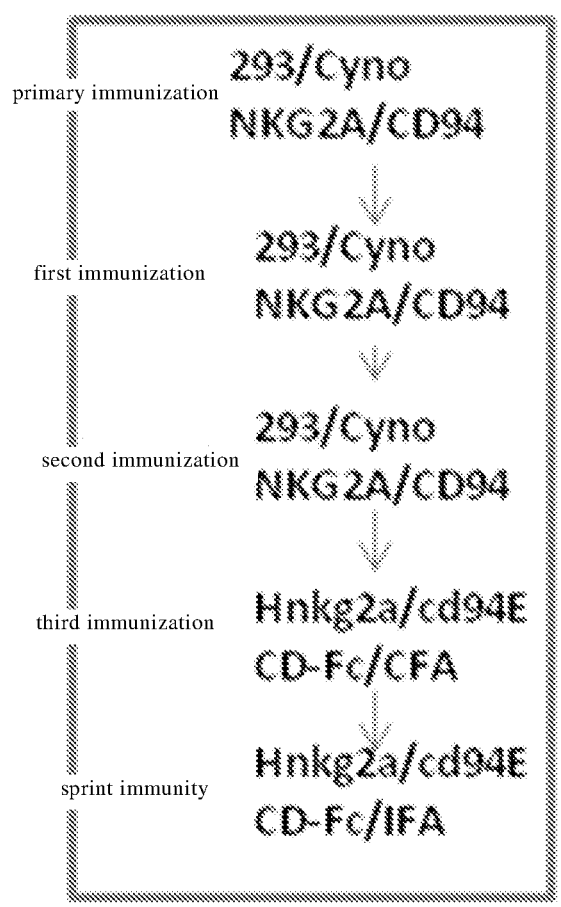
FIG. 4 shows the technical process of animal immunization.
Figure 5A:
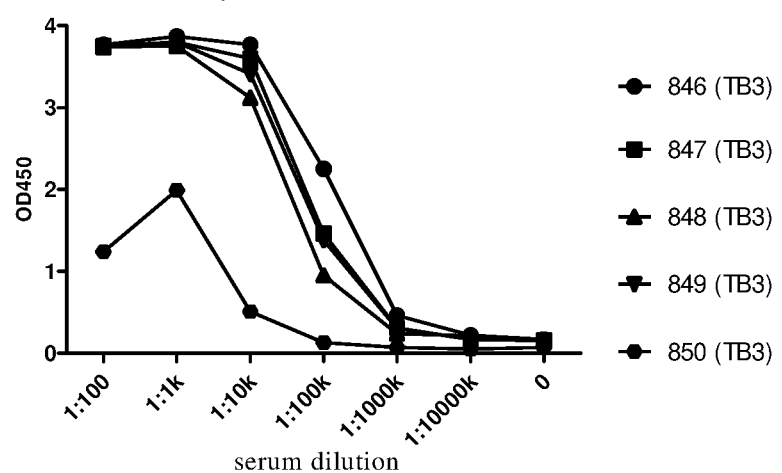
FIG. 5a shows ELISA detection of the serum antibody titer of Balb/c mice after immunization.
Figure 5B:
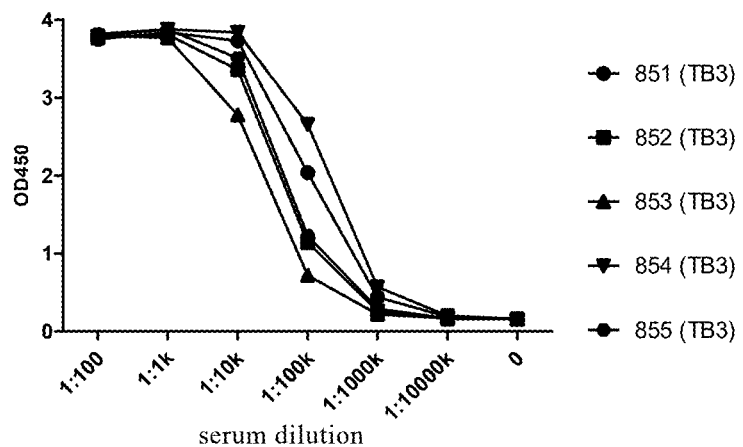
FIG. 5b shows ELISA detection of the serum antibody titer of SJL mice after immunization.
Figure 6A:
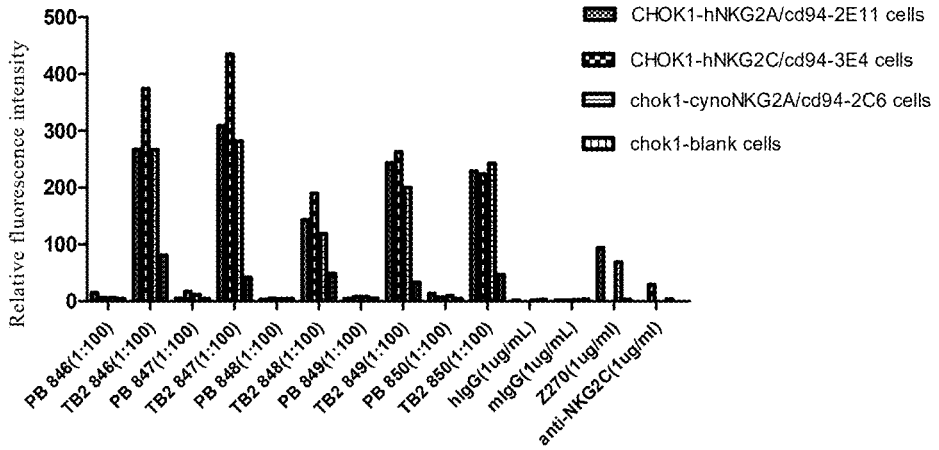
FIG. 6a shows the FACS detection of serum antibody titers in Balb/c mice after immunization, wherein cyno refers to macaque.
Figure 6B:
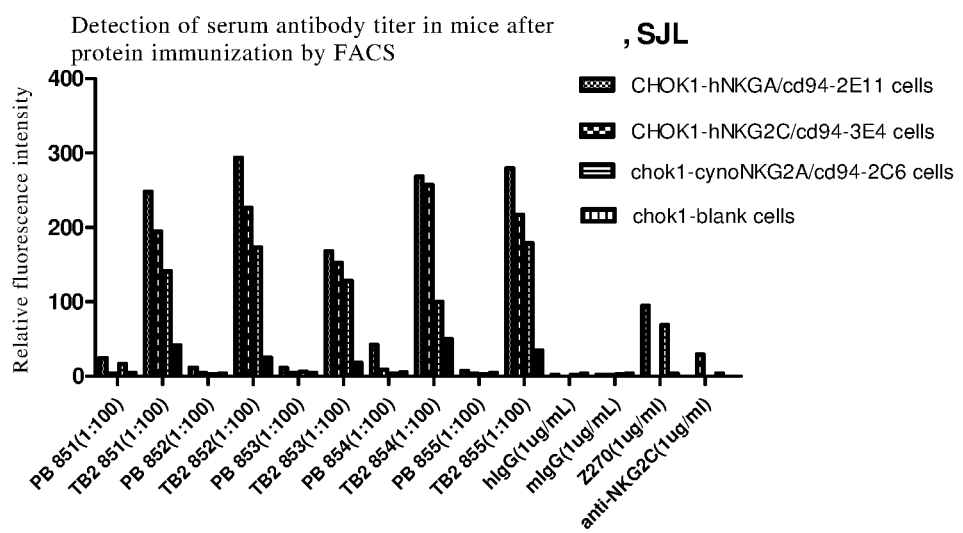
FIG. 6b shows the FACS detection of serum antibody titer in SJL mice after immunization.

C. Immunogen E was used to immunize SJL and Balb/c mice at the age of 6-8 weeks, and the mice were raised under SPF conditions. Expanding the immunogen E in a T-75 cell culture flask to 90% confluence, aspirating the medium, washed twice with DMEM basal medium (purchased from Invitrogen), and then treated with enzyme-free cell dissociation solution (purchased from Invitrogen) at 37° C. until the cells can be detached from the wall of the petri dish, and collecting the cells. Washed twice with DMEM basal medium, and after cell counting, the cells were diluted with phosphate buffer (pH 7.2) to $2 \times 10^7$ cells per ml. Each mouse was intraperitoneally injected with 0.5 ml of cell suspension during each immunization. There was an interval of 2 weeks between the first and second immunizations, and an interval of 3 weeks between each subsequent immunization. Except for the first immunization, blood was collected one week after each immunization, and the antibody titer and specificity in the serum were detected by FACS. After the second immunization, immunogen A was replaced for immunization. In the first immunization, immunogen A was emulsified with Freund's complete adjuvant and injected intraperitoneally with 0.25 ml, that is, 50 micrograms of immunogen A protein per mouse was injected, and in the third immunization, immunogen A protein was emulsified with Freund's incomplete adjuvant and injected intraperitoneally with 0.25 ml, that is, 50 micrograms of immunogen A protein was injected per mouse (FIG. 4). One week after the booster immunization, blood was collected, and the antibody titer and specificity of immunogen A in the serum were detected by ELISA and FACS. The results are shown in the figures (FIG. 5a, FIG. 5b, FIG. 6a, FIG. 6b). The post-immune serum of the mice immunized with NKG2A/CD94-ECD-Fc has different degrees of binding to the immunogen, showing an antigen-antibody response. The batch of TB3 refers to the mouse serum on the seventh day after the third booster immunization. The titer of serum antibody detected by FACS is more than 1:1000, and the titer of ELISA is more than 1:100,000.

Figure 7:
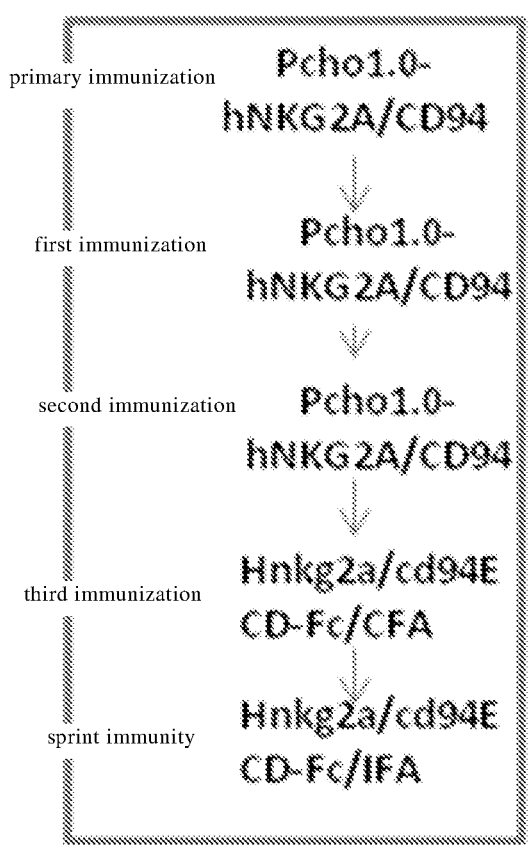
FIG. 7 shows the technical process of animal immunization.
Figure 8A:
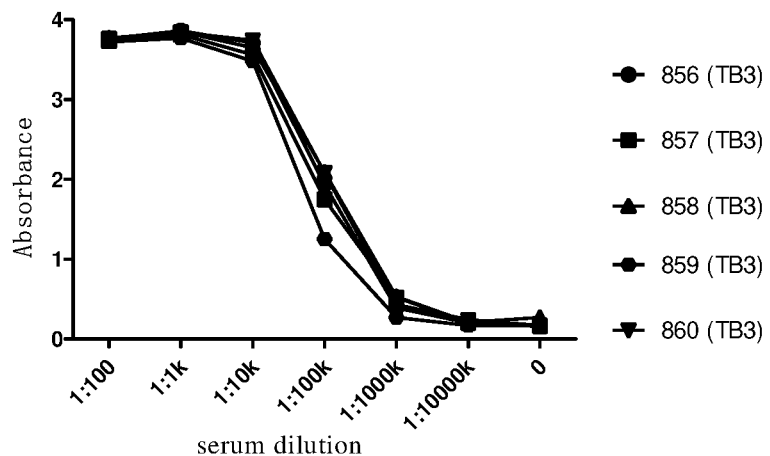
FIG. 8a shows the ELISA detection of serum antibody titer of Balb/c mice after immunization.
Figure 8B:
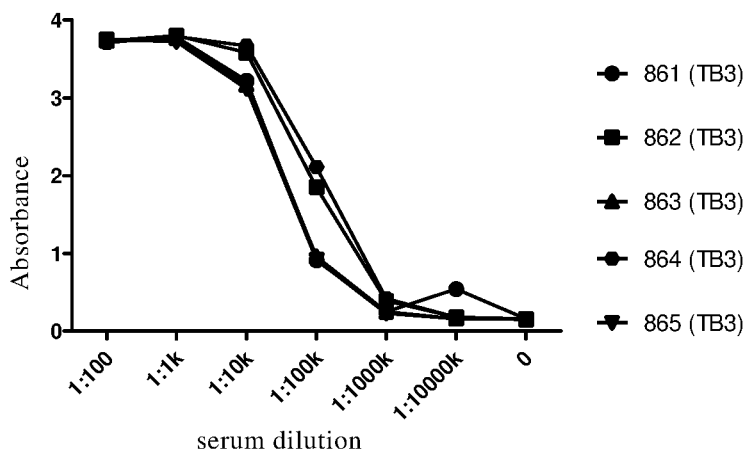
FIG. 8b shows the ELISA detection of serum antibody titer of SJL mice after immunization.
Figure 9A:
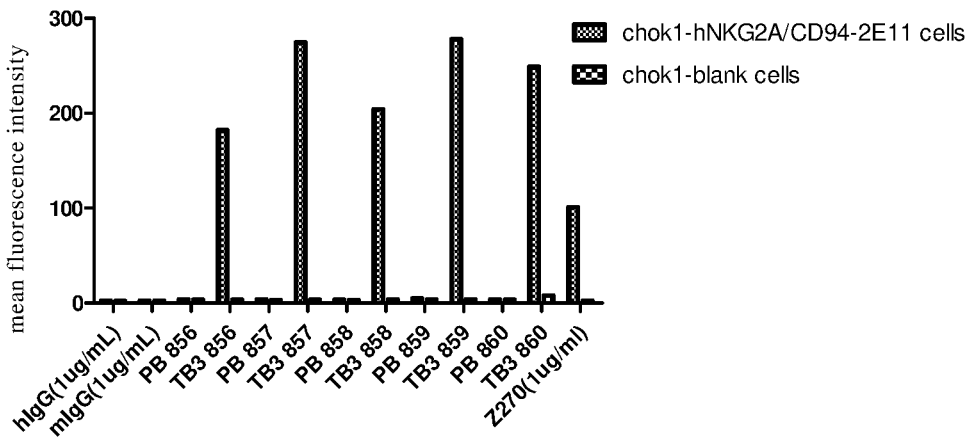
FIG. 9a shows the FACS detection of serum antibody titers in Balb/c mice after immunization.
Figure 9B:
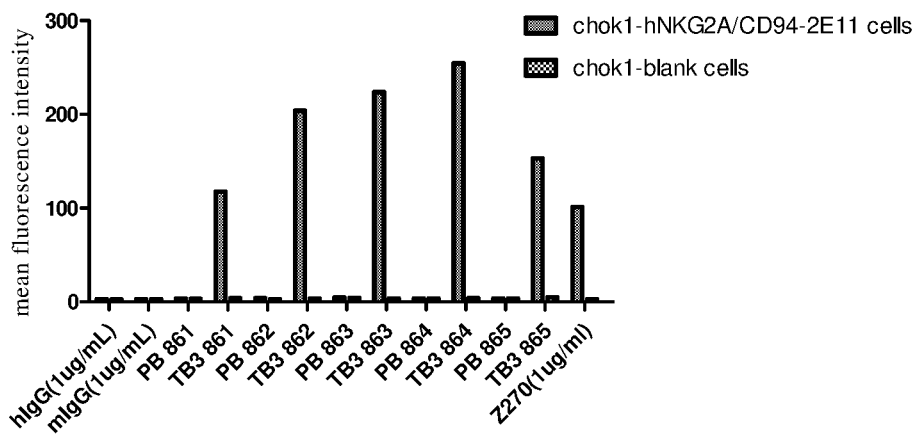
FIG. 9b shows the FACS detection of serum antibody titer in SJL mice after immunization.
Figure 10:
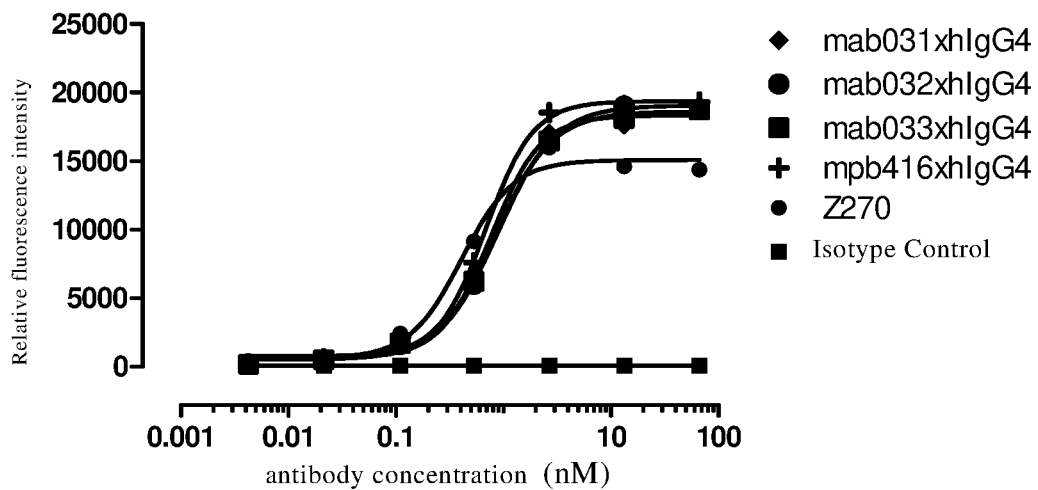
FIG. 10 shows the FACS detection of the binding reaction between NKG2A antibody and CHOK1-hNKG2A/CD94.
Figure 11:
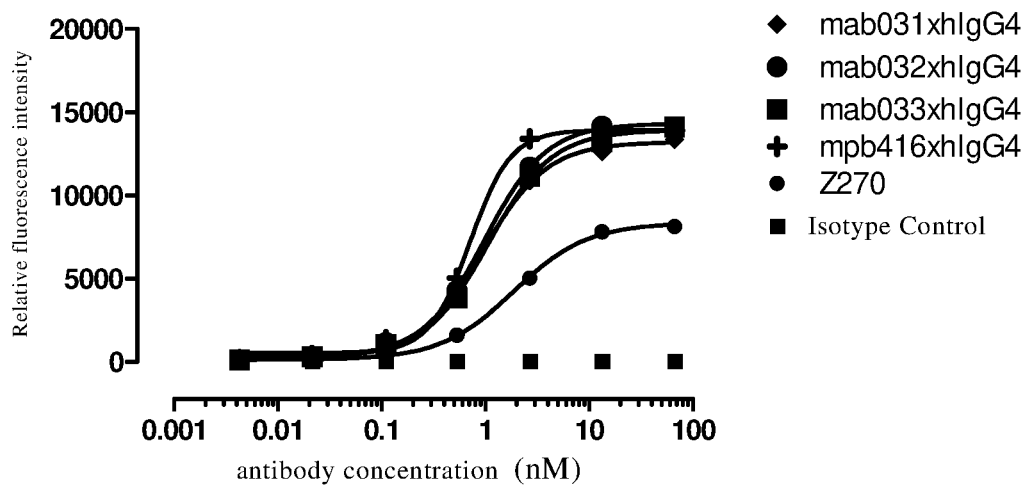
FIG. 11 shows the FACS detection of the binding reaction between NKG2A antibody and CHOK1-cNKG2A/CD94.

D. Immunogen B was used to immunize Balb/c or SJL mice aged 6-8 weeks and they were raised under SPF conditions. All mice were immunized with Helios gene gun through the abdomen for 4 times, 4 shots each time, 1.0 µg cDNA per shot. The interval between the initial immunization and the first booster immunization was 2 weeks, and the interval between each booster immunization was 3 weeks. Blood was collected 1 week after each booster immunization, and the antibody titer in the serum was detected by ELISA or FACS. After the second booster immunization, immunogen A was replaced for immunization. In the first immunization, immunogen A was emulsified with Freund's complete adjuvant and injected intraperitoneally with 0.25 ml, that is, each mouse was injected with 50 micrograms of immunogen A protein. In the third immunization, immunogen protein A was emulsified with Freund's incomplete adjuvant and injected intraperitoneally with 0.25 ml, that is, 50 µg immunogen A protein was injected per mouse (FIG. 7). One week after the booster immunization, blood was collected, and the antibody titer and specificity of immunogen A in the serum were detected by ELISA and FACS.

The results are shown in the figure (FIG. 8a, FIG. 8b, FIG. 9a, FIG. 9b). The post-immunization serum of mice immunized with NKG2A/CD94-ECD-Fc has different degrees of binding to the immunogen. The batch refers to the mouse serum on the seventh day after the third booster immunization. The titer of serum antibody detected by FACS is more than 1:1000, and the titer of ELISA is more than 1:100,000.

Before the completion of steps A~D, each selected mouse will be injected intraperitoneally with 100 micrograms of purified hNKG2A/CD94-ECD-Fc for the last immunization (mice that have been immunized against immunogen A, immunogen C and immunogen D) or CHOK1 stable cell line containing human NKG2A and CD94 (mice that have been immunized against immunogen B). After 3-4 days, the mice were sacrificed and splenocytes were collected. Adding $NH_4OH$ to a final concentration of 1% (w/w) to lyse the red blood cells in the spleen cells to obtain a spleen cell suspension. Washing the cells by centrifugation at 1000 rpm with DMEM basal medium for 3 times, then mixed with mouse myeloma cells SP2/0 (purchased from ATCC) at a ratio of 5:1 to the number of viable cells, and using a high-efficiency electrofusion method (see Methods IN ENZYMOLOGY, VOL. 220) for cell fusion. The fused cells were diluted into DMEM medium containing 20% fetal bovine serum and 1×HAT, and the percentage was the mass percentage. Then adding $1\times10^5/200$ microliters per well to a 96-well cell culture plate, putting it in a 5% $CO_2$, 37° C. incubator, and the percentage was a volume percentage. After 14 days, ELISA and Acumen (microwell plate cell detection method) were used to screen the cell fusion plate supernatant. Amplifying the positive clones with $OD_{450\,nm}$>1.0 in ELISA and Percentage % value>15 in Acumen to a 24-well plate, and expandeing culture with 10% (w/w) HT fetal bovine serum, DMEM (invitrogen) at 37° C. and 5% (v/v) $CO_2$. After culturing for 3 days, taking the expanded culture medium in the 24-well plate for centrifugation, collecting the supernatant, analyzing the antibody subtype of the supernatant, and using FACS to determine the binding activity to NKG2A/CD94 positive cells (the binding activity detection method, please see Example 3A and Example 3B respectively). The ligand receptor binding experiment determined the blocking activity of the antibody samples on the NKG2A receptor (for the detection method of the binding activity, please refer to Example 4 respectively).

According to the results of the 24-well plate screening, hybridoma clones that were positive for binding to CHOK1 cells expressing human NKG2A and CD94, monkey NKG2A and CD94, and were negative for binding to CHOK1 cells expressing human NKG2C and CD94 in the FACS experiment were selected for cloning. At the same time, the blocking effect of the culture supernatant of hybridoma cells on the NKG2A receptor was tested as an alternative criterion for selecting clones.

Selecting the qualified hybridoma cells to be subcloned in 96-well plate by limiting dilution method, cultured in DMEM medium (purchased from invitrogen) containing 10% (w/w) FBS at 37° C. and 5% (v/v) $CO_2$. Ten days after subcloning, ELISA and Acumen were used for preliminary screening, and a single positive single clone was selected and expanded to a 24-well plate to continue the culture. Three days later, FACS was used to determine the positive antigen binding and the NKG2A receptor ligand binding assay was used to evaluate the biological activity.

According to the detection results of 24-well plate samples, selecting the optimal clones and expanding the optimal clone in DMEM medium (purchased from invitrogen) containing 10% (w/w) FBS at 37° C. and 5% (v/v) $CO_2$ and freezing in liquid nitrogen to obtain the hybridoma cells of the present invention, which can be used for subsequent antibody production and purification.

EXAMPLE 2

Production and Purification of Lead Antibody

The antibody concentration produced by hybridoma cells is low, only about 1-10 µg/ml, and the concentration varies greatly. In addition, the various proteins produced by cell culture in the medium and the fetal bovine serum components contained in the medium have varying degrees of interference with many biological activity analysis methods, so that small-scale (1-5 mg) antibody production and purification is required.

The hybridoma cells obtained in Example 1 were inoculated into T-75 cell culture flasks and the production medium (Hybridoma serum free medium, purchased from Invitrogen) was used for domestication and passage for 3 generations. When it grew well, inoculating to cell culture spinner flask. Adding 500 ml of production medium to each 2 liter cell culture spinner flask, and the inoculation cell density was $1.0\times10^5$/ml. Tightly caped, and placing the spinner flask on the rotary machine in the 37° C. incubator at a speed of 3 revolutions per minute. After 14 days of continuous rotation culture, the cell culture medium was collected, filtered to remove the cells, and filtered with a 0.45 micron filter membrane until the culture supernatant was clarified. The clarified culture supernatant can be purified immediately or frozen at −30° C.

The monoclonal antibody in the culture supernatant (300 mL) of the clarified hybridoma cells was purified using a 2 mL protein G column (purchased from GE Healthcare). The protein G column was first equilibrated with equilibration buffer (PBS phosphate buffer, pH 7.2), and then the clarified culture supernatant was loaded onto the protein G column, and the flow rate was controlled at 3 mL/min. After loading the sample, washing the protein G column with the equilibration buffer. The volume of the equilibration buffer was 4 times the volume of the protein G column bed. The NKG2A antibody bound to the protein G column was eluted with an eluent (0.1M glycine hydrochloride buffer, pH 2.5), and the elution was monitored with an ultraviolet detector (A280 UV absorption peak). Collecting the eluted antibody, adding 10% 1.0M Tris-HCl buffer solution to neutralize the pH, the percentage was volume percentage, and then immediately dialyzed with PBS phosphate buffer overnight, changing the medium once the next day and continuing the dialysis for 3 hours. Collecting the NKG2A antibody after dialysis and subjected to sterile filtration with 0.22 micron filter and aseptic storage to obtain the purified NKG2A antibody.

The purified NKG2A antibody was tested and analyzed for protein concentration (A280/1.4) and purity and the like. The results are shown in Table 5. It is found that the endotoxin concentration of the final antibody product is within 1.0 EU/mg.

TABLE 5

Property analysis of purified antibodies

| Clone number | Subtype | Protein concentration (mg/ml) | Antibody purity |
|---|---|---|---|
| 850B1D6 | IgG1, k | 0.608 | >90% |
| 850H7A3 | IgG2c, k | 0.577 | >90% |
| 855H7E7 | IgG2c, k | 0.593 | >90% |
| 859E9F5 | IgG2c, k | 0.774 | >90% |

EXAMPLE 3

Determination of the Amino Acid Sequence of the Variable Region of the Light and Heavy Chains Isolation of total RNA: After the supernatant obtained from the subclonal culture of Example 1 was tested for antigen binding (that is, after the verification and activity determination of Examples 3 to 6), $5 \times 10^7$ hybridoma cells are collected by centrifugation, and 1 mL Trizol was added, mixed well and transferrded to a 1.5 mL centrifuge tube, placed at room temperature for 5 minutes; adding 0.2 mL chloroform, shaked for 15 seconds, placed for 2 minutes, centrifuged at 4° C., 12000 g for 5 minutes, the supernatant was taken and transferred to a new 1.5 mL centrifuge tube; adding 0.5 mL isopropanol, mixed the liquid in the tube gently, placed at room temperature for 10 minutes, centrifuged at 12000 g for 15 minutes at 4° C., discarding the supernatant; adding 1 mL 75% (v/v) ethanol, washing the precipitate gently, centrifuged at 12000 g for 5 minutes at 4° C., discarding the supernatant, drying the precipitate, adding DEPC-treated $H_2O$ to dissolve it (55° C. water bath to promote solvent for 10 minutes) to obtain total RNA.

Reverse transcription and PCR: Taking 1 μg of total RNA, configuring a 20 μl system, adding reverse transcriptase and reacted at 42° C. for 60 minutes, and stopping the reaction by reacted at 7° C. for 10 minutes. Configuring 50 μl PCR system, including 1 μl cDNA, 25 pmol of each primer, 1 μl DNA polymerase and matching buffer system, 250 μmol dNTPs; setting up PCR program, pre-denaturation at 95° C. for 3 minutes, denaturation at 95° C. for 30 seconds, and annealing at 55° C. for 30 seconds, extension at 72° C. for 35 seconds, and after 35 cycles, it was extended at 72° C. for additional 5 minutes to obtain a PCR product. The kit used for reverse transcription is PrimeScript RT Master Mix, purchased from Takara, catalogue number RR036; the kit used for PCR includes Q5 ultra-fidelity enzyme, purchased from NEB, item number M0492.

Cloning and sequencing: Taking 5 μl of PCR product for agarose gel electrophoresis detection, and using the column recovery kit to purify the tested positive samples. The recovery kit is NucleoSpin® Gel & PCR Clean-up, purchased from MACHEREY-NAGEL, catalog number 740609. Carrying out ligation reaction: sample 50 ng, T vector 50 ng, ligase 0.5 μl, buffer 1 μl, reaction system 10 μl, reacted at 16° C. for half an hour to obtain the ligation product, wherein the ligation kit is T4 DNA ligase, purchased from NEB, catalog number M0402; Taking 5 μl of the ligation product and adding 100 μl of competent cells (Ecos 101competent cells, purchased from Yeastern, catalog number FYE607), ice bath for 5 minutes, then heat shock in a 42° C. water bath for 1 minute, putting it back on ice for 1 minute and then adding 650 μl antibiotic-free SOC medium, resuscitated on a shaker at 37° C. at 200RPM for 30 minutes, taking out 200 μl and spreading it on LB solid medium containing antibiotics and incubated overnight at 37° C. incubator; the next day, using primers M13F and M13R on the T vector to configure a 30 μl PCR system to perform colony PCR. Using a pipette tip to dip the colony into the PCR reaction system and pipette, and aspirating 0.5 μl onto another LB solid petri dish containing 100 nM ampicillin to preserve the strain; after the PCR reaction was over, taking out 5 μl for agarose gel electrophoresis detection, and positive samples were sequenced and analyzed [see Kabat, "Sequences of Proteins of Immunological Interest," National Institutes of Health, Bethesda, Md. (1991)].

The sequencing results refer to sequence information of the present invention in the appendix.

EXAMPLE 4

Preparation of NKG2A Antibody by Phage Display

Obtaining spleen cells: for mice that have immunized by HNKG2A/CD94-ECD-Fc and CHOK-1/HNKG2A/CD94 as antigens respectively, 293/cynoNKG2A/CD94 cells were used for sprint immunization. After 3 days, the mouse spleen cells were isolated to prepare an immune library. The separated spleen cells were resuspended in DMEM medium, centrifuged at 2000 rpm, 4° C. for 10 min, and the supernatant was discarded. Lysing the cell pellet with RNAiso plus (purchased from Takara, catalog number: 9108), the ratio is 1 ml RNAiso plus added to the spleen of a mouse, incubated at room temperature for 5 minutes, and stored at −80° C.

RNA extraction: Thawing the frozen mouse spleen cells at room temperature and vortex for 5 min. Adding 0.2 ml of 1-Bromo-3-chloropropane (purchased from Sigma, catalog number: B9673-200 ml) to each 1 ml of RNAiso plus sample, shaked vigorously for 15 seconds, and then incubated at room temperature for 5 minutes. Centrifuging the sample at 4° C. at 12000 g for 10 min, transferring the aqueous phase to a new tube, adding 0.7 ml isopropanol to precipitate RNA, incubated at room temperature for 10 min, centrifuged at 12000 g for 10 min at 4° C., and discarding the supernatant. The RNA pellet was washed once with 1 ml of 75% ethanol (without RNAase), centrifuged at 12000 g for 5 min at 4° C., and the supernatant was discarded. After drying the RNA precipitation for 15 minutes, dissolving the RNA with 40 ul DEPC-containing water (purchased from Invitrogen, 46-2224), mixed gently, and placing it at room temperature for 5 minutes. Taking half of the RNA from each sample and mixed, and measuring the concentration of the obtained RNA library. The result is 2175.6 ng/ul.

Preparation of cDNA library: Referring to the reverse transcription kit 5*PrimeScriptTMRT Master Mix (purchased from Takara, catalog number RR036A) to prepare the reverse transcription reaction system as shown in the table below, and performing thermal cycling. The setting conditions were 37° C. for 20 min, 85° C. for 20 s, 4° C. for continuous. The obtained reverse transcription products were mixed and divided into two parts. One part was stored at −80° C., and the other part was stored at 4° C. for subsequent experiments.

TABLE 6

PCR reaction system

| Reagent | Volume (ul) | Master Mix (*3) |
|---|---|---|
| 5*Mix | 20 | 60 |
| RNA | 6.9 | 21 |
| H2O | Supplement to 100 | |

Amplification and purification of VH and VL libraries: Refering to Journal of Immunological Methods 201 (1997), 35-5 for primer design for amplification. Mixing the heavy chain and light chain's forward and reverse amplification primers respectively, and preparing the PCR reaction as follows:

TABLE 7-1

PCR reaction

| cDNA | 5 ul |
|---|---|
| 2*Taq Mix (purchased from Vazyme, catalog number P212-01/02/03) | 25 ul |
| Primer Mix F (VH or VL, 100 uM) | 1 ul |
| Primer Mix R (VH or VL, 100 uM) | 1 ul |
| H$_2$O | 18 ul |
| Total | 50 ul |

Setting up the PCR program as follows:

TABLE 7-2

PCR program

| 94° C. | 1 min 30 s |
|---|---|
| 94° C. | 1 min |
| 63° C. | 30 s |
| 58° C. | 50 s |
| 72° C. | 1 min |
| 94° C. | 1 min |
| 63° C. | 1 min |
| 72° C. | 1 min |
| 72° C. | 5 min |
| 4° C. | Holding |

After PCR, the amplified products were gel purified, and the results showed that 230 ng/ul and 170 ng/ul VH and VL were obtained respectively. The obtained VH and VL libraries were used to assemble scFvs by SOE (splicing overlap extension) PCR method, and the obtained PCR products were purified (QIAquick Gel)/PCR purification kit, purchased from QIAGEN, catalog number 28706), and the finally obtained concentration of purified scFv was 130 ng/ul.

Preparation of phagemid: pCAN vector and scFv were digested with Sfi enzyme (purchased from NEB, catalog number R0123S), and the digested product was recovered by gel, and the obtained pCAN vector and scFv were subjected to enzyme ligation reaction with T4 ligase (purchased from NEB), and using a purification kit (purchased from Qiagen, article number: 28014) to purify the obtained ligation product for preparing an immune phage library.

Preparation of immune phage library: mixing 500 ng of the above purified DNA with 200 ul of TG1 competent *E. coli* (this competence can be obtained by conventional methods) and for electrotransform. The electrotransformation product was cultured in 1 ml YT culture with shaking for 1 h at 37° C. Taking 10 ul of the cell suspension and diluting it in a 10-fold gradient ($10^{-4}$, $10^{-5}$, $10^{-6}$), and coating the plate to detect the storage capacity.

Collecting the bacterial pellet by centrifugation, discarding the excess bacterial liquid, resuspending the bacterial pellet, spreading it on a plate, and incubated overnight. The next day, scraping the bacterial clones in the culture plate, collecting the precipitate by centrifugation, and resuspending it in 4ml 2*YT medium (containing 40% glycerol), the obtained immune library was frozen and stored at −80° C.

Panning:

Scheme 1: The immune library obtained above was negatively screened with CHOK1/NKG2C/CD94 cells. The collected CHOK1/NKG2C/CD94 cells were resuspended in 10 ml of phage liquid, incubated at 4° C. for 1 hour, centrifuged to remove the cells, and the phage library in the supernatant was collected for the next step of panning. The supernatant obtained above was positively screened with CHOK1/hNKG2A/CD94 and CHOK1 cells, and the cells and the supernatant were incubated in an equal volume, and incubated with rotating for 1.5 h at 4° C. Washing the cell pellet repeatedly with PBS, and resuspending it in 1 ml Glycine (purchased from Shanghai Lingfeng Chemical, catalog number: 56-40-6) elution buffer (ph2.2) to elute the phage, incubated at room temperature for 15 minutes, and gently mixed upside down. After centrifugation at 18000 g for 10 minutes, transferring the supernatant to a new centrifuge tube and adding 100 ul 2M Tris (pH8) for neutralization. Adding 1 mL of the above solution to 4 mL of *E. coli* TG1 in the logarithmic growth phase, and incubated at 37° C. for 30 minutes to obtain a TG1 culture solution. Diluting the TG1 culture solution gradually, spreading it on a plate, and incubated overnight at 37° C. Calculating the obtained HNKG2A/CD94 binding and the number of clones in the control tube, and selecting 30 clones for sequencing. A total of 1,300 clones were obtained after the first round of panning.

Scheme 2: First, carrying out negative screening with CD94-ECD-Fc and CHOK-1 cells for the immune library obtained above. The immune tubule was coated with 40 ug of Anti-hFc (purchased from ROCKLAND, catalog number 009-1103) in 2 ml PBS, and then 23 ug of CD94-Fc protein was added to incubate at room temperature for 1 h. At the same time, using 3 ml of 2% MPBS (containing 2% non-fat dry milk, purchased from Bio-Rad, catalog number 170-6404) to block the phage at 4° C. for 1 hour, and adding the blocked phage to the immune tubule coupled with CD94 protein, incubated at room temperature for 1 h, then resuspending the blocked CHOK1 cell pellet with phage supernatant, makeing up 2% MPBS to 11 ml, and rotated and incubated for 1 h at 4° C. The phage negatively screened by CD94 and CHOK1 cells was screened positively by CHOK-hNKG2A/CD94 cells. Resuspended with the phage obtained above, and incubated at 4° C. for 2 h with gentle shaking. Washing the cell pellet repeatedly with PBS, and resuspending it in 1 ml Glycine (purchased from Shanghai Lingfeng Chemical, catalog number: 56-40-6) elution buffer (ph2.2) to elute the phage, incubated at room temperature for 15 minutes, and gently mixed upside down. After centrifugation at 18000 g for 10 minutes, transferring the supernatant to a new centrifuge tube and adding 100 ul 2M Tris (pH8) for neutralization. Adding 1 mL of the above solution to 4 mL of E. coli TG1 in the logarithmic growth phase, and incubated at 37° C. for 30 minutes to obtain a TG1 culture solution. Diluting the TG1 culture solution stepwise, spreading it on a plate, and incubated overnight at 37° C. Calculating the number of clones bound by HNKG2A/CD94 and the control tube, and selecting 30 clones for sequencing. A total of 6000 clones were obtained after the first round of panning.

Single clones were selected from the plates of the above two panning strategies and cultured in a 96-well plate. Each well contained 200 μL of 2YT medium with antibiotics and cultured overnight at 37° C. with shaking at 1000 rpm. Taking 10 μL of the overnight culture supernatant and adding it to 4 mL of antibiotic-containing medium, and cultured for 1.5-2.5 hours at 37° C. and 250 rpm with shaking. Adding IPTG with a final concentration of 1 mM, cultured with shaking at 30° C. for 16 hours, centrifuged at 4000 rpm for 10 minutes, and single-chain antibody was obtained from the supernatant.

Firstly, ELISA was used to determine the binding activity of the scFv antibody screened to NKG2A/CD94-ECD-Fc and NKG2C/CD94-ECD-Fc. Selecting the clones (NKG2A/CD94-ECD-Fc/NKG2C/CD94-ECD-Fc) whose OD450 nm reading ratio is greater than 4. Part of the clones used the FACS method to determine the binding activity of the scFv antibody screened to CHOK1/NKG2A/CD94-ECD-Fc and CHOK1/NKG2C/CD94 cells. The specific clones that only bind to CHOK1/hNKG2A/CD94 cells were selected. All the above-mentioned specific clones were determined by the FACS method to determine their binding activity with macaque (cyno) NKG2A, and sequencing clones that were still positive, to obtain 21 clones with different heavy chain CDR3 sequences, as shown in Table 8.

TABLE 8

Variable region sequencing results

| Clone number | CDRH3 | CDRL3 |
|---|---|---|
| 2C9 | SFDYPHYGMDF (SEQ ID No. 101) | QQYSIYPWT (SEQ ID No. 102) |
| 2F7 | SFDYPYYGMDY (SEQ ID No. 103) | LQFDEFPYT (SEQ ID No. 104) |
| 2F10-2 | SYLGGQYYFDY (SEQ ID No. 105) | LQYDEFPLT (SEQ ID No. 56) |
| 3G5 | NGGFTYGSRGWFGY (SEQ ID No. 106) | QQYSSYPLT (SEQ ID No. 107) |
| 10C9 | ALNYFGSSYGFSY (SEQ ID No. 108) | QQYSSYPLT (SEQ ID No. 107) |

TABLE 8-continued

Variable region sequencing results

| Clone number | CDRH3 | CDRL3 |
|---|---|---|
| 10F9 | LGDWEWLGVLAY (SEQ ID No. 109) | QQSNKDPWT (SEQ ID No. 110) |
| 10G6 | LGDWEWLGVLAY (SEQ ID No. 109) | SQSTHVPRT (SEQ ID No. 111) |
| 11A8 | NGGFTYGSRGWFGY (SEQ ID No. 106) | QQYNSYPLT (SEQ ID No. 112) |
| 11E6 | NYERRAMDY (SEQ ID No. 113) | QQYNSYPLT (SEQ ID No. 112) |
| 11G5 | NYERRAMDY (SEQ ID No. 113) | AQNLELPLT (SEQ ID No. 114) |
| 11G9 | SFDYPHYGMDY (SEQ ID No. 115) | QQYSSYPYT (SEQ ID No. 116) |
| 12B2 | SFDYPHYGMDY (SEQ ID No. 115) | QQYSSYPWT (SEQ ID No. 117) |
| 12F2 | SFDYPHYGMDY (SEQ ID No. 115) | HQYLIYPYT (SEQ ID No. 118) |
| 12G8 | SYLGGQYYFDY (SEQ ID No. 105) | MQHLEYPYT (SEQ ID No. 8) |
| 13D12 | SYLGGQYYFDY (SEQ ID No. 105) | MQHLEYPFT (SEQ ID No. 72) |
| 13H8 | TYGDYGRDYYAMDY (SEQ ID No. 119) | FQGSHVPPT (SEQ ID No. 120) |
| 14G3 | YRDYLFYYALGY (SEQ ID No. 4) | MQHLEYPYT (SEQ ID No. 8) |
| 14G4 | YYDFGRAFAY (SEQ ID No. 60) | LQYDEFPFT (SEQ ID No. 64) |
| 15C2 | YYDFGRAFAY (SEQ ID No. 60) | LQYDEFPYT (SEQ ID No. 121) |
| 9B10 | NYERRAMDY (SEQ ID No. 113) | AQNLELPWT (SEQ ID No. 122) |
| 9F8 | YRDFLYYYALGY (SEQ ID No. 123) | SQGTHVPLT (SEQ ID No. 124) |

Production and purification of phage-derived lead antibodies: Amplifying the variable regions of the heavy and light chains: According to the sequencing results of positive clones, the variable regions of the light and heavy chains were amplified by PCR method, respectively. Configuring a 50 μL reaction system, including 0.5 μL of plasmids extracted from the E. coli TG1 transfected positive clone, 10 pmol of each primer, 25 μL of Q5 high-fidelity DNA polymerase, and water to make up to 50 μL. Setting up PCR program, pre-denaturation at 95° C. for 5 minutes, denaturation at 95° C. for 30 seconds, annealing at 55° C. for 30 seconds, extension at 68° C. for 30 seconds, and after 25 cycles, an additional extension at 68° C. for 1 minute to obtain a PCR product. The DNA polymerase used in PCR was purchased from NEB, catalog number E0555L. Taking 5 μL of the PCR product for agarose gel electrophoresis detection, and using the recovery kit to purify the tested positive samples. The recovery kit is QIAquick Gel extraction kit, purchased from Qiagen, catalog number 28706.

Preparation of human IgG4 antibody: Performing ligation reaction: inserting a fragment of 3 μL, digested expression vector 2 μL, recombinase Exnase 2 μL, buffer 4 μL, reaction system 20 μL, reacted at 37° C. for half an hour to obtain the ligation product, that is, the constructed recombinant vector. Among them, the recombinase was purchased from Vazyme, catalog number C112-01/02; the buffer was the buffer purchased for the recombinase; the heavy chain variable region was directionally cloned to an expression vector containing the signal peptide and the constant region of the human antibody heavy chain IgG4 (S228P) (wherein the expression vector was purchased from Invitrogen, and the recombination steps were conventional steps), the light chain variable region was directionally cloned into the expression vector containing the signal peptide and the human antibody light chain Kappa constant region (wherein the expression vector was purchased from Invitrogen, the recombination steps were conventional steps). Adding 10 μL of the ligation product to 100 μL of competent cells (Ecos 101 competent cells, purchased from Yeastn, catalog number FYE607), and ice bath for 30 minutes. Then heat shock in a 42° C. water bath for 90 seconds, putting it back on ice for 2 minutes, adding 800 μL of antibiotic-free 2YT medium, incubated on a 37° C. shaker at 200 rpm for 45 minutes, taking out 200 μL and spreading it on the LB solid medium containing 100 μg/mL ampicillin, incubated overnight at 37° C. incubator. The next day, using the primers pTT-EF1a-F and pSV40 on the expression vector (the nucleotide sequences of which are shown in SEQ ID No. 97 to 98 in the sequence listing, respectively), a 30 μL PCR system was configured to perform colony PCR. The colony PCR system is: 1 μL for each primer, 10 μL of PCR master mix (purchased from Novoprotein), and making up to 20 μL. Using a pipette tip to dip the colony into the PCR reaction system and pipette, and aspirating 0.5 μL onto another LB solid petri dish containing 100 μg/mL ampicillin to preserve the strain. After the PCR reaction, 5 μL of that was taken out for agarose gel electrophoresis detection, and the positive samples were sequenced and analyzed [see Kabat, "Sequences of Proteins of Immunological Interest," National Institutes of Health, Bethesda, Md. (1991)].

After colony PCR verification, transfecting the expression vector of recombinant antibody heavy and light chain with correct sequence into FreeStyle™ 293-F cells (purchased from Invitrogen) transiently to produce antibodies. When transfection, the density of 293-F cells should be $1-1.5 \times 10^6$ cells/mL, and 100 mL cells need 100 μg of the above-mentioned constructed recombinant vector (wherein, the mass ratio of the recombinant heavy chain vector and light chain vector is 2:3) and 200 μg of transfection reagent polyethyleneimine (PEI). The recombinant vector and PEI were added to 5 mL of culture medium, respectively and the mixture was allowed to stand at room temperature for 5 minutes. After filtration with 0.22 μm filter membrane, the mixture of recombinant vector and PEI was allowed to stand at room temperature for 15 minutes. Then the above mixture was slowly added to the cells, and cultured in a 37° C., 8% (v/v) $CO_2$ incubator at 120 rpm. After 7 days, centrifuging the cell culture medium at 3500 g for 30 minutes, collecting the supernatant, and filtering it with a 0.22 μm filter. Purifying the monoclonal antibody in 200 mL of the clear supernatant with a 1 mL protein A column (purchased from GE Healthcare). The protein A column was first equilibrated with equilibration buffer (PBS phosphate buffer, pH 7.2), and then the supernatant was loaded onto the protein A column, and the flow rate was controlled at 3 mL/min. After loading the sample, washing the protein A column with the equilibration buffer. The volume of the equilibration buffer was 20 times over the volume of the protein A column bed. The monoclonal antibody bound to the protein A column was eluted with an eluent (0.1 M glycine hydrochloride buffer, pH 3.0), and the elution was monitored with an ultraviolet detector (A280 UV absorption peak). Collecting the eluted antibodies and adding 10% (v/v) 1.0 M Tris-HCl buffer to neutralize the pH. Then immediately dialyzed with PBS phosphate buffer overnight. Collecting the dialyzed monoclonal antibodies for the sterile filtration with 0.22 μm filter and aseptic storage to obtain the purified NKG2A antibody as the lead antibody. The lead antibody was tested and analyzed for protein concentration (A280/1.4), purity, and endotoxicity (Lonza kit) and the like. The results are shown in Table 9 below.

TABLE 9

Phage display screening antibody purification results

| Clone | Catalog No. | concentration (mg/ml) | Yield (mg) | purity (SDS-PAGE) | purity (SEC-HPLC) | Endotoxin (EU/mg) | Dissolution buffer |
|---|---|---|---|---|---|---|---|
| 3G5 | 201701232 | 0.41 | 9.1 | >95% | 97 | 0.9 | 1 x PBS |
| 2C9 | 201701231 | 0.458 | 10 | >95% | 93 | 0.9 | 1 x PBS |
| 2F7 | 20170310 | 0.46 | 9.2 | >95% | 90 | 0.765 | 1 x PBS |
| 2F10 | 20170310 | 0.588 | 13.5 | >95% | 82 | 0.508 | 1 x PBS |
| 9B10 | 20170331001 | 1.75 | 11 | >95% | 98.9 | 0.54 | 1 x PBS, pH 7.8 |
| 9F8 | 20170331002 | 1.65 | 10 | >95% | 98.9 | 0.63 | 1 x PBS, pH 7.8 |
| 10C9 | 20170331003 | 2.91 | 9.5 | >95% | 96 | 0.47 | 1 x PBS, pH 7.8 |
| 10F9 | 20170331004 | 2.67 | 8 | >90% | 93.7 | 0.48 | 1 x PBS, pH 7.8 |
| 10G6 | 20170401001 | 1.8 | 9 | >90% | 93 | 0.28 | 1 x PBS, pH 6.5 |
| 11A8 | 20170401002 | 1.85 | 9.7 | >95% | 96 | 0.39 | 1 x PBS, pH 6.5 |
| 11E6 | 20170401003 | 4 | 9.9 | >95% | 96.3 | 0.28 | 1 x PBS, pH 7.8 |
| 11G5 | 20170401004 | 2.92 | 2.6 | ~50% | ~50 | 0.79 | 1 x PBS, pH 7.8 |
| 11G9 | 20170401005 | 0.85 | 6 | >95% | 99.7 | 0.34 | 1 x PBS, pH 7.8 |
| 12B2 | 20170406001 | 3.61 | 9 | >95% | 97.2 | 0.43 | 1 x PBS, pH 7.8 |

TABLE 9-continued

Phage display screening antibody purification results

| Clone | Catalog No. | concentration (mg/ml) | Yield (mg) | purity (SDS-PAGE) | purity (SEC-HPLC) | Endotoxin (EU/mg) | Dissolution buffer |
|---|---|---|---|---|---|---|---|
| 12F2 | 20170406005 | 1.8 | 6.6 | >95% | 100 | 0.07 | 1 × PBS, pH 7.8 |
| 12G8 | 20170406002 | 1.95 | 4.5 | >95% | 98.8 | 0.67 | 1 × PBS, pH 6.2 |
| 13D12 | 20170406003 | 1.51 | 7.5 | >95% | 93.1 | 0.56 | 1 × PBS, pH 7.8 |
| 13H8 | 20170427001 | 2 | 6 | >95% | 0.972 | 0.26 | 1 × PBS, pH 6.0 |
| 14G3 | 20170407002 | 0.82 | 12.5 | >90% | 93.3 | 0.26 | 1 × PBS, pH 7.8 |
| 15C2 | 20170407003 | 2.38 | 4 | >95% | 100 | 0.12 | 1 × PBS, pH 6.2 |
| 14G4 | 20170420001 | 1.7 | 9.7 | >90% | 95.3 | 0.13 | 1 × PBS, pH 7.8 |

The results show that the yield and purity of 11G5 antibody are both low, and no further purification analysis can be performed. The yield, purity, and endotoxin analysis of the remaining antibodies are all normal.

EXAMPLE 5

Assay of Lead Antibody

A. Flow Cytometry (FACS) to Detect the Binding of Antibodies to NKG2A/CD94 Expressing Cells The pCHO1.0 plasmid containing the nucleotide sequence encoding the full-length amino acid sequence of human-derived NKG2A/CD94 as described in step (2) of Example 1 was transfected into the CHOK1 cell line to obtain a CHOK1 stable cell line containing human NKG2A and CD94 (here referred to as CHOk1-hNKG2A/CD94 stable cell line), the pCHO1.0 plasmid carrying the monkey-derived NKG2A and CD94 full-length genes (the preparation method is the same as the preparation method of pCpC vector with human IgG Fc fragment (hFc) in step (1) "Preparation of immunogen A" in Example 1. The CHOK1 cell line was transfected to obtain the CHOK1 stable cell line containing monkey NKG2A/CD94 (here referred to as the CHOk1-cNKG2A/CD94 stable cell line), the CHOK1-hNKG2C/CD94 stable cell line was prepared with the same method. CHOk1-hNKG2A/CD94 stable cell line, CHOk1-cNKG2A/CD94 stable cell line and CHOK1-hNKG2C/CD94 stable cell line were expanded to 90% confluence in T-75 cell culture flasks, aspirating the medium, washed twice with PBS buffer (purchased from Invitrogen), then treating and collecting the cells with an enzyme-free cell dissociation solution (Versene solution, purchased from Life technology). Washing the cells twice with PBS buffer, after counting the cells, diluting the cells with PBS buffer to $2\times10^6$ cells per milliliter, adding 1% goat serum blocking solution, the percentage was the mass percentage, incubated on ice for 30 minutes, and then washed twice with PBS buffer by centrifugation. Suspending the collected cells with FACS buffer (PBS+1% BSA, the percentage was the mass percentage) to $2\times10^6$ cells/mL, adding it to 96-wells FACS reaction plate at 100 microliters per well, and adding 100 microliters per well of the purified NKG2A antibody test sample obtained in Example 2, incubated on ice for 2 hours. Washed twice with FACS buffer by centrifugation, and adding 100 microliters of fluorescent (Alexa 488) labeled secondary antibody (purchased from Invitrogen) per well, incubated on ice for 1 hour. Washed 3 times by centrifugation with FACS buffer, then suspending the cells with 100 μl FACS buffer, and using FACS (FACS Calibur, purchased from BD) to detect and analyze the results. The results are shown in FIG. 10-13.

Figure 12:
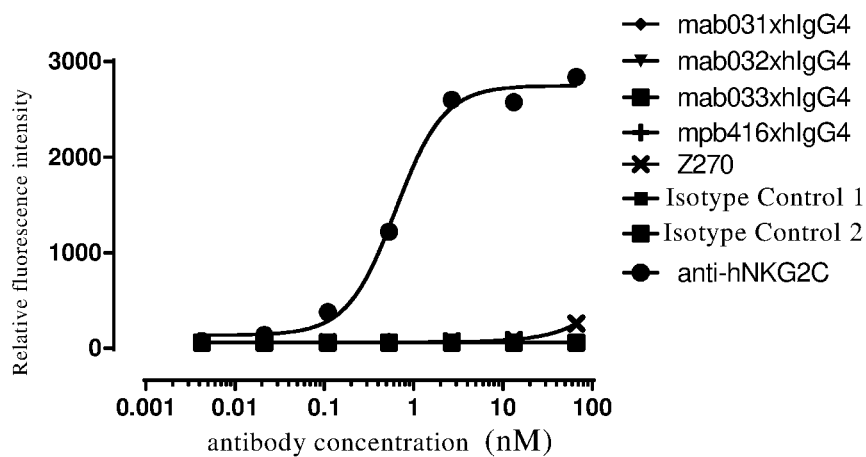
FIG. 12 shows the FACS detection of the binding reaction between NKG2A antibody and CHOK1-hNKG2C/CD94.
Figure 13:
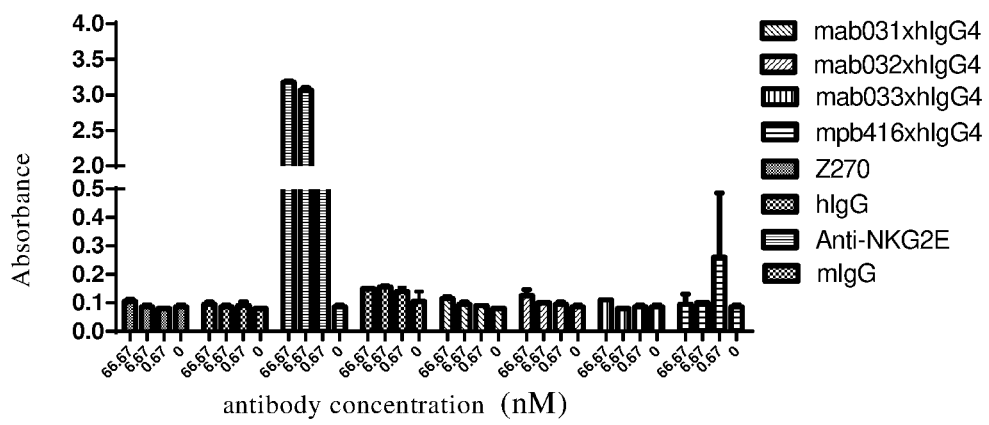
FIG. 13 shows the ELISA detection of the binding reaction between NKG2A antibody and NKG22E.

The results show that: the tested antibody can specifically bind to human NKG2A on the cell surface (FIG. 10), macaque NKG2A (FIG. 11), without binding to NKG2C/CD94 on the cell surface (FIG. 12). There is also no cross-reactivity with NKG2E protein (FIG. 13). The IgG control is human IgG.

B. Determination of the Afinity Constant of NKG2A Antibody

An Octet red96 instrument (purchased from Fortiebio) was used to determine the affinity constant. The specific operations and methods are based on the instrument manual and the detailed methods provided by the manufacturer. Specifically: using a streptavidin sensor (SA sensor, purchased from Fortiebio) for affinity determination. Diluting the biotin-labeled human-derived NKG2A/CD94-ECD-Fc (i.e., immunogen A) with a PBS solution containing 0.1% (w/w) BSA, 0.02% (v/v) Tween, pH 7.4 to 10 μg/ml, and then reacted with the streptavidin sensor; the sensor bound to immunogen A were incubated with five NKG2A antibodies diluted in different concentrations at 30° C. for three minutes, and then incubated with a PBS solution containing 0.1% (w/v) BSA, 0.02% (v/v) Tween, pH 7.4 at 30° C. for 5 minutes; using the Octet instrument to detect the change of interference wavelength to detect the binding and dissociation of the antibody and immunogen A, and then using Octet® User Software software to fit to get the dissociation constant and the binding constant, and the affinity constant is the ratio of the dissociation constant to the binding constant. The results are shown in Table 10:

TABLE 10

Affinity constant of NKG2A antibody to immunogen A

| Clone number | Affinity constant KD (M) | Binding constant kon(1/Ms) | Dissociation constant kdis(1/s) |
|---|---|---|---|
| Mab031 | 1.81E−11 | 1.02E+06 | 1.84E−05 |
| Mab032 | 2.39E−11 | 1.03E+06 | 2.45E−05 |
| Mab033 | 2.02E−11 | 1.12E+06 | 2.26E−05 |
| Mpb416 | 1.04E−11 | 9.95E+05 | 1.04E−05 |
| Tab1 (Z270) | 1.42E−10 | 1.33E+06 | 1.89E−04 |

EXAMPLE 6

Figure 14:
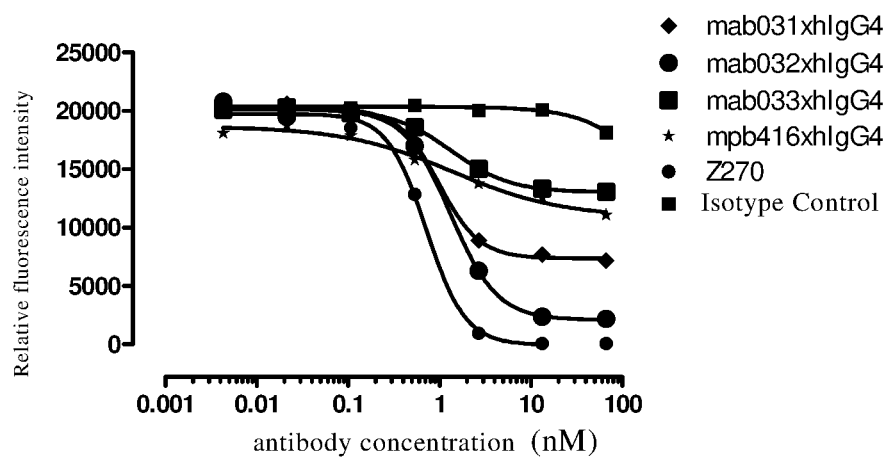
FIG. 14 shows the FACS detection of blocking activity of antibodies.

Detection of NKG2A Antibody Blocking the Binding of NKG2A to its Ligand HLA-E The CHOk1-hNKG2A/CD94 stable cell line was expanded to 90% confluence in a T-75 cell culture flask, the medium was aspirated, washed twice with PBS buffer (purchased from Invitrogen), and then using enzyme-free cell dissociation solution (Versene solution, purchased from Life Technology) to treat and collect the cells. Washing the cells twice with PBS buffer. After counting the cells, the cells were diluted with PBS buffer to $2 \times 10^6$ cells per milliliter, adding 1% goat serum blocking solution, the percentage was the mass percentage. Incubated on ice for 30 minutes, then washed twice with PBS buffer by centrifugation. Suspending the collected cells in FACS buffer (PBS+1% BSA, the percentage was mass percentage) to $2 \times 10^6$ cells/mL, adding 100 microliters per well to a 96-well FACS reaction plate, after washed once by centrifugation, the purified NKG2A antibody was diluted in gradient with FACS buffer, resuspending the cells in 50 microliters per well, and adding diluted HLA-E-PE to each well, 50 ul per well; incubated on ice in the dark for 2.5-3 hours. After washing with FACS buffer centrifugation for 3 times, 100 microliters of FACS buffer was used to suspend the cells, and FACS (FACS Calibur, purchased from BD) was used to detect and analyze the results. The results are shown in FIG. 14. The antibody to be tested can block HLA-E from binding to the NKG2A protein on the cell surface. Wherein the isotype control is human IgG, and the data in the table is the mean fluorescence intensity value of the cell population measured by MFI.

EXAMPLE 7

Detection of NKG2A Antibody to Increase the Killing Effect of NK92 on Target Cells The LCL721.221 cells were expanded to 90% confluence in a T-75 cell culture flask, the medium was aspirated, and washed twice with PBS buffer (purchased from Invitrogen). Resuspending the cells in a medium containing 1 mM peptide to $1*10^6/500$ ul. After culturing in a 26° C. incubator overnight, they were washed twice with PBS. Resuspending LCL721.221 cells to $2*10^5$ cells/ml with assay buffer (1640 medium added 5% FBS), and adding 50 ul to a 96-well plate to ensure that the number of cells in each well was 10,000. Adding NK92 cells (at 37° C. for 30 min) that have been incubated with the antibody into the above 96-well plate in a volume of 100 ul according to the ratio of effector cells: target cells was 2:1, mixed with LCL721.221 cells well and centrifuged at 250 g for 5 minutes. Placing the 96-well plate in a 37° C. incubator for 4 hours.

Figure 15:
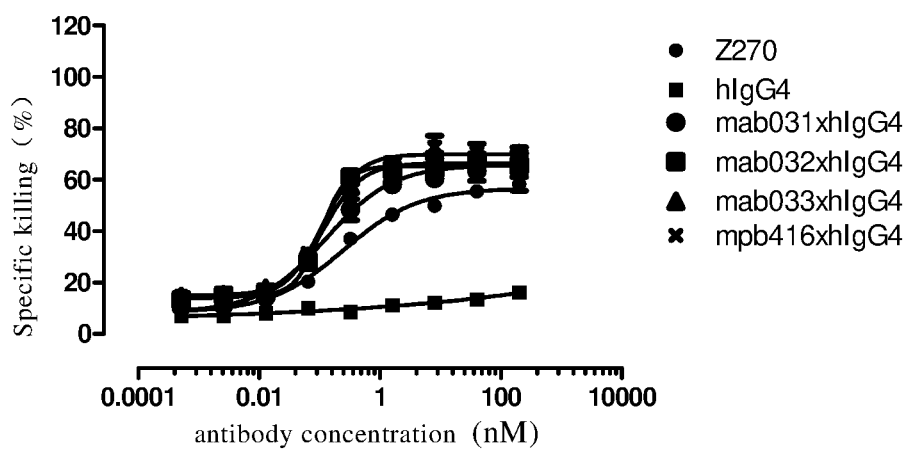
FIG. 15 shows the activity detection of NKG2A antibody in the NK92 killing experiment (antibody enhances the killing activity of NK92 cells).

Adding 75 ul/well of AAF-Glo™ reaction solution and reading the fluorescence value after 15 minutes to reflect the number of dead cells. Then adding 75 ul/well of lysate, and reading the fluorescence value after 15 minutes to reflect the total number of cells. The results are shown in FIG. 15. The results show that all the tested antibodies can enhance the killing activity of NK92 cells against LCL721.221, and perform better than the reference antibody Z270.

EXAMPLE 8

Detection of the Killing Effect of NKG2A Antibody Primary NK Cells on Target Cells (1) Ficoll separates whole blood to obtain peripheral blood mononuclear lymphocyte PBMC.

Diluting the freshly obtained whole blood with phosphate buffer PBS at a volume ratio of 1:1 to obtain the diluted whole blood. Using a sterile pipette to gently spread the diluted whole blood on the surface of Ficoll (purchased from GE Healthcare). The volume ratio of Ficoll to diluted whole blood was 3:4. Avoiding shaking and mixing, centrifuged gradient at 400 g at room temperature 20° C. for 30 minutes. The centrifuge tube after centrifugation was divided into three layers, the upper layer was plasma, and the middle milky white layer was mononuclear lymphocytes. Using a sterile pipette to gently aspirate the middle layer cells, collecting them in a new centrifuge tube, diluted to three times the volume with PBS phosphate buffer, centrifuged at 100 g at room temperature for 10 minutes, and discarding the supernatant. Resuspending the lymphocytes to 10 mL with PBS phosphate buffer, repeating the previous steps to remove the platelets, and finally resuspending the lymphocytes to 10 mL of multi-component RPMI1640 medium (purchased from Invitrogen) containing 10% fetal bovine serum, ready for use, that was the peripheral blood mononuclear lymphocyte PBMC, and the percentage was the mass percentage.

The primary NK was then isolated from PBMC and cultured in vitro for 4 days. The 1640 medium was formulated as follows: 0.01 mm 2-me, 1*L-Glu, 1*NEAA, 10% FBS, 10 ng/ml IL-2, 20 ng/ml IL-12. The LCL721.221 cells were expanded to 90% confluence in a T-75 cell culture flask, the medium was aspirated, and washed twice with PBS buffer (purchased from Invitrogen). Resuspending the cells in a medium containing 1 mM peptide to $1*10^6/500$ ul. After culturing in a 26° C. incubator overnight, they were washed twice with PBS. Resuspending LCL721.221 cells to $2*10^5$ cells/ml in culture medium (assay buffer), and adding 50 ul to a 96-well plate to ensure that the number of cells in each well was 10,000. Adding NK92 cells (at 37° C. for 30 min) that have been incubated with the antibody into the above 96-well plate with a volume of 100 ul according to the ratio of effector cell: target cell was 2:1, mixed with LCL721.221 cells well and centrifuged at 250 g for 5 minutes. Placing the 96-well plate in a 37° C. incubator for 4 hours.

Adding 75 ul/well of AAF-Glo™ reaction solution and reading the fluorescence value after 15 minutes to reflect the number of dead cells. Then adding 75 ul/well of lysate, and reading the fluorescence value after 15 minutes to reflect the total number of cells.

Figure 16:
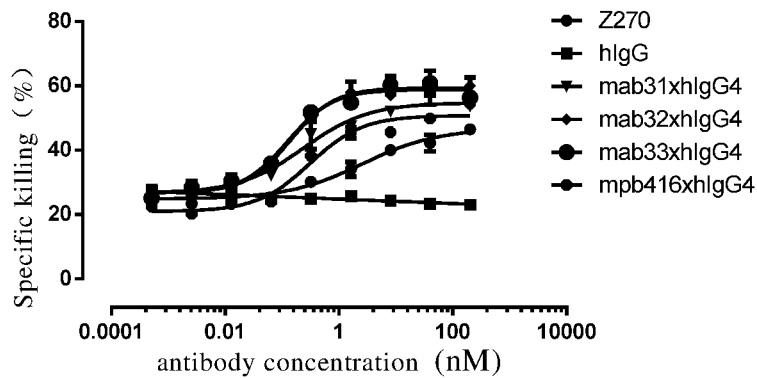
FIG. 16 shows the activity detection of NKG2A antibody in the primary NK cell killing experiment (PBMC donor-1). The antibody enhances the killing activity of primary NK cells, donor 1.
Figure 17:
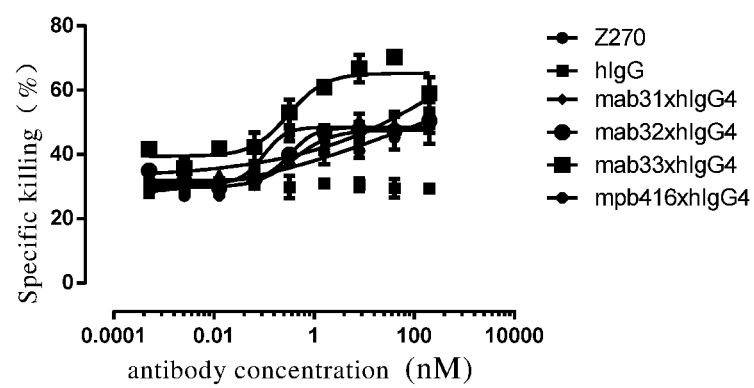
FIG. 17 shows the activity detection of NKG2A antibody in the primary NK cell killing experiment (PBMC donor-2). The antibody enhances the killing activity of primary NK cells, donor 2.
Figure 18A:
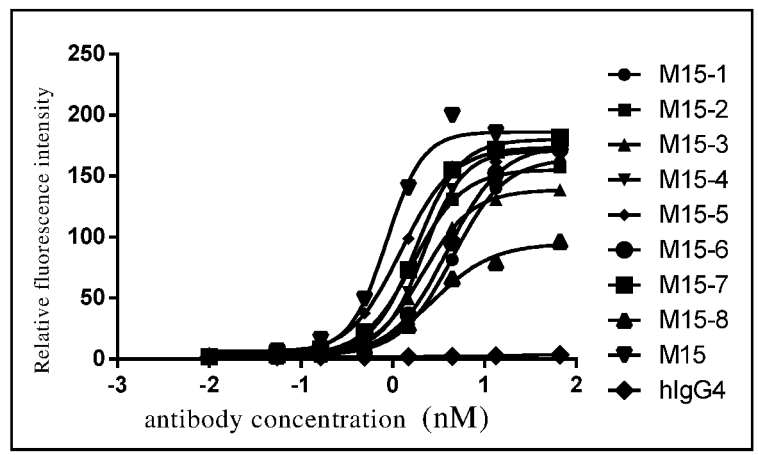
FIG. 18a shows the FACS detection of the binding reaction between humanized NKG2A antibody and CHOK1-hNKG2A/CD94.
Figure 18B:
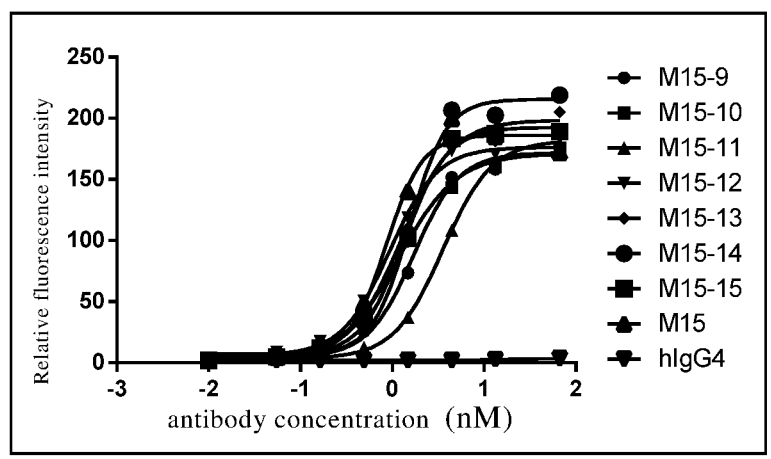
FIG. 18b shows the FACS detection of the binding reaction between humanized NKG2A antibody and CHOK1-hNKG2A/CD94.
Figure 19A:
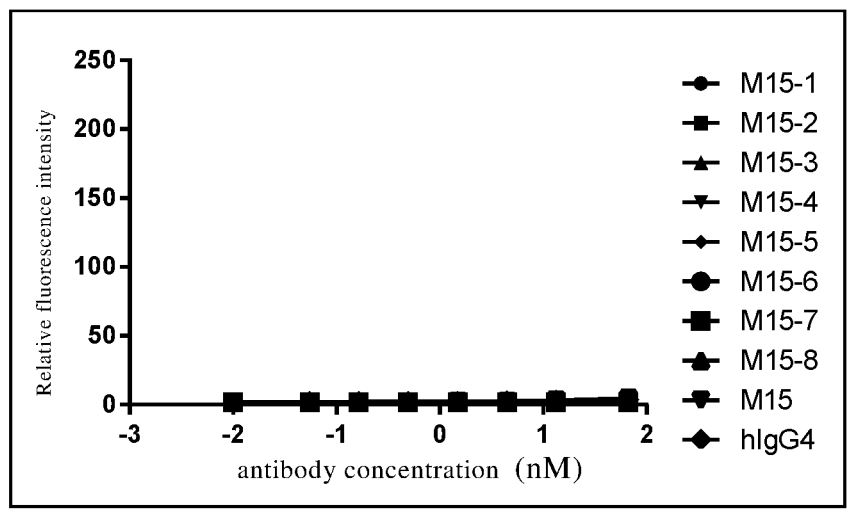
FIG. 19a shows the FACS detection of the binding reaction between humanized NKG2A antibody and CHOK1-hNKG2C/CD94.
Figure 19B:
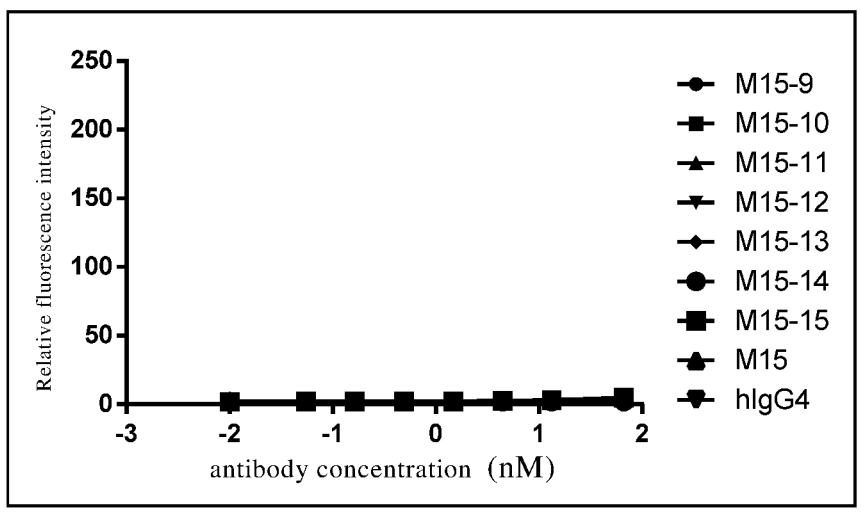
FIG. 19b shows the FACS detection of the binding reaction between humanized NKG2A antibody and CHOK1-hNKG2C/CD94.
Figure 20A:
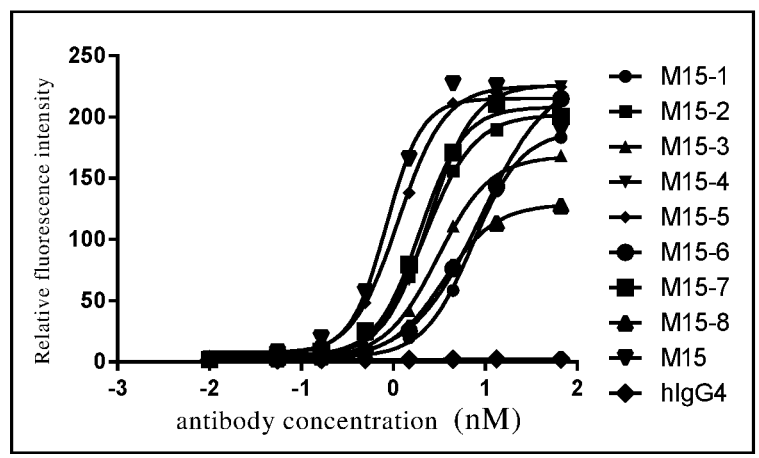
FIG. 20a shows the FACS detection of the binding reaction between humanized NKG2A antibody and CHOK1-cNKG2A/CD94.
Figure 20B:
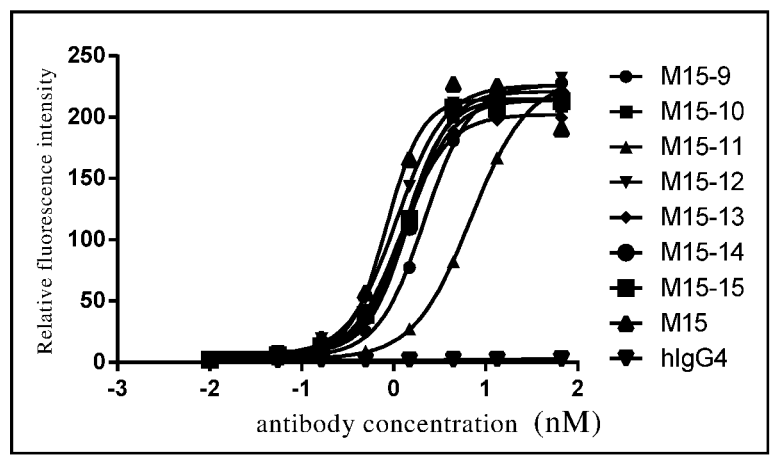
FIG. 20b shows the FACS detection of the binding reaction between humanized NKG2A antibody and CHOK1-cNKG2A/CD94.

The results are shown in FIG. 16 and FIG. 17. The results show that the tested antibodies can enhance the killing activity of primary NK cells against LCL721.221 in different donors.

EXAMPLE 9

Preparation of Humanized Antibody

Analyzing the CDR regions of the light and heavy chains of 12G8, i.e., the mpb416 clone, wherein the NG sequences in CDRH2 and CDRL1 were mutated to NA to obtain the M15 antibody. The following heavy chain and light chain variable regions were used as humanized templates.

TABLE 11

The amino acid sequence of the variable region of the light and heavy chains of M15

| Heavy chain variable region | QVQLQQSVAELVRPGASVKLSCTASGFNIQNTYIHWVKQRP<br>EQGLEWIGKIDPANADTKYAPTFQGKATITADTSSNTAYLQ<br>LSSLTPEDTAIYYCARYRDYLFYYALGYWGQGTSVTVSS<br>(SEQ ID NO. 99) |

TABLE 11-continued

The amino acid sequence of the variable region of the light and heavy chains of M15

| | |
|---|---|
| Light chain variable region | DIVMTQSAPSVPVTPGESVSISCRSSKSLLHSNANTYLYWF LQRPGQSPQLLIYRMSNLASGVPDRFSGSGSGTAFTLRISR VEAEDVGVYYCMQHLEYPYTFGGGTKLEIK (SEQ ID NO. 100) |

Selecting the germline gene sequence with the highest homology to the candidate antibody heavy chain variable region and light chain variable region through sequence alignment (NCBI-Igblast) as the variable region transplantation framework: IGHV1-46*01 (60.2%) and IGKV2-28*01 (80.0%). After selecting the human antibody framework, through homology modeling, the key amino acids that may determine the structure in the mouse antibody constant region were predicted, and the grafted framework region was designed for back mutation.

According to the above principles, designing 5 heavy chain variable region sequences (Mpb416-M15 VH_g0, Mpb416-M15 VH_g1, Mpb416-M15 VH_g2, Mpb416-M15 VH_g3, Mpb416-M15 VH_g4) and 3 light chain variable region sequences (Mpb416-M15 VL_g0, Mpb416-M15 VL_g1, Mpb416-M15 VL_g2), respectively, followed by cross-combination for expression, a total of 15 expression combinations, see Table 12.

TABLE 12

Humanized antibody expression combination

| | M15 VH.g0 | M15 VH.g1 | M15 VH.g2 | M15 VH.g3 | M15 VH.g4 |
|---|---|---|---|---|---|
| M15 VL.g0 | M15-1 | M15-2 | M15-3 | M15-4 | M15-5 |
| M15 VL.g1 | M15-6 | M15-7 | M15-8 | M15-9 | M15-10 |
| M15 VL.g2 | M15-11 | M15-12 | M15-13 | M15-14 | M15-15 |

Vector construction: The amplification primers were synthesized by Genewiz, and then the variable regions of the light chain and the heavy chain were amplified by PCR, respectively. Configuring 50 μL reaction system, including 50-100 ng heavy chain variable region, light chain variable region, 1 ul for each forward and reverse primer, 1 ul pfxD enzyme (purchased from invitrogen, 12344-012), 10*pfx buffer 5 ul (the supplier is the same with pfxD enzyme) and adding water to make up to 50 μL. Setting up the PCR program, pre-denaturation at 95° C. for 5 minutes, denaturation at 95° C. for 30 seconds, annealing at 56° C. for 30 seconds, extension at 68° C. for 30 seconds, after 25 cycles, an additional extension at 68° C. for 10 minutes to obtain PCR products. Taking 5 μL of PCR products for agarose gel electrophoresis detection, and using the recovery kit to purify the tested positive samples, wherein the recovery kit is PureLink Quick Gel extraction kit, purchased from Qiagen, catalog number 28706.

Preparation of humanized antibody: Carrying out ligation reaction: inserting a fragment of 20-40 ng, digested expression vector 60-100 ng, recombinase Exnase (purchased from Vazyme, catalog number C112-01/02) 1 μL, buffer 2 μL, the reaction system was 10 μL and reacted at 37° C. for half an hour to obtain the ligation product, which was the constructed recombinant vector. The buffer was the buffer purchased for the recombinase; the heavy chain variable region was directionally cloned into the expression vector containing the signal peptide and the human antibody heavy chain IgG4 (S228P) constant region (wherein the expression vector was purchased from Invitrogen, the recombination step was a conventional step), the light chain variable region is directionally cloned into an expression vector containing a signal peptide and a human antibody light chain kappa constant region (wherein the expression vector was purchased from Invitrogen, and the recombination step was a conventional step). Adding 10 μL of the ligation product to 100 μL of competent cells (Ecos 101competent cells, purchased from Yeastern, Catalog No. FYE607), heat shock in a 42° C. water bath for 60 seconds, putting it back on ice for 3 minutes, taking out 80 μL and spreading it on the LB solid medium containing ampicillin, incubated overnight at 37° C. in an incubator. The next day, using the primers pEF1A and pSV40 on the expression vector to configure a 30 μL PCR system for colony PCR. The colony PCR system is: 1 μL of each primer, 15 μL of PCR master mix (purchased from Novoprotein), and making up to 30 μL. Using a pipette tip to dip the colony into the PCR reaction system and pipette, and aspirating 0.5 μL onto another LB solid petri dish containing 100 μg/mL ampicillin to preserve the strain. After the PCR reaction, 4.5 μL of that was taken out for agarose gel electrophoresis detection, and the positive samples were sequenced.

The recombinant antibody heavy and light chain expression vectors with the correct sequence were amplified, and then transiently transfected into FreeStyle™ 293-F cells (purchased from Invitrogen) to produce antibodies. During transfection, the density of 293-F cells should be $1-1.2 \times 10^6$ cells/mL, and for 100 mL of cells, 100 μg of the above constructed recombinant vector and 200 μg of transfection reagent polyethyleneimine (PEI) were required. The recombinant vector and PEI were added to 5 mL of culture medium, respectively, and the mixture was allowed to stand at room temperature for 5 minutes. After filtering with 0.22 μm filter membrane, the mixture of recombinant vector and PEI was allowed to stand at room temperature for 15 minutes. Then the above mixture was slowly added to the cells, and cultured in a 37° C., 8% (v/v) $CO_2$ incubator at 130 rpm. The culture supernatant and cell pellet were taken every day to detect the expression of antibodies. After 5 days, the cell culture solution was centrifuged at 3000 g for 30 minutes, the supernatant was collected, and filtered with a 0.22 μm filter. Purifying the monoclonal antibody in 200 mL of the clear supernatant with 1 mL MabSelect™ SuRe™ column (purchased from GE Healthcare). MabSelect™ SuRe™ column was first equilibrated with equilibration buffer (PBS phosphate buffer, pH7.2), MabSelect™ SuRe™ column. After loading the sample, washing the MabSelect™ SuRe™ column with equilibration buffer. The volume of the equilibration buffer is 5 times the volume of the protein A column bed. The monoclonal antibody bound to the MabSelect™ SuRe™ column was eluted with the eluent (0.1 M glycine hydrochloride buffer, pH 3.0). Collecting the eluted antibodies and adding 10% (v/v) 1.0 M Tris-HCl buffer to neutralize the pH. Then immediately dialyzed with PBS phosphate buffer overnight. Collecting the dialyzed monoclonal antibodies, filtered aseptically with a 0.22 μm filter, and stored aseptically to obtain purified humanized NKG2A antibodies. The obtained antibody was tested and analyzed for protein concentration and purity. The results are shown in Table 13 below. The results show that the purity of the M15-3 antibody is low. The yield and purity analysis of the remaining antibodies are normal

TABLE 13

Analysis of purification results of humanized antibodies

| Protein products | volume (mL) | concentration (mg/ml) | mass (mg) | purity (%; SEC) | Buffer |
|---|---|---|---|---|---|
| M15-1 | 1.8 | 0.700 | 1.260 | 98.58 | PBS PH 7.4 |
| M15-2 | 1.8 | 0.884 | 1.591 | 99.87 | PBS PH 7.4 |
| M15-3 | 1.8 | 0.350 | 0.630 | 79.28 | PBS PH 7.4 |
| M15-4 | 1.8 | 1.000 | 1.800 | 96.48 | PBS PH 7.4 |
| M15-5 | 1.8 | 0.610 | 1.098 | 97.30 | PBS PH 7.4 |
| M15-6 | 1.8 | 0.813 | 1.463 | 99.69 | PBS PH 7.4 |
| M15-7 | 1.8 | 0.934 | 1.681 | 100.00 | PBS PH 7.4 |
| M15-8 | 1.8 | 0.690 | 1.242 | 97.48 | PBS PH 7.4 |
| M15-9 | 1.8 | 0.884 | 1.591 | 100.00 | PBS PH 7.4 |
| M15-10 | 1.8 | 1.480 | 2.664 | 100.00 | PBS PH 7.4 |
| M15-11 | 1.8 | 0.530 | 0.954 | 98.48 | PBS PH 7.4 |
| M15-12 | 1.8 | 0.614 | 1.105 | 100.00 | PBS PH 7.4 |
| M15-13 | 1.8 | 0.344 | 0.619 | 100.00 | PBS PH 7.4 |
| M15-14 | 1.8 | 0.637 | 1.147 | 100.00 | PBS PH 7.4 |
| M15-15 | 1.8 | 0.780 | 1.404 | 100.00 | PBS PH 7.4 |

Activity identification of humanized antibody (the method is the same as in Example 5)

A. Flow cytometry assay (FACS) detects the binding of antibodies to NKG2A/CD94 expressing cells. The results are shown in FIG. 18a, FIG. 18b, FIG. 19a, FIG. 19b, FIG. 20a, and FIG. 20b. The antibodies obtained can all bind to human NKG2A, monkey NKG2A on the cell surface, and do not bind to human NKG2C and human CD94. Wherein the IgG control is human IgG, and the data in the table is the mean fluorescence intensity value of the cell population measured by MFI.

Figure 21:
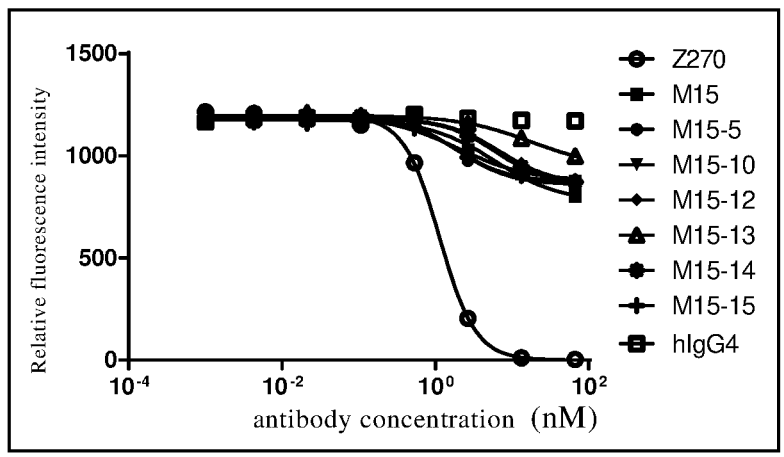
FIG. 21 shows the FACS detection of the blocking activity of the humanized NKG2A antibody, blocking the binding of HLA-E to NKG2A/CD94 cells.

B. Detection of the NKG2A antibody blocks the binding of NKG2A to its ligand HLA-E, the method is the same as in Example 6. The results are shown in FIG. 21. The antibody to be tested can block HLA-E from binding to the NKG2A protein on the cell surface. Wherein the isotype control is human IgG, and the data in the table is the mean fluorescence intensity value of the cell population measured by MFI.

Figure 22:
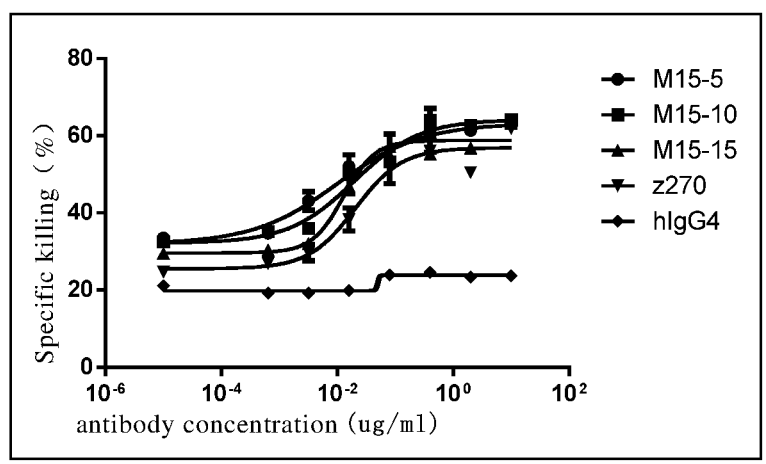
FIG. 22 shows that the humanized NKG2A antibody enhances the killing activity of NK92.

C. Detection of the NKG2A antibody blocks the binding of NKG2A to its ligand HLA-E, the method is the same as in Example 7. M15-5, M15-10, and M15-15 were tested. The results are shown in FIG. 22, the antibodies can all enhance the killing activity of NK92 on tumor cells.

D. Determination of the affinity constant of NKG2A antibody, the method is the same as that in Example 5B.

The affinity of the humanized antibody was evaluated, and the results showed that its affinity was significantly better than that of the reference positive antibody. The results are shown in Table 14.

TABLE 14

| Affinity constant of NKG2A antibody to immunogen A | | | | |
|---|---|---|---|---|
| antigen | Antibody | ka (1/Ms) | kd (1/s) | KD (M) |
| Biotin-HNKG2A/CD94-ECD-Fc | M15-5 | 9.581E+05 | <1.0E−05 | <1.044E−11 |
| | z270 | 8.873E+06 | 0.001617 | 1.823E−10 |

All documents mentioned in the present invention are incorporated by reference herein as if each document were incorporated separately by reference. Furthermore, it should be understood that after reading the foregoing teachings of the invention, various changes or modifications may be made to the invention by those skilled in the art and that these equivalents are equally within the scope of the claims appended to this application.

Appendix Sequence information of the present invention

TABLE 17

| | NKG2A antibody amino acid sequence numbers | | | | | | | |
|---|---|---|---|---|---|---|---|---|
| | Heavy chain | | | | Light chain | | | |
| Clone number | Variable region | VH-CDR1 | VH-CDR2 | VH-CDR3 | Variable region | VL-CDR1 | VL-CDR2 | VL-CDR3 |
| M15-5 | 1 | 2 | 3 | 4 | 5 | 6 | 7 | 8 |
| Mpb416 | 9 | 10 | 11 | 12 | 13 | 14 | 15 | 16 |
| Mab031 | 17 | 18 | 19 | 20 | 21 | 22 | 23 | 24 |
| Mab032 | 25 | 26 | 27 | 28 | 29 | 30 | 31 | 32 |
| Mab033 | 33 | 34 | 35 | 36 | 37 | 38 | 39 | 40 |
| Mab036 | 41 | 42 | 43 | 44 | 45 | 46 | 47 | 48 |
| 2F10 | 49 | 50 | 51 | 52 | 53 | 54 | 55 | 56 |
| 9B10 | 57 | 58 | 59 | 60 | 61 | 62 | 63 | 64 |
| 14G3 | 65 | 66 | 67 | 68 | 69 | 70 | 71 | 72 |

TABLE 18

| Sequence number of NKG2A antibody gene | | |
|---|---|---|
| Clone number | Heavy chain variable region | Light chain variable region |
| M15-5 | 73 | 74 |
| Mpb416 | 75 | 76 |
| Mab031 | 77 | 78 |
| Mab032 | 79 | 80 |
| Mab033 | 81 | 82 |
| Mab036 | 83 | 84 |
| 2F10 | 85 | 86 |
| 9B10 | 87 | 88 |
| 14G3 | 89 | 90 |

M15-5

>QVQLVQSGAEVKKPGASVKVSCKASGFNIQNTYIHWVKQAPGQGLEWIGKIDPANAD
TKYAPTFQGRATITADTSTNTAYLELSSLRSEDTAVYYCARYRDYLFYYALGYWGQGT
TVTVSS
SEQ ID NO. 1

>NTYIH
SEQ ID NO. 2

>IDPANADTKYAPTFQG
SEQ ID NO. 3

>YRDYLFYYALGY
SEQ ID NO. 4

>DIVMTQSPLSLPVTPGEPASISCRSSKSLLHSNANTYLYWYLQKPGQSPQLLIYRMSNL
ASGVPDRFSGSGSGTDFTLKISRVEAEDVGVYYCMQHLEYPYTFGQGTKLEIK
SEQ ID NO. 5

>RSSKSLLHSNANTYLY
SEQ ID NO. 6

>RMSNLAS
SEQ ID NO. 7

>MQHLEYPYT
SEQ ID NO. 8

Mpb416

>QVQLQQSVAELVRPGASVKLSCTASGFNIQNTYIHWVKQRPEQGLEWIGKIDPANGDT
KYAPTFQGKATITADTSSNTAYLQLSSLTPEDTAIYYCARYRDYLFYYALGYWGQGTSV
TVSS
SEQ ID NO. 9

>NTYIH
SEQ ID NO. 10

>IDPANGDTKYAPTFQG
SEQ ID NO. 11

>YRDYLFYYALGY
SEQ ID NO. 12

>DIVMTQSAPSVPVTPGESVSISCRSSKSLLHSNGNTYLYWFLQRPGQSPQLLIYRMSNL
ASGVPDRFSGSGSGTAFTLRISRVEAEDVGVYYCMQHLEYPYTFGGGTKLEIK
SEQ ID NO. 13

>RSSKSLLHSNGNTYLY
SEQ ID NO. 14

>RMSNLAS
SEQ ID NO. 15

>MQHLEYPYT
SEQ ID NO. 16

Mab031

>EVQLQQSVAELVRPGASVRLSCTGSGFNIQNTYIHWVKQRPEQGLEWIGRIDPANGDTK
YAPKFQGKATITADTSSNTAYLQLSSLTSEDTAIYYCTRYGNYLYYYSLDYWGQGTSVT
VSS
SEQ ID NO. 17

>NTYIH
SEQ ID NO. 18

>IDPANGDTKYAPKFQG
SEQ ID NO. 19

>YGNYLYYYSLDY
SEQ ID NO. 20

SEQ ID NO. 21
>DIVMTQAAPSVPVTPGESVSISCRSSKSLLHSNGNTYLYWFLQRPGQSPQLLIYRMSNLA
SGVPDRFSGSGSGTAFTLRISRVEAEDMGVYYCMQHLEYPYTFGGGTKLEIK

SEQ ID NO. 22
>RSSKSLLHSNGNTYLY

SEQ ID NO. 23
>RMSNLAS

SEQ ID NO. 24
>MQHLEYPYT

Mab032

SEQ ID NO. 25
>EVQLQQSVAELVRPGASVRLSCTGSGFNIENTYMHWLKQRPEQGLEWIGRIDPADGDT
QYAPKFQGKATITTDTSSNTAYLQLSSLTSEDTAIYYCARYGNYLFYYSMDYWGQGTS
VTVSS

SEQ ID NO. 26
>NTYMH

SEQ ID NO. 27
>IDPADGDTQYAPKFQG

SEQ ID NO. 28
>YGNYLFYYSMDY

SEQ ID NO. 29
>DIVMTQAAPSVPVTPGESVSISCRSSKSLLHSNGNTYLYWFLQRPGQSPQLLIYRMSNL
ASGVPDRFSGSGSATAFTLRISRVEAEDVGIYYCMQHLEYPYTFGGGTKLEIK

SEQ ID NO. 30
>RSSKSLLHSNGNTYLY

SEQ ID NO. 31
>RMSNLAS

SEQ ID NO. 32
>MQHLEYPYT

Mab033

SEQ ID NO. 33
>EVQLQQSVAEFVRPGASVRLSCTASGFNIENTYIHWLKQRPEQGLEWIGRIDPANGDTQ
YDPKFQGKATLTAATSSNTAYLQLSGLTSEDTAIYYCTRYGDYLFYYSLKYWGQGTSV
TVSS

SEQ ID NO. 34
>NTYIH

SEQ ID NO. 35
>IDPANGDTQYDPKFQG

SEQ ID NO. 36
>YGDYLFYYSLKY

SEQ ID NO. 37
>DIVMTQAAPSVSVTPGESVSISCRSSKSLLHSNGNTYLYWFLQRPGQSPQLLIYRMSNL
ASGVPDRFSGSGSGTAFTLRISRVEAEDVGVYYCMQHLESPYTFGGGTKLEIK

SEQ ID NO. 38
>RSSKSLLHSNGNTYLY

SEQ ID NO. 39
>RMSNLAS

SEQ ID NO. 40
>MQHLESPYT

Mab036

>EVQLQQSVAELVRPGASVKLSCTASGFNIENTFMHWLKQRPEQGLEWIGRIDPANGNTQYAPKFQGKATITADTSSNTAYLQLSRLTSEDTAIYYCARYGNYLFYYSMDYWGQGTSVTVSS  SEQ ID NO. 41

>NTFMH  SEQ ID NO. 42

>IDPANGNTQYAPKFQG  SEQ ID NO. 43

>YGNYLFYYSMDY  SEQ ID NO. 44

>DIVMTQAAPSLPVTPGESVSISCRSSQSLLHSNGNTYLYWFLQRPGQSPQLLIYRMSNLASGVPDRFSGSGSGTAFTLRISRVEAEDVGVYYCMQHLEYPYTFGGGTKLEIK  SEQ ID NO. 45

>RSSQSLLHSNGNTYLY  SEQ ID NO. 46

>RMSNLAS  SEQ ID NO 47

>MQHLEYPYT  SEQ ID NO. 48

2F10

>QVQLQQSVAELVRPGASVKLSCTASGFNIKNAYVHWVKQRPEQGLEWIGQIDPANGNTKYAPKFQAKATITADTSSNTVYLQLSSLTSEDTAVYYCARSYLGGQYYFDYSGQGTTLTVSS  SEQ ID NO. 49

>NAYVH  SEQ ID NO. 50

>IDPANGNTKYAPKFQA  SEQ ID NO. 51

>SYLGGQYYFDY  SEQ ID NO. 52

>DILMTQSPSSMYASLGERVTITCKASQDINSYLSWFQQKPGKSPKTLIYRANRLVDGVPSRFSGSGSGQDYSLTISSLEYEDMGIYYCLQYDEFPLTFGAGTKLEIK  SEQ ID NO. 53

>KASQDINSYLS  SEQ ID NO. 54

>RANRLVD  SEQ ID NO. 55

>LQYDEFPLT  SEQ ID NO. 56

9B10

>QVQLQQSVAELVRPGASVKLSCTASGFNIQNTYMHWVKQRPEQGLEWIGRIDPANGNIKYAPKFQGKATITADTSSNTAYLQLSSLTSEDTAIYYCAIYYDFGRAFAYWGQGTLVTVSA  SEQ ID NO. 57

>NTYMH  SEQ ID NO. 58

>IDPANGNIKYAPKFQG  SEQ ID NO. 59

>YYDFGRAFAY  SEQ ID NO. 60

```
                                              SEQ ID NO. 61
>DIVMTQSPSSMYASLGERVTITCKASQDINSYLSWFQQKPGKSPKTLIYRANRLVDGVP

SRFSGSGSGQDYSLTISSLEYEDMGIYYCLQYDEFPFTFGSGTKLEIK

SEQ ID NO. 62
>KASQDINSYLS

SEQ ID NO. 63
>RANRLVD

SEQ ID NO. 64
>LQYDEFPFT

14G3
                                              SEQ ID NO. 65
>EVQLQQSVAELVRPGASVKLSCTASGFNIKNAYVHWVKQRPEQGLEWIGQIDPANGNT

KYAPKFQAKATITADTSSNTVYLQLSSLTSEDTAVYYCARSYLGGQYYFDYSGQGTTL

TVSS

SEQ ID NO. 66
>NAYVH

SEQ ID NO. 67
>IDPANGNTKYAPKFQA

SEQ ID NO. 68
>SYLGGQYYFDY

SEQ ID NO. 69
>DIVMTQSAFSNPVTLGTSASISCRSSKSLLHSNGITYLYWYLQKPGQSPQLLIYQMSNLA

SGVPDRFSSSGSGTDFTLRISRVEAEDVGVYYCMQHLEYPFTFGAGTKLEIK

SEQ ID NO. 70
>RSSKSLLHSNGITYLY

SEQ ID NO. 71
>QMSNLAS

SEQ ID NO. 72
>MQHLEYPFT

M15-5
M15-5 heavy chain
                                              SEQ ID NO. 73
>CAGGTGCAGCTGGTGCAGAGCGGCGCCGAAGTGAAGAAACCCGGCGCCAGCGTGA

AGGTGAGCTGCAAGGCCAGCGGCTTCAATATCCAGAACACCTACATCCACTGGGTG

AAGCAAGCCCCTGGCCAGGGCCTGGAGTGGATCGGCAAGATCGACCCCGCCAACGC

CGACACCAAGTACGCCCCCACCTTCCAGGGCAGAGCCACCATCACCGCCGACACCA

GCACCAACACCGCCTACCTGGAGCTGAGCAGCCTGAGGAGCGAGGACACCGCCGTG

TACTACTGCGCCAGGTACAGGGACTACCTGTTCTACTATGCCCTGGGCTACTGGGGC

CAGGGCACAACCGTGACCGTGAGCAGCC

M15-5 light chain
                                              SEQ ID NO. 74
>GACATCGTGATGACCCAGAGCCCTCTGAGCCTGCCTGTGACCCCTGGAGAGCCTGC

CAGCATCAGCTGCAGGAGCAGCAAAAGCCTGCTGCACAGCAACGCCAACACCTACC

TGTACTGGTACCTGCAGAAGCCCGGACAGAGCCCCCAGCTGCTGATCTACAGGATG

AGCAACCTGGCCAGCGGCGTGCCTGATAGGTTTAGCGGCAGCGGCAGCGGAACCGA

CTTCACCCTGAAGATCAGCAGAGTGGAGGCCGAGGACGTGGGCGTGTACTACTGCA

TGCAGCACCTGGAGTACCCCTACACCTTCGGCCAGGGAACCAAGCTGGAGATCAAG

G
```

Mpb416 heavy chain
SEQ ID NO. 75
>CAGGTTCAGCTTCAGCAGTCTGTGGCAGAGCTTGTGAGGCCAGGGGCCTCAGTCAA

ATTGTCCTGCACAGCTTCTGGCTTCAACATTCAAAACACCTATATACACTGGGTGAA

GCAGAGGCCTGAACAGGGCCTGGAATGGATTGGAAAGATTGATCCTGCGAATGGTG

ATACTAAATATGCCCCGACGTTCCAGGGCAAGGCCACTATAACTGCAGACACATCCT

CCAACACAGCCTACCTGCAGCTCAGCAGCCTAACACCTGAGGACACTGCCATCTATT

ACTGTGCTAGATACCGTGACTACCTATTTTACTATGCTTTGGGCTACTGGGGTCAAG

GAACCTCAGTCACCGTCTCCTCG

Mpb416 light chain
SEQ ID NO. 76
>GACATTGTGATGACGCAGTCTGCACCCTCTGTACCTGTCACTCCTGGAGAGTCAGT

ATCCATCTCCTGCAGGTCTAGTAAGAGTCTCCTGCATAGTAATGGCAACACTTACTT

GTATTGGTTCCTGCAGAGGCCAGGCCAGTCTCCTCAGCTCCTGATATATCGGATGTC

CAACCTTGCCTCAGGAGTCCCAGACAGGTTCAGTGGCAGTGGGTCAGGAACTGCTTT

CACACTGAGAATCAGTAGAGTGGAGGCTGAGGATGTGGGTGTTTATTACTGTATGCA

ACATCTAGAATATCCGTACACGTTCGGAGGGGGGACCAAGCTGGAAATCAAA

Mab031 heavy chain
SEQ ID NO. 77
>GAGGTTCAGCTGCAGCAGTCTGTGGCAGAGCTTGTGAGGCCAGGGGCCTCAGTCA

GGTTGTCCTGCACAGGTTCTGGCTTCAACATTCAAAACACATATATTCACTGGGTGA

AACAGAGGCCTGAACAGGGCCTGGAGTGGATTGGAAGGATTGATCCTGCGAATGGT

GATACTAAATATGCCCCGAAGTTCCAGGGCAAGGCCACTATAACTGCAGACACATC

CTCCAACACAGCCTACCTGCAGCTCAGCAGCCTGACATCTGAGGACACTGCCATCTA

TTACTGTACTAGATATGGTAACTACTTATATTACTATAGTTTGGACTACTGGGGTCAA

GGAACCTCAGTCACCGTCTCCTCA

Mab031 light chain
SEQ ID NO. 78
>GATATTGTGATGACTCAGGCTGCACCCTCTGTACCTGTCACTCCTGGAGAGTCTGT

ATCCATCTCCTGCAGGTCTAGTAAGAGTCTCCTGCATAGTAATGGCAACACTTACTT

GTATTGGTTCCTGCAGAGGCCAGGCCAGTCTCCTCAGCTCCTGATATATCGGATGTC

CAACCTTGCCTCAGGAGTCCCAGACAGGTTCAGTGGCAGTGGGTCAGGAACTGCTTT

CACACTGAGAATCAGTAGAGTGGAGGCTGAGGATATGGGTGTTTATTACTGTATGCA

ACATCTAGAATATCCGTACACGTTCGGAGGGGGGACCAAGCTGGAAATAAAG

Mab032 heavy chain
SEQ ID NO. 79
>GAGGTTCAGCTGCAGCAGTCTGTGGCAGAGCTTGTGAGGCCAGGGGCCTCAGTCA

GGTTGTCCTGCACAGGTTCTGGCTTCAACATTGAAAACACCTATATGCACTGGCTGA

AACAGAGGCCTGAACAGGGCCTGGAGTGGATTGGAAGGATTGATCCTGCGGATGGT

GATACTCAATATGCCCCGAAGTTCCAGGGCAAGGCCACTATAACTACAGACACATC

CTCCAACACAGCCTACCTGCAGCTCAGCAGCCTGACATCTGAGGACACTGCCATTTA

TTACTGTGCTAGATATGGTAACTACTTATTTTACTATTCTATGGACTACTGGGGTCAA

GGAACCTCAGTCACCGTCTCCTCA

Mab032 light chain

SEQ ID NO. 80

>GATATTGTGATGACTCAGGCTGCACCCTCTGTACCTGTCACTCCTGGAGAGTCAGT

ATCCATCTCCTGCAGGTCTAGTAAGAGTCTCCTGCATAGTAATGGCAACACTTACTT

GTATTGGTTCCTGCAGAGGCCAGGCCAGTCTCCTCAGCTCCTGATATATCGGATGTC

CAACCTTGCCTCAGGAGTCCCAGACAGGTTCAGTGGCAGTGGGTCAGCAACTGCTTT

CACACTGAGAATCAGTAGAGTGGAGGCTGAGGATGTGGGTATTTATTACTGTATGCA

ACATCTAGAATATCCGTACACGTTCGGAGGGGGGACCAAGCTGGAAATAAAA

Mab033 heavy chain

SEQ ID NO. 81

>GAGGTTCAGCTGCAGCAGTCTGTGGCAGAATTTGTGAGGCCAGGGGCCTCAGTCA

GGTTGTCCTGCACAGCTTCTGGCTTCAACATTGAAAACACCTATATACACTGGCTGA

AACAGAGGCCTGAACAGGGCCTGGAGTGGATTGGAAGGATTGATCCAGCGAATGGT

GATACTCAATATGACCCGAAGTTCCAGGGCAAGGCCACTTTGACTGCAGCCACATCC

TCCAACACAGCCTACCTGCAGCTCAGCGGCCTGACATCTGAAGACACAGCCATCTAT

TATTGTACTAGATATGGTGACTATTTATTTTACTATTCTCTGAAGTACTGGGGTCAAG

GAACCTCAGTCACCGTCTCCTCA

Mab033 light chain

SEQ ID NO. 82

>GATATTGTGATGACTCAGGCTGCACCCTCTGTATCTGTCACTCCTGGAGAGTCAGT

ATCCATCTCCTGCAGGTCTAGTAAGAGTCTCCTGCATAGTAATGGCAACACTTACTT

GTATTGGTTCCTGCAGAGGCCAGGCCAGTCTCCTCAGCTCCTGATATATCGGATGTC

CAACCTTGCCTCAGGAGTCCCAGACAGGTTCAGTGGCAGTGGGTCAGGAACTGCTTT

CACACTGAGAATCAGTCGAGTGGAGGCTGAGGATGTGGGTGTTTATTACTGTATGCA

ACATCTAGAGTCTCCGTACACGTTCGGAGGGGGGACCAAGCTGGAAATAAAA

Mab036 heavy chain

SEQ ID NO. 83

>GAGGTTCAGCTGCAGCAGTCTGTGGCAGAGCTTGTGAGGCCAGGGGCCTCAGTCA

AGTTGTCCTGCACAGCTTCTGGCTTCAACATTGAAAACACCTTTATGCACTGGCTGA

AGCAGAGGCCTGAACAGGGCCTGGAGTGGATTGGAAGGATTGATCCTGCGAATGGT

AATACTCAATATGCCCCGAAGTTCCAGGGCAAGGCCACTATAACTGCAGACACATC

CTCCAACACAGCCTACCTGCAGCTCAGCAGACTGACATCTGAGGACACTGCCATCTA

TTACTGTGCTAGATATGGTAACTACTTATTTTACTATTCTATGGACTACTGGGGTCAA

GGAACCTCAGTCACCGTCTCCTCA

Mab036 light chain

SEQ ID NO. 84

>GATATTGTGATGACTCAGGCTGCACCCTCTTTACCTGTCACTCCTGGAGAGTCAGT

ATCCATCTCCTGCAGGTCTAGTCAGAGTCTCCTGCATAGTAATGGCAACACTTACTT

GTATTGGTTCCTGCAGAGGCCAGGCCAGTCTCCTCAGCTCCTGATATATCGGATGTC

CAACCTTGCCTCAGGAGTCCCAGACAGGTTCAGTGGCAGTGGGTCAGGAACTGCTTT

CACACTGAGAATCAGTAGAGTGGAGGCTGAGGATGTGGGTGTTTATTACTGTATGCA

ACATCTAGAATATCCG

TACACGTTCGGAGGGGGGACCAAGCTGGAAATAAAA

-continued

2F10 heavy chain
SEQ ID NO. 85
>CAGGTCCAGCTGCAGCAGTCTGTGGCAGAGCTTGTGAGGCCAGGGGCCTCAGTCA
AGTTGTCCTGCACAGCTTCTGGCTTCAACATTAAAAACGCCTATGTCCACTGGGTGA
AGCAGAGGCCTGAACAGGGCCTGGAGTGGATTGGACAGATTGATCCTGCGAATGGT
AATACTAAATATGCCCCGAAGTTCCAGGCCAAGGCCACTATAACTGCAGACACATC
CTCCAACACAGTCTACCTGCAACTCAGCAGCCTGACATCTGAGGACACTGCCGTCTA
TTACTGTGCTAGATCCTATCTTGGTGGCCAGTACTACTTTGACTACTCGGGCCAAGG
CACCACTCTCACAGTCTCCTCG 2F10 light chain
SEQ ID NO. 86
>GACATTCTGATGACCCAGTCTCCATCTTCCATGTATGCATCTCTAGGAGAGAGAGT
CACTATCACTTGCAAGGCGAGTCAGGACATTAATAGCTATTTAAGCTGGTTCCAGCA
GAAACCAGGGAAATCTCCTAAGACCCTGATCTATCGTGCAAACAGATTGGTAGATG
GGGTCCCATCAAGGTTCAGTGGCAGTGGATCTGGGCAAGATTATTCTCTCACCATCA
GCAGCCTGGAATATGAAGATATGGGAATTTATTATTGTCTACAGTATGATGAGTTCC
CGCTCACGTTCGGTGCTGGGACCAAGCTGGAAATAAAA 9B10 heavy chain
SEQ ID NO. 87
>CAGGTTCAGCTGCAGCAGTCTGTGGCAGAGCTTGTGAGGCCAGGGGCCTCAGTCA
AGTTGTCCTGCACAGCTTCTGGCTTCAACATTCAAAACACCTATATGCACTGGGTGA
AGCAGAGGCCTGAACAGGGCCTGGAGTGGATTGGAAGGATTGATCCTGCGAATGGT
AATATTAAATATGCCCCGAAGTTCCAGGGCAAGGCCACTATAACTGCAGACACATC
CTCCAATACAGCCTACCTGCAGCTCAGCAGCCTGACATCTGAAGACACTGCCATCTA
TTACTGTGCTATCTACTATGATTTCGGCAGGGCCTTTGCTTACTGGGGCCAAGGGAC
TCTGGTCACTGTCTCTGCG 9B10 light chain
SEQ ID NO. 88
>GATATTGTGATGACCCAGTCTCCATCTTCCATGTATGCATCTCTAGGAGAGAGAGT
CACTATCACTTGCAAGGCGAGTCAGGACATTAATAGCTATTTAAGCTGGTTCCAGCA
GAAACCAGGGAAATCTCCTAAGACCCTGATCTATCGTGCAAACAGATTGGTAGATG
GGGTCCCATCAAGGTTCAGTGGCAGTGGATCTGGGCAAGATTATTCTCTCACCATCA
GCAGCCTGGAGTATGAAGATATGGGAATTTATTATTGTCTACAGTATGATGAGTTTC
CATTCACGTTCGGCTCGGGGACAAAGTTGGAAATAAAA 14G3 heavy chain
SEQ ID NO. 89
>GAGGTCCAGCTGCAGCAGTCTGTGGCAGAGCTTGTGAGGCCAGGGGCCTCAGTCA
AGTTGTCCTGCACAGCCTCTGGCTTCAACATTAAAAACGCCTATGTCCACTGGGTGA
AGCAGAGGCCTGAACAGGGCCTGGAGTGGATTGGACAGATTGATCCTGCGAATGGT
AATACTAAATATGCCCCGAAGTTCCAGGCCAAGGCCACTATAACTGCAGACACATC
CTCCAACACAGTCTACCTGCAACTCAGCAGCCTGACATCTGAGGACACTGCCGTCTA
TTACTGTGCTAGGTCCTATCTTGGTGGCCAGTACTACTTTGACTACTCGGGCCAAGG
CACCACTCTCACAGTCTCCTCG -continued 14G3 light chain

SEQ ID NO. 90
>GATATTGTGATGACTCAGTCTGCATTCTCCAATCCAGTCACTCTTGGAACATCAGCT

TCCATCTCCTGCAGGTCTAGTAAGAGTCTCCTACATAGTAATGGCATCACTTATTTGT

ATTGGTATCTGCAGAAGCCAGGCCAGTCTCCTCAGCTCCTGATTTATCAGATGTCCA

ACCTTGCCTCAGGAGTCCCAGACAGGTTCAGTAGCAGTGGGTCAGGAACTGATTTCA

CACTGAGAATCAGCAGAGTGGAGGCTGAGGATGTGGGTGTTTATTACTGTATGCAA

CATCTAGAATATCCTTTCACGTTCGGTGCTGGGACCAAGCTGGAAATAAAA (NKG2A ECD)

SEQ ID NO. 91
>PSTLIQRHNNSSLNTRTQKARHCGHCPEEWITYSNSCYYIGKERRTWEESLLACTSKNS

SLLSIDNEEEMKFLSIISPSSWIGVFRNSSHHPWVTMNGLAFKHEIKDSDNAELNCAVLQ

VNRLKSAQCGSSIIYHCKHKL (CD94 ECD)

SEQ ID NO. 92
>KNSFTKLSIEPAFTPGPNIELQKDSDCCSCQEKWVGYRCNCYFISSEQKTWNESRHLCA

SQKSSLLQLQNTDELDFMSSSQQFYWIGLSYSEEHTAWLWENGSALSQYLFPSFETFNT

KNCIAYNPNGNALDESCEDKNRYICKQQLI (NKG2A full length Nucleic Acid)

SEQ ID NO. 93
>ATGGATAACCAAGGAGTAATCTACTCAGACCTGAATCTGCCCCCAAACCCAAAGA

GGCAGCAACGAAAACCTAAAGGCAATAAAAGCTCCATTTTAGCAACTGAACAGGAA

ATAACCTATGCGGAATTAAACCTTCAAAAAGCTTCTCAGGATTTTCAAGGGAATGAC

AAAACCTATCACTGCAAAGATTTACCATCAGCTCCAGAGAAGCTCATTGTTGGGATC

CTGGGAATTATCTGTCTTATCTTAATGGCCTCTGTGGTAACGATAGTTGTTATTCCCT

CTACATTAATACAGAGGCACAACAATTCTTCCCTGAATACAAGAACTCAGAAAGCA

CGTCATTGTGGCCATTGTCCTGAGGAGTGGATTACATATTCCAACAGTTGTTACTAC

ATTGGTAAGGAAAGAAGAACTTGGGAAGAGAGTTTGCTGGCCTGTACTTCGAAGAA

CTCCAGTCTGCTTTCTATAGATAATGAAGAAGAAATGAAATTTCTGTCCATCATTTC

ACCATCCTCATGGATTGGTGTGTTTCGTAACAGCAGTCATCATCCATGGGTGACAAT

GAATGGTTTGGCTTTCAAACATGAGATAAAAGACTCAGATAATGCTGAACTTAACTG

TGCAGTGCTACAAGTAAATCGACTTAAATCAGCCCAGTGTGGATCTTCAATAATATA

TCATTGTAAGCATAAGCTTTAG (CD94 full length Nucleic Acid)

SEQ ID NO. 94
>ATGGCAGCTTTTACTAAACTGAGTATTGAGCCAGCATTTACTCCAGGACCCAACAT

AGAACTCCAGAAAGACTCTGACTGCTGTTCTTGCCAAGAAAAATGGGTTGGGTACC

GGTGCAACTGTTACTTCATTTCCAGTGAACAGAAAACTTGGAACGAAAGTCGGCATC

TCTGTGCTTCTCAGAAATCCAGCCTGCTTCAGCTTCAAAACACAGATGAACTGGATT

TTATGAGCTCCAGTCAACAATTTTACTGGATTGGACTCTCTTACAGTGAGGAGCACA

CCGCCTGGTTGTGGGAGAATGGCTCTGCACTCTCCCAGTATCTATTTCCATCATTTGA

AACTTTTAATACAAAGAACTGCATAGCGTATAATCCAAATGGAAATGCTTTAGATGA

ATCCTGTGAAGATAAAAATCGTTATATCTGTAAGCAACAGCTCATTTAA (macaque NKG2A full-length amino acid sequence)
SEQ ID No. 95
>MDNQGVIYSDLNLPPNQKRQQQKPKGNSRSTLVIEQEITYAELNLQKTSQDFQGNDKT

NHCKDLPSAPEKLIAGILGIICLVLMASVVTIVVIPSTLTQKHNNSSLNTRTQKARHCGHC

PKEWITYSNSCYYIGKEKRTWAESLLACTSKNSSLLSIDNEEEMKFLTAILSSSWIDVFRD

SSHHPWVTINGLTFKHEIKDSDNAEHNCAMLHARGLKSDECGSSKIYHCKHKL (macaque CD94 full-length amino acid sequence)
SEQ ID No. 96
>MAVFKTTLWRLISGTLGIICLSLMATLGILLKNSFTKLSVEPAYTPGPNIELQKDSDC

CSCHEKWVGYRCNCYFISSEEKTWNESRHFCASQKSSLLQLQNRDELDFMSSSQHFY

WIGLSYSEEHTAWLWENGSALSQYLFPSFETFKPKNCIAYNSKGNALDESCETKNRY

ICKQQLI pTT-EF1a-F
SEQ ID No. 97
>gcccttttg agtttgga pSV40
SEQ ID No. 98
>cactgcattc tagttgtg M15 heavy chain variable region
SEQ ID No. 99
>QVQLQQSVAELVRPGASVKLSCTASGFNIQNTYIHWVKQRPEQGLEWIGKIDPANA

DTKYAPTFQGKATITADTSSNTAYLQLSSLTPEDTAIYYCARYRDYLFYYALGYWGQ

GTSVTVSS

M15 Light chain variable region
SEQ ID No. 100
>DIVMTQSAPSVPVTPGESVSISCRSSKSLLHSNANTYLYWFLQRPGQSPQLLIYRMSNL

ASGVPDRFSGSGSGTAFTLRISRVEAEDVGVYYCMQHLEYPYTFGGGTKLEIK

---

The invention claimed is:

1. An antibody, wherein the antibody has a heavy chain variable region and a light chain variable region, wherein the heavy chain variable region and the light chain variable region comprise complementarity determining regions (CDRs) selected from the group consisting of (a)-(i):
   (a) VH-CDRs as shown in SEQ ID NOs.2, 3 and 4; and VL-CDRs as shown in SEQ ID NOs.6, 7 and 8;
   (b) VH-CDRs as shown in SEQ ID NOs.10, 11 and 12; and VL-CDRs as shown in SEQ ID NOs. 14, 15 and 16;
   (c) VH-CDRs as shown in SEQ ID NOs. 18, 19 and 20; and VL-CDRs as shown in SEQ ID NOs.22, 23 and 24;
   (d) VH-CDRs as shown in SEQ ID NOs.26, 27 and 28; and VL-CDRs as shown in SEQ ID NOs.30, 31 and 32;
   (e) VH-CDRs as shown in SEQ ID NOs.34, 35 and 36; and VL-CDRs as shown in SEQ ID NOs.38, 39 and 40;
   (f) VH-CDRs as shown in SEQ ID NOs.42, 43 and 44; and VL-CDRs as shown in SEQ ID NOs.46, 47 and 48;
   (g) VH-CDRs as shown in SEQ ID NOs.50, 51 and 52; and VL-CDRs as shown in SEQ ID NOs.54, 55 and 56;

(h) VH-CDRs as shown in SEQ ID NOs.58, 59 and 60; and VL-CDRs as shown in SEQ ID NOs.62, 63 and 64; and (i) VH-CDRs as shown in SEQ ID NOs.66, 67 and 68; and VL-CDRs as shown in SEQ ID NOs.70, 71 and 72.

2. The antibody of claim 1, wherein the heavy chain variable region and the light chain variable region comprise a-CDRs selected from the group consisting of:

| VH-CDR1 Sequence Number | VH-CDR2 Sequence Number | VH-CDR3 Sequence Number | VL-CDR1 Sequence Number | VL-CDR2 Sequence Number | VL-CDR3 Sequence Number |
|---|---|---|---|---|---|
| 2 | 3 | 4 | 6 | 7 | 8 |
| 10 | 11 | 12 | 14 | 15 | 16 |
| 18 | 19 | 20 | 22 | 23 | 24 |
| 26 | 27 | 28 | 30 | 31 | 32. |

3. The antibody of claim 1, wherein the antibody is selected from the group consisting of:

| Antibody number | Clone | VH sequence Number | VL Sequence Number |
|---|---|---|---|
| 1 | M15-5 | 1 | 5 |
| 2 | Mpb416 | 9 | 13 |
| 3 | Mab031 | 17 | 21 |
| 4 | Mab032 | 25 | 29 |
| 5 | Mab033 | 33 | 37 |
| 6 | Mab036 | 41 | 45 |
| 7 | 2F10 | 49 | 53 |
| 8 | 9B10 | 57 | 61 |
| 9 | 14G3 | 65 | 69. |

4. A recombinant protein, wherein the recombinant protein comprises:

(i) the antibody of claim 1; and (ii) an optional tag sequence to assist in expression and/or purification.

5. A polynucleotide encoding the antibody of claim 1.

6. The polynucleotide of claim 5, wherein the polynucleotide encoding the heavy chain variable region sequence and the polynucleotide encoding the light chain variable region sequence are selected from the group consisting of:

| Clone | Sequence numbering of polynucleotide encoding VH | Sequence numbering of polynucleotide encoding VL |
|---|---|---|
| M15-5 | 73 | 74 |
| Mpb416 | 75 | 76 |
| Mab031 | 77 | 78 |
| Mab032 | 79 | 80 |
| Mab033 | 81 | 82 |
| Mab036 | 83 | 84 |
| 2F10 | 85 | 86 |
| 9B10 | 87 | 88 |
| 14G3 | 89 | 90. |

7. A vector comprising the polynucleotide of claim 5.

8. A genetically engineered host cell comprising the vector of claim 7.

9. An antibody conjugate comprising:

(a) an antibody moiety, which is the antibody of claim 1; and (b) a coupling moiety coupled to the antibody moiety, the coupling is selected from the group consisting of a detectable marker, a drug, a toxin, a cytokine, a radionuclide, an enzyme, and a combination thereof.

10. An immune cell that expresses or is exposed outside the cell membrane with the antibody of claim 1.

11. A pharmaceutical composition comprising:

(i) an active ingredient, the active ingredient is selected from the group consisting of: the antibody of claim 1, a recombinant protein comprising the antibody, an antibody conjugate comprising the antibody, an immune cell that expresses the antibody, and a combination thereof; and (ii) a pharmaceutically acceptable carrier.

* * * * *